US008560951B1

(12) United States Patent
Snyder et al.

(10) Patent No.: US 8,560,951 B1
(45) Date of Patent: *Oct. 15, 2013

(54) SYSTEM AND METHOD FOR REAL TIME VIDEO PRODUCTION AND DISTRIBUTION

(75) Inventors: Robert J. Snyder, Jacksonville, FL (US); Alex Holtz, Jacksonville, FL (US); David E. Buehnemann, Orange Park, FL (US); Gilberto Fres, Jacksonville, FL (US); Harrison T. Hickenlooper, III, Palatka, FL (US); Charles M. Hoeppner, Jacksonville, FL (US); Kevin K. Morrow, Jacksonville, FL (US); Bradley E. Neider, Jacksonville, FL (US); Loren J. Nordin, III, Jacksonville, FL (US); Todd D. Parker, Lawrenceville, GA (US)

(73) Assignee: Thomson Licensing, Boulogne-Bellancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,578

(22) Filed: Jan. 21, 2000

Related U.S. Application Data

(63) Continuation-in-part of application No. 09/482,683, filed on Jan. 14, 2000, now Pat. No. 6,952,221, which is a continuation-in-part of application No. 09/215,161, filed on Dec. 18, 1998, now Pat. No. 6,452,612.

(51) Int. Cl.
*G06F 3/00* (2006.01)

(52) U.S. Cl.
USPC ........... 715/723; 715/720; 715/726; 715/731; 715/732

(58) Field of Classification Search
USPC .................................. 715/716–732
See application file for complete search history.

(56) References Cited

U.S. PATENT DOCUMENTS

| 4,232,311 A | 11/1980 | Agneta | 340/703 |
| 4,242,707 A | 12/1980 | Budai | 358/280 |

(Continued)

FOREIGN PATENT DOCUMENTS

| EP | 0 239 884 A1 | 10/1987 |
| EP | 0 239 884 B1 | 9/1993 |

(Continued)

OTHER PUBLICATIONS

Matt Cristy, "ParkerVision puts together $100,000 exhibit for show", Apr. 7, 1997, Business Journal of Jacksonville, pp. 1-2.*

(Continued)

*Primary Examiner* — Enrique Iturralde
(74) *Attorney, Agent, or Firm* — Robert D. Shedd; Robert B. Levy

(57) ABSTRACT

A production system automates the control of production devices used to produce and broadcast a show. The system automation allows a video director to pre-produce, preview, and produce the live show from a single user interface. In an embodiment, a processing unit displays graphical controls for the production devices. A video director interacts with the graphical controls to thereby remotely control the production devices from one location. In an embodiment, a video director defines a set of production commands or instructions (i.e., "transition macro"). Upon execution, each production command directs the processing unit to transmit in series and/or parallel one or more control commands to one or more of the production devices. Production commands can be included to enable the show to be broadcast live or recorded for on-demand access. Live and/or on-demand productions are distributed over traditional television mediums and/or a computer network, including the Internet.

35 Claims, 33 Drawing Sheets

(56) References Cited

U.S. PATENT DOCUMENTS

| | | | |
|---|---|---|---|
| 4,272,790 A | 6/1981 | Bates | 360/14 |
| 4,283,766 A | 8/1981 | Snyder et al. | 364/525 |
| 4,400,697 A | 8/1983 | Currie et al. | 340/711 |
| 4,488,180 A | 12/1984 | Rabinowitz | 358/183 |
| 4,559,531 A | 12/1985 | Buynak | 340/703 |
| 4,631,590 A | 12/1986 | Yamada et al. | 358/185 |
| 4,689,683 A | 8/1987 | Efron | 358/185 |
| 4,746,994 A | 5/1988 | Ettlinger | |
| 4,768,102 A | 8/1988 | O'Gwynn | 358/311 |
| 4,972,274 A | 11/1990 | Becker et al. | 360/14.1 |
| 4,982,346 A | 1/1991 | Girouard et al. | |
| 5,001,473 A | 3/1991 | Ritter et al. | 340/825.52 |
| 5,036,395 A | 7/1991 | Reimers | 358/185 |
| 5,115,310 A * | 5/1992 | Takano et al. | 358/185 |
| 5,148,154 A | 9/1992 | MacKay et al. | 340/712 |
| 5,166,797 A | 11/1992 | Angell | 358/183 |
| 5,189,516 A | 2/1993 | Angell | 358/181 |
| 5,231,499 A | 7/1993 | Trytko | |
| 5,237,648 A | 8/1993 | Mills et al. | 395/133 |
| 5,262,865 A | 11/1993 | Herz | 358/181 |
| 5,274,758 A | 12/1993 | Beitel et al. | 395/154 |
| 5,307,456 A | 4/1994 | Mackay | 395/154 |
| 5,388,197 A | 2/1995 | Rayner | 395/154 |
| 5,420,724 A | 5/1995 | Kawamura et al. | 360/13 |
| 5,434,678 A | 7/1995 | Abecassis | 358/12 |
| 5,442,749 A | 8/1995 | Northcutt et al. | 395/200.09 |
| 5,450,140 A | 9/1995 | Washino | 348/722 |
| 5,487,167 A | 1/1996 | Dinallo et al. | 395/650 |
| 5,519,828 A | 5/1996 | Rayner | 395/161 |
| 5,537,157 A | 7/1996 | Washino et al. | 348/722 |
| 5,557,724 A | 9/1996 | Sampat et al. | 395/154 |
| 5,559,641 A | 9/1996 | Kajimoto et al. | 360/14.1 |
| 5,565,929 A | 10/1996 | Tanaka | 348/565 |
| 5,577,190 A | 11/1996 | Peters | |
| 5,602,684 A | 2/1997 | Corbitt et al. | 386/52 |
| 5,625,570 A | 4/1997 | Vizireanu et al. | 364/514 |
| 5,659,792 A | 8/1997 | Walmsley | 395/807 |
| 5,659,793 A | 8/1997 | Escobar et al. | |
| 5,664,087 A | 9/1997 | Tani et al. | 345/473 |
| 5,680,639 A | 10/1997 | Milne et al. | 395/806 |
| 5,682,326 A | 10/1997 | Klingler et al. | 364/514 |
| 5,724,521 A | 3/1998 | Dedrick | |
| 5,737,011 A | 4/1998 | Lukacs | 348/15 |
| 5,740,549 A | 4/1998 | Reilly et al. | |
| 5,752,238 A | 5/1998 | Dedrick | |
| 5,754,873 A | 5/1998 | Nolan | |
| 5,761,417 A | 6/1998 | Henley et al. | 395/200.09 |
| 5,764,306 A | 6/1998 | Steffano | 348/586 |
| 5,774,664 A | 6/1998 | Hidary et al. | |
| 5,778,181 A | 7/1998 | Hidary et al. | |
| 5,790,117 A | 8/1998 | Halviatti et al. | |
| 5,801,685 A | 9/1998 | Miller et al. | |
| 5,805,154 A | 9/1998 | Brown | 345/327 |
| 5,826,102 A | 10/1998 | Escobar et al. | |
| 5,833,468 A | 11/1998 | Guy et al. | |
| 5,852,435 A * | 12/1998 | Vigneaux et al. | 345/428 |
| 5,854,887 A | 12/1998 | Kindell et al. | |
| 5,872,565 A | 2/1999 | Greaves et al. | 345/328 |
| 5,875,108 A | 2/1999 | Hoffberg et al. | |
| 5,880,792 A | 3/1999 | Ward et al. | 348/722 |
| 5,892,507 A | 4/1999 | Moorby et al. | 345/302 |
| 5,892,767 A | 4/1999 | Bell et al. | 370/432 |
| 5,918,002 A | 6/1999 | Klemets et al. | 395/182.16 |
| 5,929,849 A | 7/1999 | Kikinis | |
| 5,930,446 A | 7/1999 | Kanda | |
| 5,931,901 A | 8/1999 | Wolfe et al. | |
| 5,987,501 A | 11/1999 | Hamilton et al. | 709/203 |
| 5,999,912 A | 12/1999 | Wodarz et al. | |
| 6,006,241 A | 12/1999 | Purnaveja et al. | 707/512 |
| 6,011,537 A | 1/2000 | Slotznick | |
| 6,018,768 A | 1/2000 | Ullman et al. | |
| 6,026,368 A | 2/2000 | Brown et al. | |
| 6,029,045 A | 2/2000 | Picco et al. | |
| 6,029,194 A | 2/2000 | Tilt | |
| 6,038,573 A * | 3/2000 | Parks | 715/513 |
| 6,064,967 A | 5/2000 | Speicher | |
| 6,084,581 A | 7/2000 | Hunt | |
| 6,084,628 A | 7/2000 | Sawyer | |
| 6,119,098 A | 9/2000 | Guyot et al. | |
| 6,133,309 A | 10/2000 | Bollag et al. | |
| 6,134,380 A | 10/2000 | Kushizaki | |
| 6,141,007 A * | 10/2000 | Lebling et al. | 715/792 |
| 6,146,148 A | 11/2000 | Stuppy | |
| 6,157,929 A | 12/2000 | Zamiska et al. | 707/200 |
| 6,160,570 A | 12/2000 | Sitnik | |
| 6,182,050 B1 | 1/2001 | Ballard | |
| 6,185,538 B1 * | 2/2001 | Schulz | 704/278 |
| 6,188,396 B1 | 2/2001 | Boezeman et al. | 345/302 |
| 6,198,477 B1 | 3/2001 | Kurtze et al. | 345/302 |
| 6,198,906 B1 * | 3/2001 | Boetje et al. | 455/3.01 |
| 6,204,840 B1 | 3/2001 | Petelycky et al. | |
| 6,211,869 B1 * | 4/2001 | Loveman et al. | 715/723 |
| 6,216,112 B1 | 4/2001 | Fuller et al. | |
| 6,223,211 B1 | 4/2001 | Hamilton et al. | 709/203 |
| RE37,342 E * | 8/2001 | Washino et al. | 348/722 |
| 6,315,572 B1 | 11/2001 | Owens et al. | |
| 6,398,556 B1 | 6/2002 | Ho et al. | |
| 6,404,978 B1 * | 6/2002 | Abe | 386/55 |
| 6,437,802 B1 | 8/2002 | Kenny | |
| 6,441,832 B1 | 8/2002 | Tao et al. | |
| 6,442,529 B1 | 8/2002 | Krishan et al. | |
| 6,452,612 B1 | 9/2002 | Holtz et al. | |
| 6,458,060 B1 | 10/2002 | Watterson et al. | |
| 6,469,711 B2 * | 10/2002 | Foreman et al. | 345/723 |
| 6,490,725 B2 | 12/2002 | Kikinis | |
| 6,668,377 B1 | 12/2003 | Dunn | |
| 6,763,523 B1 | 7/2004 | Sacilotto, Jr. et al. | |
| 2002/0170068 A1 | 11/2002 | Rafey et al. | |
| 2003/0206720 A1 | 11/2003 | Abecassis | |

FOREIGN PATENT DOCUMENTS

| | | |
|---|---|---|
| EP | 0 774 756 A2 | 5/1997 |
| EP | 0 774 756 A3 | 5/1997 |
| EP | 0 817 474 A1 | 1/1998 |
| EP | 0 933 893 A1 | 8/1999 |
| GB | 2 323 699 A | 9/1998 |
| WO | WO 87/07108 | 11/1987 |
| WO | WO 98/45789 A1 | 10/1998 |
| WO | WO 98/45792 A1 | 10/1998 |
| WO | WO 99/05821 A2 | 2/1999 |
| WO | WO 99/05821 A3 | 2/1999 |

OTHER PUBLICATIONS

ParkerVision, Preliminary Sale Mannual SSM-963-001-KKM, Product Pricing, Sep. 18, 1996, pp. 1-54.*

ParkerVision, CameraManSTUDIO, Preliminary Sales Mannual, SSM-963-001-KKM, Sep. 18, 1996, pp. 1-29.*

ParkerVision, 1997 annual Report.*

Burghardt, J., "Das Sony-News-System," *Fernseh Und Kinotechnik*, Vde Verlag Gmbh, vol. 50, No. 11, pp. 641-642 and 644-646 (Nov. 1, 1996).

English-language translation of Sections 1, 2 and 3.7 of Burghardt, J., "Das Sony-News-System," *Fernseh Und Kinotechnik*, Vde Verlag Gmbh, 4 Pages (Nov. 1, 1996).

*Avstar and ParkerVision Streamline Broadcast News Production Process: Reducing Costs*, Radio-Television News Directors Association, at http://www.avstartnews.com/news/parker.html, 3 pages (Sep. 29, 1999).

*Avstar BCS*, at httb://www.avstarnews.com/products/bcs/bcs_over.html, 2 pages (last visited Oct. 2, 1999).

*Avstar Fact Sheet*, at http://www.avstarnews.com/about/facts.html, 2 pages (last visited Oct. 2, 1999).

*Avstar MBS*, at http://www.avstarnews.com/products/mbs/mbs_over html, 1 page (last visited Oct. 2, 1999).

*Avstar Products*, at http://www.avstarnews.com/products/products.html, 1 pages (last visited Oct. 2, 1999).

*Avstar™Broadcast Control System*, available at http://www.avstarnews.com/products/bcs/bcs_over.html, 2 pages (last visited Oct. 2, 1999)/.

(56) References Cited

OTHER PUBLICATIONS

*Avstar™Media Browse System*, available at http://www.avstarnews.com/products/mbs/mbs_over.html, 2 pages (last visited Oct. 2, 1999).
*Avstar™Newsroom Computer System*, available at http://www.avstarnews.com/products/ncs/ncs_over.html 2 pages (last visited Oct. 2, 1999).
*Complete Seamless Integration*, at http://www.play.com/trinityNLE/complete.html, 2 pages (last visited Oct. 14, 1999).
*Edit. Sweet.*, at http://www.play.com/trinityNLE/edit.html (last visited Oct. 14, 1999).
*Gizmos98 Home Page*, at http://www.play.com/products/qizmos/index.html, 2 pages (last visited Oct. 14, 1999).
*GlobalCast Communications, Inc.—Solutions*, GlobalCast Communications, at http://www.gcast.com/solutions.shtml, 2 pages (last visited Oct. 15, 1999).
*GlobeCaster*, at http://www.play.com/products/globecaster/index.html 2 pages (last visited Oct. 14, 1999).
*HP Teams With ISVs to Complete Solution Portfolio for Internet Service Providers*, GlobalCast Communications, at http://www.gcast.com/press/11.shtml, 2 pages (Sep. 28, 1998).
*LeaderPlus*, at http://www.avstarnews.com/products/leader/leader_over.html, 2 pages (last visited Oct. 2, 1999).
*Lucent Technologies and GlobalCast Communications Form Strategic Partnership in Reliable Multicast Market*, GlobalCast Communications, at http://www.gcast.com/press/2.shtml, 2 pages (Aug. 25, 1997).
*Newsroom Computer System*, at http://www.avstarnews.com/products/ncs/ncs_over.html, 2 pages (last visited Oct. 2, 1999).
*Play Incorporated Announces Do-It-Yourself Internet Studio*, at http://www.play.com/news/111698-globecaster.html, 2 pages (Nov. 19, 1998).
*Play Incorporated Announces Trinity Live, A Live Production System Based on Advanced Digital Component Switcher and Real-Time Trinity Architecture*, at http://www.play.com/news/091099.html1, 2 pages (Sep. 10, 1999).
*Product Features*, at http://www.play.com/products/globecaster/features.html, 1 page (last visited Oct. 15, 1999).
*Products*, at http://www.play.com/products/index.html, 2 pages (last visited Oct. 14, 1999).
*Products: Trinity*, at http://www.play.com/products/tinity/index/html, 1 page (last visited Oct. 14, 1999).
*Products: Trinity: Digital Effects*, at http://www.play.com/products/trinity/digital.html, 2 pages (last visited Oct. 14, 1999).
*Products: Trinity: Editor*, at http://www.play.com/products/trinity/editor.html, 1 page (last visited Oct. 14, 1999).
*Products: Trinity: Switcher*, at http://www.play.com/products/trinity/switcher.html, 2 pages (last visited Oct. 14, 1999).
*Products: Trinity: Technical Specifications*, at http://www.play.com/products/trinity/techspecs.html, 1 page (last visited Oct. 14, 1999).
*RealProducer Plus G2*, at http://www.real.com/products/tools/producerplus/index.html, 3 pages (last visited Oct. 14, 1999).
*RealProducer Plus G2 Documentation*, at http://www.real.com/products/tools/producerplus/docs.html, 3 pages (last visited Oct. 15, 1999).
*System Requirements*, at http://www.play.com/products/globecaster/sysreq.html, 1 page (last visited Oct. 15, 1999).
*Technical Engineer Speak Specs*, at http://www.play.com/trinityNLE/tech.html, 2 pages (last visited Oct. 14, 1999).
*Trinity NLE Is Here!*, at http://www.play.com/news/100499.html, 2 pages (last visited Oct. 15, 1999).
*Trinity University Opens*, at http://wwww.play.com/news/121797.html, 1 page (last visited Oct. 15, 1999).
*Video Production*, at http://www.winningpost.com.au/html/video_production.html, 1 page (last visited Oct. 14, 1999).
Wolfe, M., *Television Stations, Production Companies Appreciate Trinity's Impressive Features, Low Cost*, at http://www.play.com/news/090299.html, 2 pages (Sep. 2, 1999).
Wolfe, M., *USA Today Runs Extensive Story About GlobeCaster*, at http://www.play.com/news/061699.html, 2 pages (Jun. 16, 1999).

International Search Report for Appl. No. PCT/US01/00547 issued Aug. 28, 2001, 10 Pages.
International Search Report for Appl. No. PCT/US01/10306 issued Jan. 18, 2002, 7 Pages.
Ahanger, G. and Little, T.D.C., "Automatic Composition Techniques for Video Production," *IEEE Trans. On Knowledge and Data Engineering*, vol. 10, No. 6, Nov./Dec. 1998, pp. 967-987.
Hartford, S., "Overcoming Current Limitations of Personal Computers in Replacing Traditional Video Production Equipment," *SMPTE Journal*, vol. 107, No. 1, Jan. 1998, pp. 58-64.
Slack, P.A. et al., "An Integrated Video Production System," *International Broadcasting Convention*, Sep. 12-16, 1996, pp. 403-408.
Vigneaux, S. "The Integration of a Newsroom Computer System with a Server-Centred News Production System," *International Broadcasting Convention*, Sep. 12-16, 1996, pp. 512-518.
Judy, T.A. (Ed.), *LOUTH Automation: Quarterly News*, vol. 1, Issue 2, Jul. 1997.
Judy, T.A. (Ed.), *LOUTH Automation: Quarterly News*, vol. 1, Issue 3, Oct. 1997.
Judy, T.A. (Ed.), *LOUTH Automation: Quarterly News*, vol. 1, Issue 4, Jan. 1998.
Judy, T.A. (Ed.), *LOUTH Automation: Quarterly News*, vol. 1, Issue 5, Mar. 1998.
Judy, T.A. (Ed.), *LOUTH Automation: Quarterly News*, vol. 1, Issue 6, Jul. 1998.
*Air-Boss: Airtime Broadcast Automation* (visited Jul. 13, 1998) <http://www.florical.com/air-boss.html>, 1 page.
*SpotCatcher—Video Server and Cache Management* (visited Jul. 13, 1998) <http://www.florical.com/-spotcatcher.html>, 1 page.
*ShowTimer: Pre-Air Automation* ( visited Jul. 13, 1998) <http://www.florical.com/showtimer.html, 1 page.
*NewsRepeater: Automated News Channel* (visited Jul. 13, 1998) <http://www.florical.com/news-repeater.html>, 1 page.
*TimeShifter:Tape/Disk Network Delay* (visited Jul. 13, 1998) <http://www.florical.com/time-shifter.html>, 1 page.
*Products: Integrated Money Making System* (visited Jul. 13, 1998) <http://www.florical.com/pro-ducts.html>, 2 pages.
*Product Information* (last revised Jun. 17. 1998) <http://www.louth.com/products/index.html>, 1 page.
*ADC-100* (visited Jul. 13, 1998) <http://www.louth.com/products/adc100_info.htm>, 2 pages.
*Video Server Management System* (Copyright 1995, 1996) <http://www.pro-bel.com/corporate/pro-bel_software/product/mapp/>, 4 pages.
Presentation Automation, *The Powerful and Flexible Windows Based Solution*. (Copyright 1995, 1996) <http://www.pro-bel.com/corporate/pro-bel_software/products/automation/cp-4000.htm>, 3 pages.
*Station Automation—Now It's a Snap!*(Copyright 1995, 1996) <http://www.pro-bel.com/corpo-rate/pro-bel_software/products/automation/av-408.htm>, 2 pages.
*Pro-Bel Software: Procion AV-Workbench* (Copyright 1995-1998) <http://www.pro-bel.com/corpo-rate/pro-bel.ltd/products/ShortForm/page3.htm, 8 pages.
U.S. Appl. No. 09/482,683, filed Jan. 14, 2000, Holtz et al.
U.S. Appl. No. 09/634,735, filed Aug. 8, 2000, Snyder et al.
U.S. Appl. No. 09/822,855, filed Apr. 2, 2001, Holtz et al.
U.S. Appl. No. 09/832,923, filed Apr. 12, 2001, Holtz et al.
U.S. Appl. No. 09/836,239, filed Apr. 18, 2001, Holtz et al.
U.S. Appl. No. 10/431,576, filed May 8, 2003, Snyder et al.
U.S. Appl. No. 10/247,783, filed Sep. 20, 2002, Holtz et al.
U.S. Appl. No. 10/434,458, filed May 9, 2003, Snyder et al.
U.S. Appl. No. 10/434,461, filed May 9, 2003, Holtz et al.
U.S. Appl. No. 10/208,810, filed Aug. 1, 2002, Holtz et al.
U.S. Appl. No. 10/434,460, filed May 9, 2003, Snyder et al.
"About Yahoo! Broadcast," *Yahoo!® Broadcast* [online], 2000 [retrieved on Apr. 26, 2001]. Retrieved from the Internet:<URL: http://business.broadcast.com/about_2.html, 1 page.
"Advantages," *Yahoo!® Broadcast* [online], 2000 [retrieved on Apr. 26, 2001]. Retrieved from the Internet: <URL:http://business.broadcast.com/advantages.html, 3 pages.
"Content and Conversation," *Yahoo!® Broadcast* [online], [retrieved on Apr. 26, 2001]. Retrieved from the Internet: <URL:http:business.broadcast.com/sanders_sprint/frameset/html, 1 page.

(56) References Cited

OTHER PUBLICATIONS

Festa, P., "Flood of spending due for streaming video," *Yahoo!®News* [online], Apr. 12, 2001 [retrieved Apr. 26, 2001]. Retrieved from the Internet:<URL: http://dailynews.yahoo.com/h/cn/20010412/tc/flood_of_spending_due_for_streaming_video_1.html, 2 pages.

Mannes, G., "Yahoo! Joins Suddenly Crowded Online Music Field," *AOL Personal Finance* [online], Apr. 5, 2001 [retrieved Apr. 26, 2001]. Retrieved from the Internet:<URL: http://aol.thestreet.com/tech/internet/1379000.html, 3 pages.

Mannes, G., "Chasing Sweet Semel of Success Takes Yahoo! to Hollywood," *AOL Personal Finance* [online], Apr. 17, 2001 [retrieved Apr. 26, 2001]. Retrieved from the Internet:<URL: http://aol.thestreet.com/tech/internet/1393298.html, 3 pages.

"Overview," *Yahoo! ® Broadcast* [online], 2000 [retrieved Apr. 26, 2001]. Retrieved from the Internet: <URL:http://business/broadcast.com/overview.html, 2 pages.

Weisman, R., "Yahoo's Latest: New Broadcast Site," *Yahoo!® News* [online], Apr. 23, 2001 [retrieved Apr. 26, 2001]. Retrieved from the Internet:<URL: http://dailynews.yahoo.com/h/nf/20010423/tc/9176_1.html, 3 pages.

"Webcasting 101," *Yahoo! ® Broadcast* [online], 2000 [retrieved Apr. 26, 2001]. Retrieved from the Internet:<URL: http://business.broadcast.com/webcasting101.html, 3 pages.

"Welcome," *Yahoo!® Broadcast* [online], 2000, [retrieved Apr. 26, 2001]. Retrieved from the Internet:<URL: http://business.broadcast.com/, 1 page.

"Welcome to Yahoo! Broadcast," *Yahoo!® Broadcast* [online], 2001 [retrieved Apr. 26, 2001]. Retrieved from the Internet:>URL: http://mediaframe.yahoo.com/launch?lid=wmv-56-p.902530-41362,wmv-100-p.902531-4136.../index2htm, 1 page.

Wine, W., Dr., "What is I Love TV™?," *iLoveTV Inc.* [online], [retrieved Jun. 12, 2001]. Retrieved from the Internet:>URL: http://209.47.14.231/whatis.html, 1 page.

Humphries, M., "The Options.," *iLoveTV Inc.* [online], [retrieved Jun. 12, 2001]. Retrieved from the Internet:>URL: http://209.47.14.231/possible1.html, 1 page.

Wine, W., Dr., "The Benefits," iLoveTV Inc. [online], [retrieved Jun. 12, 2001]. Retrieved from the Internet:>URL:http://209.47.14.231/benefit.html, 1 page.

"Contact Us," *iLoveTV Inc.* [online], [retrieved Jun. 12, 2001]. Retrieved from the Internet:>URL: http://209.47.14.231/contact.html, 1 page.

"Press Releases," *iLoveTV Inc.* [online], Jun. 5, 2001 [retrieved Jun. 12, 2001]. Retrieved from the Internet:>URL: http://209.47.14.231/press.html, 1 page.

Park, I., "I Love TV: Cutting Edge Technology Unites the Power of Television and the Internet," *iLoveTV Inc.* [online], Jun. 5, 2001 [retrieved Jun. 12, 2001]. Retrieved from the Internet:>URL: http://209.47.14.231/press_cuttingEdge.html, 2 pages.

"Yahoo to Unveil New Broadcast Site," *Yahoo!® News* [online], Apr. 23, 2001 [retrieved Apr. 26, 2001]. Retrieved from the Internet:>URL: http://dailynews.yahoo.com/h/nm/20010423/tc/yahoo_broadcast_dc_1.html, 2 pages.

"Yahoo! Events," *Yahoo!® Events* [online], Apr. 26, 2001 [retrieved Apr. 26, 2001]. Retrieved from the Internet:>URL: http://events.yahoo.com/, 2 pages.

"Welcome to Yahoo! Radio," *Yahoo!® Radio* [online], [retrieved Apr. 26, 2001]. Retrieved from the Internet:>URL: http://radio.broadcast.com/, 2 pages.

International Search Report for Appln. No. PCT/US02/12048 issued Sep. 18, 2002, 6 pages.

International Search Report for Appln. No. PCT/US02/24929 issued Dec. 4, 2002, 6 pages.

International Search Report for Appln. No. PCT/US02/29647 issued Dec. 11, 2002, 1 page.

International Search Report for Appln. No. PCT/US03/14427 issued Oct. 17, 2003, 6 pages.

International Search Report for Appln. PCT/US01/00547, issued Aug. 28, 2002, 10 pages.

International Search Report for Appln. No. PCT/US01/10306, issued Jan. 18, 2002, 6 pages.

Maar, Joseph, "Newscast Without a Crew," Television Broadcast, Oct. 1998.

Declaration of Alex Holz under 35 USC § 1.56, Feb. 2, 2001.

CameraMan Studio, ParkerVision, CSS-2000-N/P, Apr. 1997.

ParkerVision Beta License Agreement for CameraMan STUDIO Sytems, ParkerVision, Dec. 19, 1997.

CameraMan Studio System II Broadcast Production Systems, ParkerVision, CSS-2000, CSS-2313, CSS-2017, Oct. 1997.

* cited by examiner

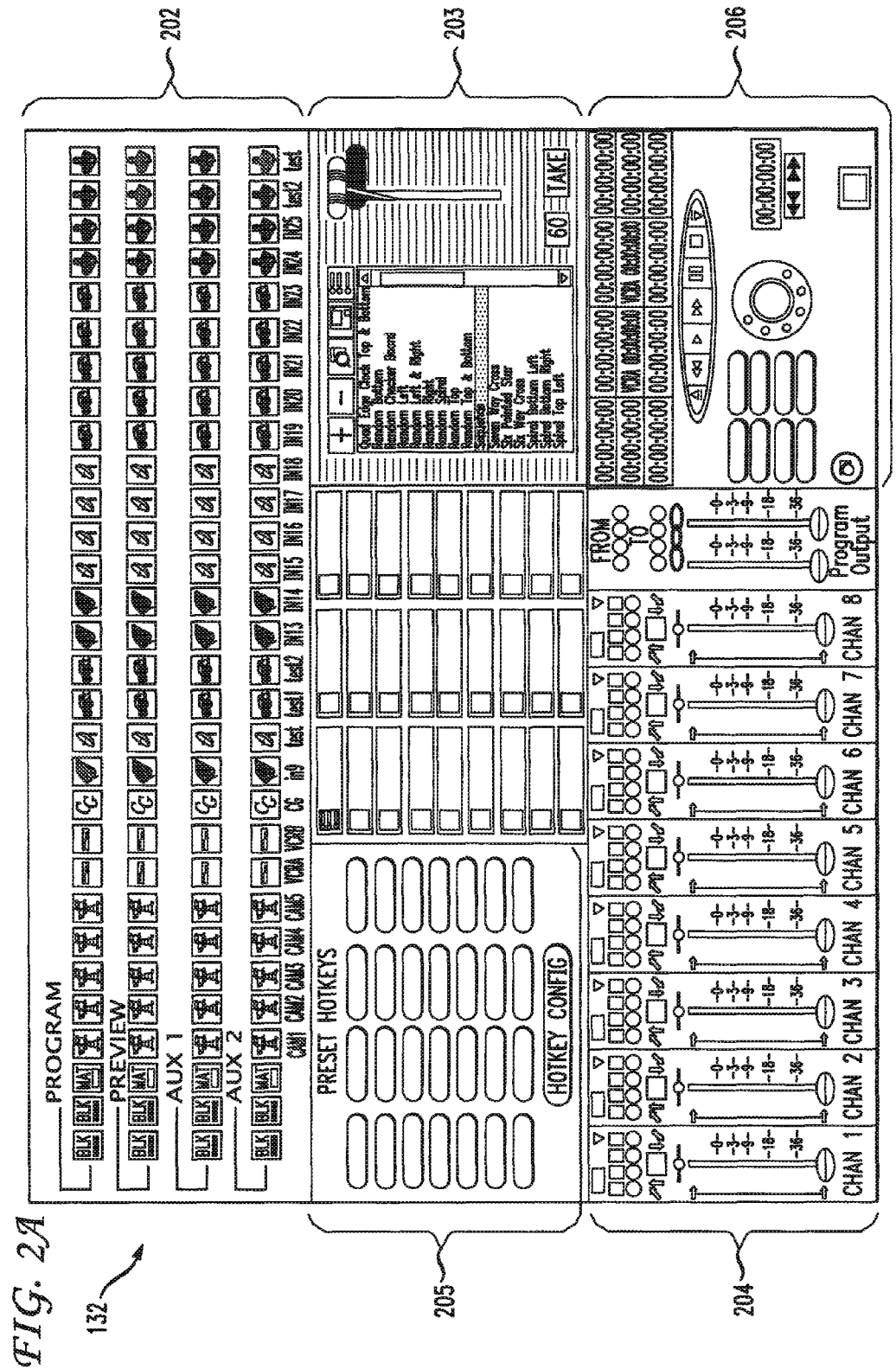

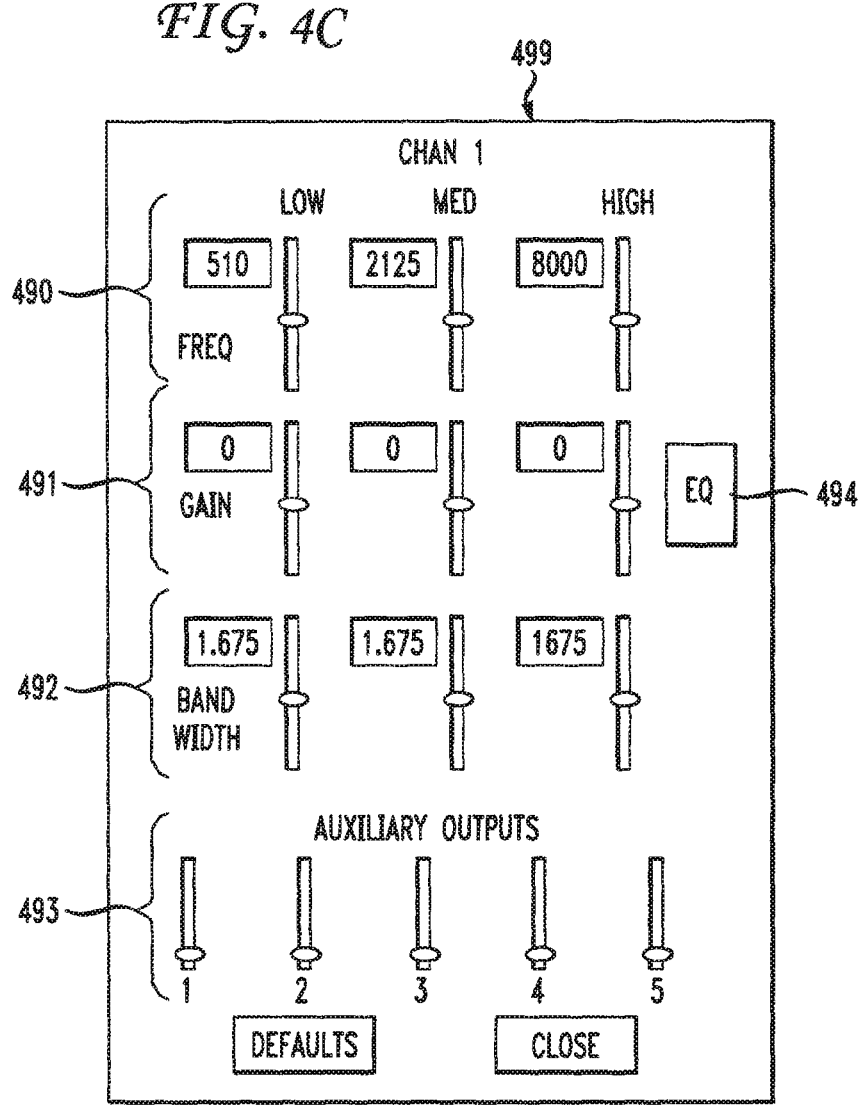

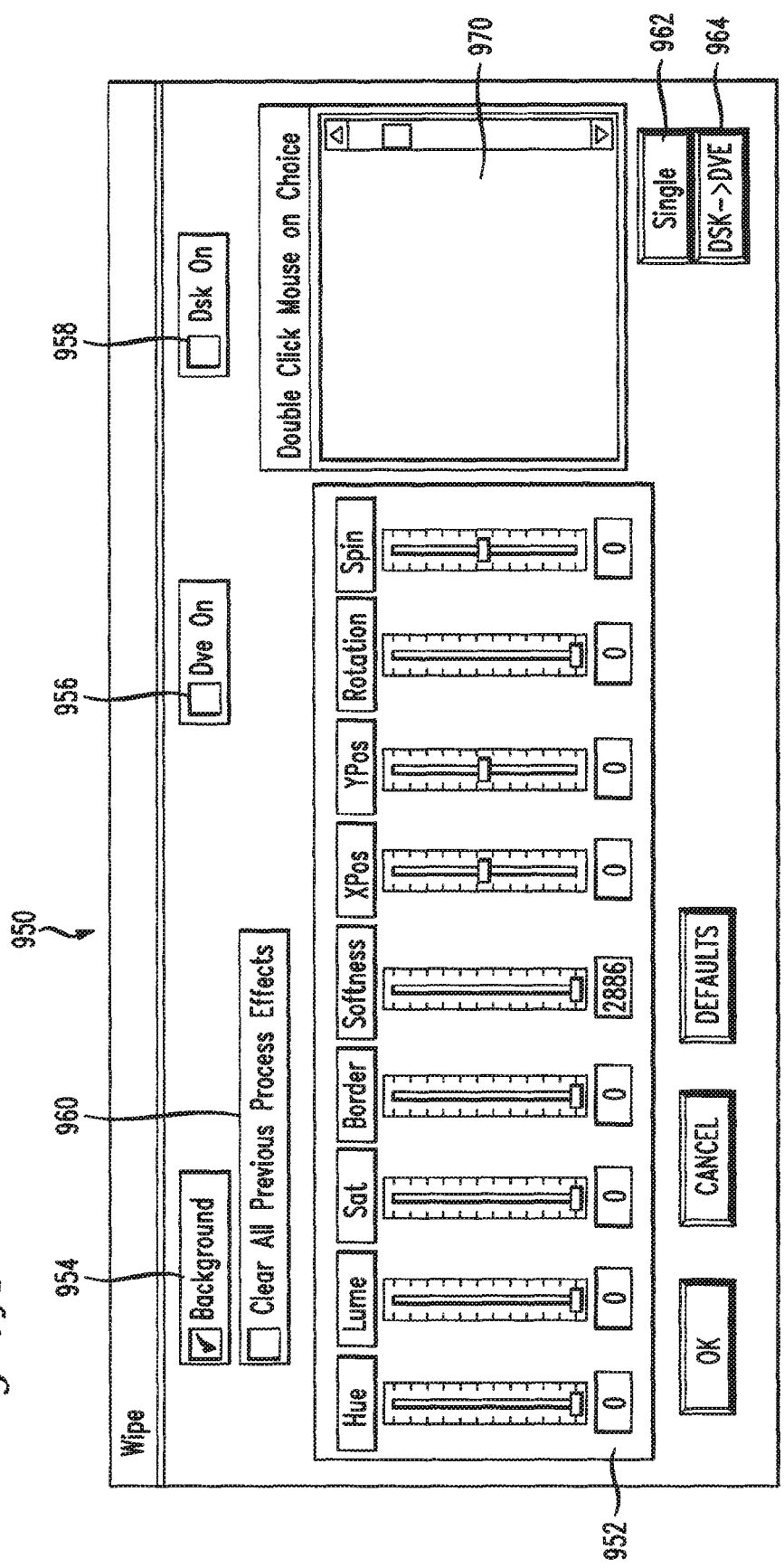

GUI
133

SYSTEM AND METHOD FOR REAL TIME VIDEO PRODUCTION AND DISTRIBUTION

This application is a continuation-in-part of U.S. patent application Ser. No. 09/482,683, entitled "System and Method for Real Time Video Production and Multicasting," filed Jan. 14, 2000 now U.S. Pat. No. 6,952,221, by Holtz et al., which is a continuation-in-part of U.S. patent application Ser. No. 09/215,161, filed Dec. 18, 1998 now U.S. Pat. No. 6,452,612, both of which are incorporated by reference herein.

BACKGROUND OF THE INVENTION

1. Field of the Invention

The present invention relates generally to video production, and more specifically, to a system, method and computer program product for automating the execution of a live or live-to-tape video show.

2. Related Art

Conventionally, the execution of a live or live-to-tape video show, such as a network news broadcast, talk show, or the like, is largely a manual process involving a team of specialized individuals working together in a video production environment having a studio and a control room. The video production environment is comprised of many diverse types of video production devices, such as video cameras, microphones, video tape recorders (VTRs), video switching devices, audio mixers, digital video effects devices, teleprompters, and video graphic overlay devices, etc. The basics of video production techniques is described in "Television Production Handbook," Zettl, 1997 Wadsworth Publishing Company, which is incorporated herein by reference.

In a conventional production environment, the video production devices are manually operated by a production crew (which does not include the performers and actors, also known as the "talent") of artistic and technical personnel working together under the direction of a director. A standard production crew is made up of nine or more individuals, including camera operators (usually one for each camera, where there are usually three cameras), a video engineer who controls the camera control units (CCUs) for each camera, a teleprompter operator, a character generator operator, a lighting director who controls the studio lights, a technical director who controls the video switcher, an audio technician who controls an audio mixer, tape operator(s) who control(s) a bank of VTRs, and a floor director inside the studio who gives cues to the talent. Typically, the director coordinates the entire production crew by issuing verbal instructions to them according to a script referred to as a director's rundown sheet. Generally, each member of the production crew is equipped with a headset and a microphone to allow constant communication with each other and the director through an intercom system.

During the execution of a live or live-to-tape video show, the production crew must perform multiple parallel tasks using the variety of video production devices. Furthermore, these tasks must all be coordinated and precisely synchronized according to very strict timing requirements. Coordination between the production crew, the director and the talent is vitally important for the successful execution of a show. Accordingly, the logistics of executing a show are extremely difficult to plan and realize.

Executing a show is extremely susceptible to errors. The industry knows that errors are generally expected to occur during the execution of a show. Accordingly, experienced production crews not only attempt to reduce the frequency of errors, but also attempt to react quickly in taking corrective action so that the inevitable errors that do occur are unnoticed by the viewing audience. However, it is quite apparent by watching live television broadcasts that this goal is not always met.

Another problem with the conventional production environment is that the director does not have total control in executing a show because of the director's reliance on the production crew. The production crew does not always follow the instructions of the director due to mis-communication and/or misinterpretation of the director's cues. Further, the director cannot achieve certain desired transitions and sophisticated or enhanced visual effects because of the real time nature of the execution of the show and the fast paced/short time available.

The real time nature of the execution of the show creates great stress for the director, the production crew, and the talent. Everyone is extremely concerned about failure. The real time nature of the execution of the show also necessitates re-creation of the format, including transitions and special effects, for the show.

Another drawback of the conventional production environment, is that failure of any member of the production crew to be present for the execution of the show may prevent or hamper the show from occurring as planned. Thus, directors constantly worry about whether crew members will show up for work, particularly on weekends and holidays.

Conversely, there are situations in other than broadcast environments, such as business television and video training environments, where due to downsizing or budgetary constraints the number of available personnel for the production crew is so limited that shows cannot be produced with high quality.

Producing live or live-to-tape video shows is very expensive because of the large size of the video production crew. The compensation to the individuals that make up the production crew is substantial, and can run in the range of several Million dollars per year for the entire crew. Furthermore, the compensation for a member of a production crew is commensurate with the video market of the station. The level of compensation for the top markets is substantially higher than for the lesser markets, and the compensation for network affiliates is higher than independent broadcasters and cable networks. This disparity in compensation produces frequent turnover in production crew personnel causing a director to frequently hire and train new members of the crew.

Another disadvantage with the conventional production environment is the inability to preview the show. That is, it is costly and impractical for the production crew to rehearse the show prior to its execution. The talent and the director cannot preview the transitions in a succinct manner.

Therefore, what is needed is a video production system and method that addresses the above problems.

Definitions of Terms

Certain terms used in this document have specific meanings as follows:

"Activating an icon" means selecting or triggering the icon.

"Button" is an icon that is intended to represent an electrical push-button appearing as part of a graphical user interface. Moving a mouse pointer over the graphical button and pressing one of the physical mouse buttons starts some software action.

"Execution of a show" means the implementation of the steps necessary to broadcast the show or record it in any tangible medium of expression.

"Frame" a frame is one-thirtieth of a second.

"Graphical Controls" are one or more icons used for controlling a video production device.

"Hot-key" is a programmable icon.

"Icon" means a small picture intended to represent something in a graphical user interface. When an icon is clicked on with a mouse, for example, some action is performed. Icons are usually stored as bitmaps, but of course can be stored using other formats.

"Pre-production" is the planning process whereby the video director plans the steps necessary to execute the show.

"Show" is a live or live-to-tape production.

"Show template" is a stored file of a transition macro that can be used in whole or in part as a starting point to produce another show.

"Transition macro" means a set of video production commands, where each video production command is transmitted from a processing unit to a video production device. Transition macro also refers to a set of icons that have been dragged and dropped (i.e., assembled) onto the control lines of a transition macro time sheet.

"Video production command" is any command or instruction that controls a video production device.

SUMMARY OF THE INVENTION

The present invention solves the above identified problems in conventional systems by providing an integrated video production system, method and computer program product (referred to collectively as "video production system" or "present invention" for purposes of brevity) for automating the execution of a live or live-to-tape video show. The video production system is integrated such that a single person ("a video director") has control over all video production devices used in executing the show. Such devices include, but are not limited to, video cameras, robotic pan/tilt heads, video tape players and recorders (VTRs), video servers and virtual recorders, character generators, still stores, digital video disk players (DVDs), digital video effects (DVE), audio mixers, audio sources (e.g., CD's and DAT's), video switchers, and teleprompting systems.

The automation capability provided by the video production system allows the video director to pre-produce a live show (such as a news show or talk show), preview the show in advance of "air time", and then, with a touch of a button or other trigger, execute the live show. Consequently, a live show or live-to-tape show can be executed more cost efficiently, with greater control over logistics and personnel, with enhanced functionality and transitions, in less time and with less stress, and with fewer people and fewer human errors than was previously possible. The present invention also allows the video director to reuse formats of prior shows by leveraging show templates.

In an embodiment, a video production system is provided having a processing unit in communication with and/or controlling one or more of the video production devices mentioned above. The processing unit displays on a monitor or other display device a graphical user interface (GUI) that consists of graphical controls for controlling the video production devices that it is in communication with. The graphical controls are made up of icons that the video director activates to control a video production device. The video director uses a keyboard and mouse or other input device or interface (including voice activated, touch screen, heads up display, etc.) to activate the icons, and thereby remotely control the video production devices. In this manner, a director is given control over video production devices used in executing a show.

The processing unit also enables the video director to automate the execution of a show. According to an embodiment, the video director pre-produces the show to create a director's rundown-sheet, creates a transition macro, which specifies one or more video production commands, and instructs the processing unit to execute the transition macro. Executing a transition macro means transmitting the one or more video production commands that are specified by the transition macro to the appropriate video production devices.

Upon receiving a video production command, a video production device performs the function corresponding to the received command. In this manner, the processing unit provides automated control of the video production devices, and thereby provides a system for automating the execution of a show in real time. This feature provides the director with the advantage of not having to rely on a production crew to execute a show. The cost and time savings this feature provides are therefore substantial. Additionally, the human errors that normally occur during the execution of a show are no longer an issue.

Advantageously, the invention may include a timer and means for associating a timer value with each video production command specified by the transition macro, thereby creating a timer driven transition macro. In this embodiment, a video production command is transmitted to a video production device only when the timer reaches the timer value associated with the video production command. An advantage of this feature is that the video production commands are scheduled according to the timer. The timer is activated by the video director activating a timer start icon displayed by the processing unit or is activated by the processing unit receiving a timer start command from an external system, such as a teleprompting system. The timer can also be stopped at any point in time, thereby providing the video director with control over the execution of a transition macro.

In an embodiment, the processing unit is programmed to provide a transition macro graphical user interface (GUI) that enables the director to easily create timer driven transition macros. The transition macro GUI includes a transition macro time sheet, which includes a plurality of control lines. Each of the control lines corresponds to a video production device in a preferred embodiment. In an alternate embodiment, each control line may correspond to multiple devices. The video director creates a transition macro by placing one or more icons from the graphical controls described above onto the control lines. A method for placing an icon onto a control line includes dragging and dropping the icon onto the control line. The group of icons placed onto the control lines is referred to as the transition macro. Each icon is associated with a timer value, with one or more video production commands, or with one or more video production devices.

A video production command may involve (but is not limited to) performing a video switch with a defined transition effect; audio mixing; controlling a camera, such as controlling a camera's pan, tilt, zoom and focus; transmitting an external machine control command (via communication protocols) such as a play, search and stop command for VTRs, video servers/virtual recorders, digital video devices (DVD)s, and digital audio tape (DAT) and cassette equipment; controlling a teleprompting system; recalling graphics by I.D. number from a character generator and/or still store; or transmitting general purpose interface commands for input/output contact closures (momentary and latching) to control external equipment without the need for using a communications protocol.

Once a director creates a transition macro (that is, places icons onto control lines), the director can execute the transition macro in either a full automation mode (single button press) or a semi-automatic mode (multiple button press). It should be noted that a transition macro, whether executed in full automation mode or semi-automatic mode, can always be overridden by manual control. That is, the video director always has the ability to manually control a video production device, regardless of whether a transition macro is in the process of being executed.

Executing the transition macro means directing the processing unit to transmit the video production commands associated with the icons that form the transition macro to the appropriate video production devices in a predefined sequence. The sequence in which the video production commands are transmitted is determined by the arrangement of the icons on the control lines. The arrangement of the icons on the control lines determines the timer value of each icon.

A feature called transition macro "step marks" allows the director to execute a transition macro in semi-automatic mode by splitting a transition macro into two or more transition macro segments, where each transition macro segment includes a group of icons. Typically, each transition macro segment corresponds to a line item segment command from a director's rundown sheet. To execute a particular transition macro segment, the video director activates ("steps" through) the step mark preceding the transition macro segment.

According to one feature, a transition macro may be modified while a show is executing. This feature allows a producer to modify the content of a show in real time. For example, it allows the producer to introduce a late breaking news segment or the like into a news broadcast. That is, while the transition macro is executing, the video director may insert icons or predefined transition macro segments (multiple icons representing a line item on the director's rundown sheet) into an executing transition macro. Additionally, the director can change icon properties and delete icons and segments.

Another feature is that a transition macro can be stored as a file and later retrieved and modified. This allows a video director to store "show templates." A show template is a generic transition macro that can be re-used many times to produce a variety of different shows. By storing show templates, new shows can easily be produced by leveraging a previously created transition macro. The video director recalls the template by file name, makes the necessary modifications as required (according to the new producer/director rundown sheet) and saves the transition macro with a new file name. Leveraging "show templates" can save time, improve quality, and preserve format consistency.

Advantageously, the present invention provides means for creating a transition macro play-list. A transition macro play-list is a queue of two or more transition macros. The play-list can be specified as either automatic or manual. If a play-list is automatic, then once a transition macro in the play-list finishes executing, the next transition macro from the play-list is automatically executed. If a transition macro play-list is manual, then once a transition macro in the play-list is executed, the next transition macro in the play-list is loaded and is ready to be executed by the director, such that the director need only activate a start button to execute the next transition macro. The advantage of the transition macro play-list feature is that it enables the director to produce a show using multiple transition macros. Consequently, instead of creating one very large transition macro to execute a show, a director can create several small and more manageable transition macros to execute the show.

A transition macro or a segment of a transition macro can be associated with one of many transition macro "hot-keys". When a transition macro hot-key is activated by the director, the transition macro or the transition macro segment associated with the activated transition macro hot-key is automatically inserted into the current transition macro. The director can activate a transition macro hot-key at any time, even while a show is in progress. A further feature is that each transition macro hot-key has an associated label for identifying each hot-key. Transition macro hot-keys are typically used for "late breaking news" stories that come in late or even after the show begins. In addition, the transition macro hot-keys, once configured, can also be used to assemble new transition macros.

The present invention also provides a teleprompting system having a processing unit, a monitor or other display device, a keyboard, a mouse, and one or more flat panel display screens. The processing unit displays a script editor on the monitor. A user creates teleprompting scripts using the script editor. Once a teleprompting script has been created, the user can direct the processing unit to scroll the teleprompting script within the display screen(s) for the "talent" to read.

Advantageously, the script editor provides a means for a video director to insert commands into a teleprompting script. When a script reaches a predetermined point on the display screen(s), the command is executed. There are two types of commands available on the script editor. They are script commands and transition macro commands. Script commands act upon the teleprompting script itself, such as pausing, delaying, cuing and stopping the script. Transition macro commands "trigger" the transition macro timer. That is, when the teleprompting system executes a transition macro command, the teleprompting system transmits a "trigger" or "timer start" command to the video production system processing unit, which then starts the transition macro timer if the timer was previously stopped at a step mark.

Both the video production system processing unit and the teleprompting system processing unit can send and receive commands to each other. This allows the video production system processing unit to communicate with and control the teleprompting system, and the teleprompting system can trigger the activation of the transition macro timer.

Another advantage of the teleprompting system is that it provides two script modes: single script mode and multi-script mode. Single script mode is used for general production applications, whereas multi-script mode is better suited for a newsroom application. In the multi-script mode, a script "play-list" is used to import multiple teleprompting scripts, organize them in a desired order, and then play them in that order. Teleprompting scripts are dragged and dropped into the play-list via the mouse. Once the scripts are added to the play-list, they are automatically converted from standard text format to rich text format for display on the teleprompter display screen(s). In addition, the conversion process can also change the font size and an option for bold or standard can be selected. This feature allows for multiple reporters/writers to develop scripts in parallel and organize them to correlate with the producer/director rundown sheet. In addition, the teleprompting system allow for ASCII text output through a serial port to an external closed captioning encoder for displaying close captioning information on the program transmission.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 2A illustrates graphical user interface 132.

FIG. 4C illustrates an exemplary equalizer.

FIGS. 9A-C illustrate an exemplary video transition configuration window.

DETAILED DESCRIPTION OF THE PREFERRED EMBODIMENTS

Overview of the Video Production System

Figure 1:
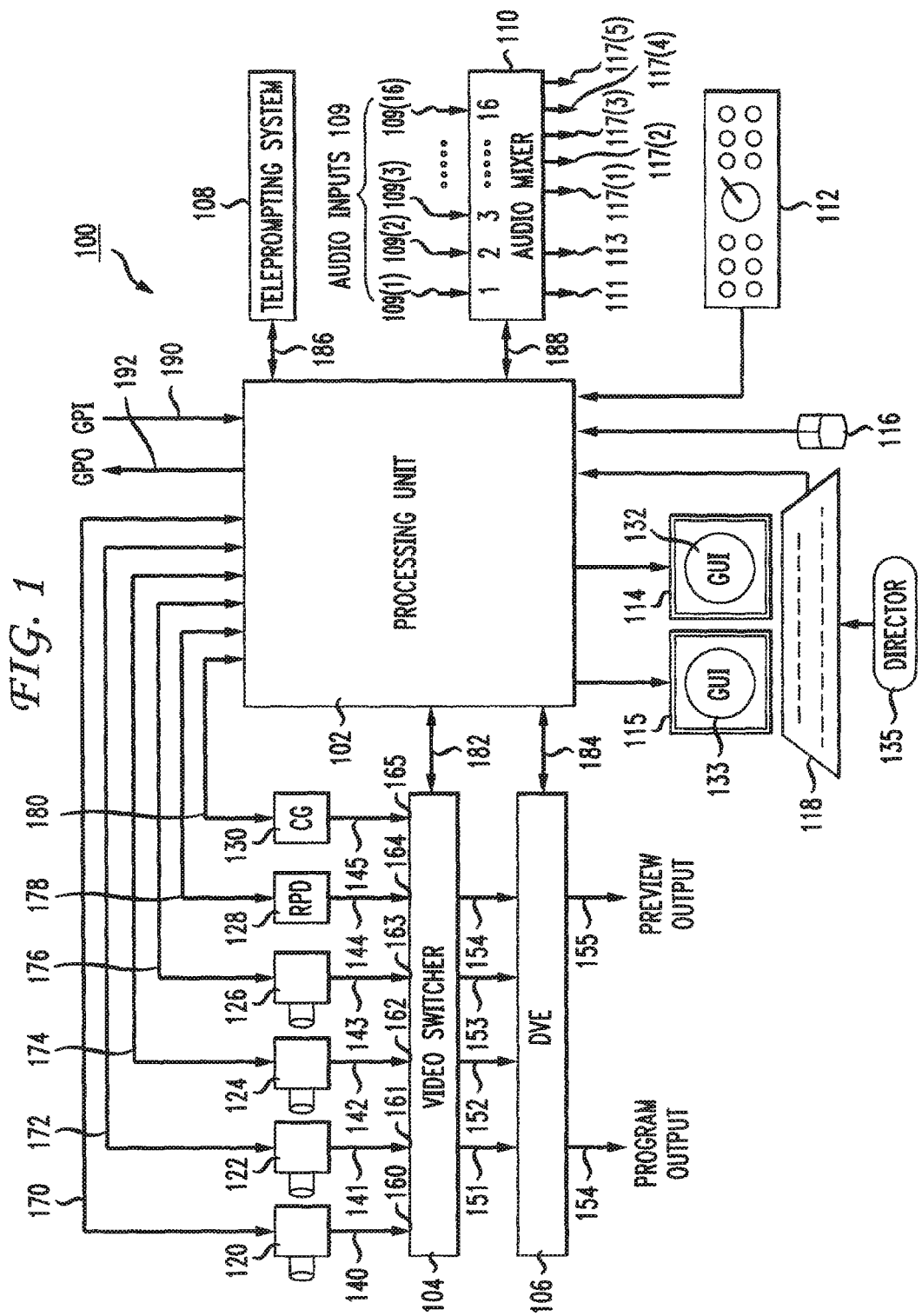
FIG. 1 illustrates one embodiment of an integrated, fully automated video production system.

FIG. 1 illustrates, according to one embodiment of the present invention, an integrated video production system 100 for automating the execution of a show. The present invention contemplates analog and digital video environments. As shown in FIG. 1, video production system 100, in a representative embodiment, includes a processing unit 102 in communication with a variety of video production devices. Such video production devices include, but are not limited to, a video switcher 104; a digital video effects device (DVE) 106; an audio mixer 110; a teleprompting system 108; video cameras and robotics (for pan, tilt, zoom, focus, and iris control) 120, 122, 124, and 126; a record/playback device (RPD) 128; and a character generator and/or still store 130. RPD 128 can be a video tape recorder/player (VTR), a video server, a virtual recorder (VR), a digital audio tape (DAT) recorder, or any device that stores, records, generates or plays back via magnetic, optical, electronic, or any other storage media. Lines 170-188 represent logical communication paths between processing unit 102 and the video production devices 104-130 listed above.

While the above is a representative list of video production devices that can be used in the present invention, it should be understood that any other video production device, including, but not limited to, studio lighting devices, news automation devices, master control/media management automation systems, commercial insertion devices, compression/decompression devices (codec), video recorders/servers, and virtual sets, could be easily included and would not change the scope of the invention. Any presently available or future developed device that is responsive to a general purpose interface is encompassed by the present invention. In addition, live feeds (such as field news reports, news services, sporting events, etc.) from any type of source, including satellite, terrestrial (fiber optic, copper, coaxial, etc.), radio, microwave or any other form or method of video transmission, can be provided in lieu of video production devices in accordance with the present invention. The following books describe representative video production devices and methods and each is incorporated herein by reference: J. Van Tassel, "Advanced Television Systems," Butterworth-Heinemann, 1996; M. Robin and M. Poulin, "Digital Television Fundamentals," McGraw-Hill, 1998; A. Inglis and A. Luther, "Video Engineering," McGraw-Hill, 1996 (second edition); K. Blair Benson, "Television Engineering Handbook," McGraw-Hill, 1992 (revised edition); Zettl, "Television Production Handbook," Wadsworth, 1997 (sixth edition).

In one embodiment of the present invention, processing unit 102 communicates with standard video production devices using the Sony Betacam™ protocol from Sony Corp., Tokyo Japan, or the Chyron® intelligent interface protocol, from Chyron Corp., Melville, New York. However, the present invention can accommodate any presently available or future developed protocol for communicating and/or controlling with video production devices.

There is also provided a general purpose input (GPI) interface 190 and a general purpose output (GPO) interface 192 for communicating with video production devices, such as character generators, virtual video recorders, cue tone encoders, master control switchers and media management automation systems and any other equipment that can accept as an input and/or output either momentary or latching general purpose interface triggers. In one embodiment, GPI 190 receives an electrical pulse signal and can be configured to trigger on the rise of the pulse signal, the fall of the pulse signal or on both the rise and fall of the pulse signal. GPO 192 is a contact closure that can be configured as a momentary or latching contact closure. It is also contemplated that GPI 190 and GPO 192 can accommodate other signaling schemes.

Because processing unit 102 is in communication with video production devices 104-130, processing unit 102 can send video production commands to and receive information from those video production devices. Processing unit 102, therefore, provides a means of centrally controlling each of the video production devices 104-130.

A video director 135 uses processing unit 102 to produce a show. In an embodiment, processing unit 102 displays graphical user interfaces (GUIs) 132 and 133 on display devices 114 and 115, respectively. In another embodiment, processing unit displays GUIs 132 and 133 together on a single display device.

GUIs 132 and 133 display graphical controls corresponding to the video production devices 104-130. In one embodiment of the present invention, video director 135 uses a keyboard 118 and a mouse 116 to interact with the processing unit 102 by manipulating the graphical controls of GUI 132, 133. In another embodiment, the video production system of the present invention is configurable to receive verbal commands to execute various tasks during video production. Using a rule-based expert system, processing unit 102 enables GUIs 132 and 133 to identify the voice of video director 135 to recognize and process verbal commands to activate the graphical control. In response to video director 135 activating a graphical control from GUI 132 or 133, processing unit 102 transmits a video production command to the video production device corresponding to the activated graphical control. In this manner, video director 135 centrally controls the operation of each of the video production devices.

Figure 2B:
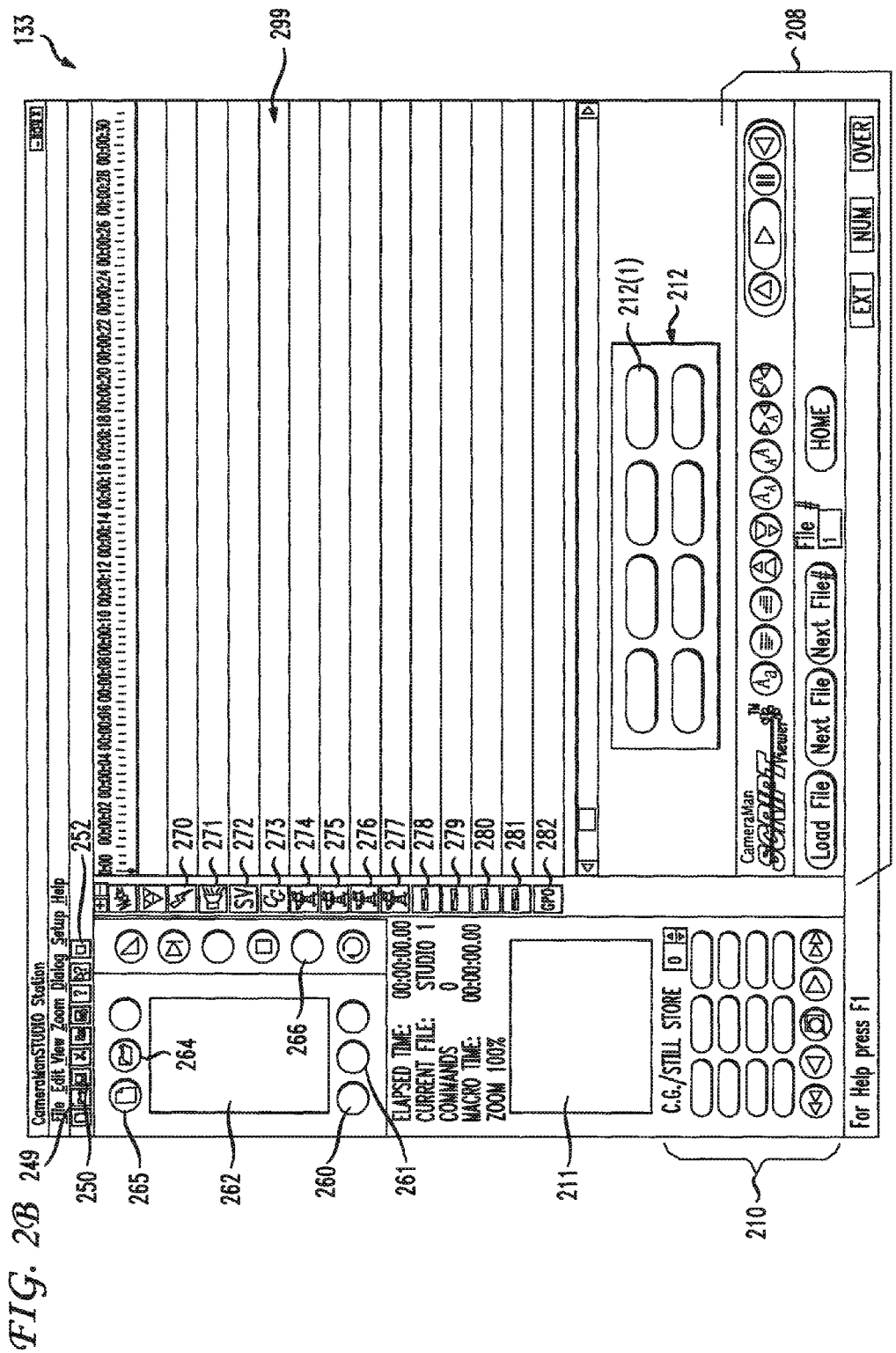
FIG. 2B illustrates graphical user interface 133.

FIGS. 2A and 2B illustrate a first embodiment of GUI 132 and a first embodiment of GUI 133, respectively. GUI 132 includes video switcher graphical controls 202 for controlling video switcher 104 and DVE 106; audio mixer graphical controls 204 for controlling audio mixer 110; RPD graphical controls 206 for controlling up to twelve RPDs; camera graphical controls 205 for controlling one or more cameras that are in communication with processing unit 102; and DVE controls 203 for controlling DVE 106. GUI 133 includes teleprompting system graphical controls 208 for controlling teleprompting system 108 and character generator (CG) graphical controls 210 for controlling one or more character generators, such as CG 130.

Video Switcher Graphical Controls

Figure 3:
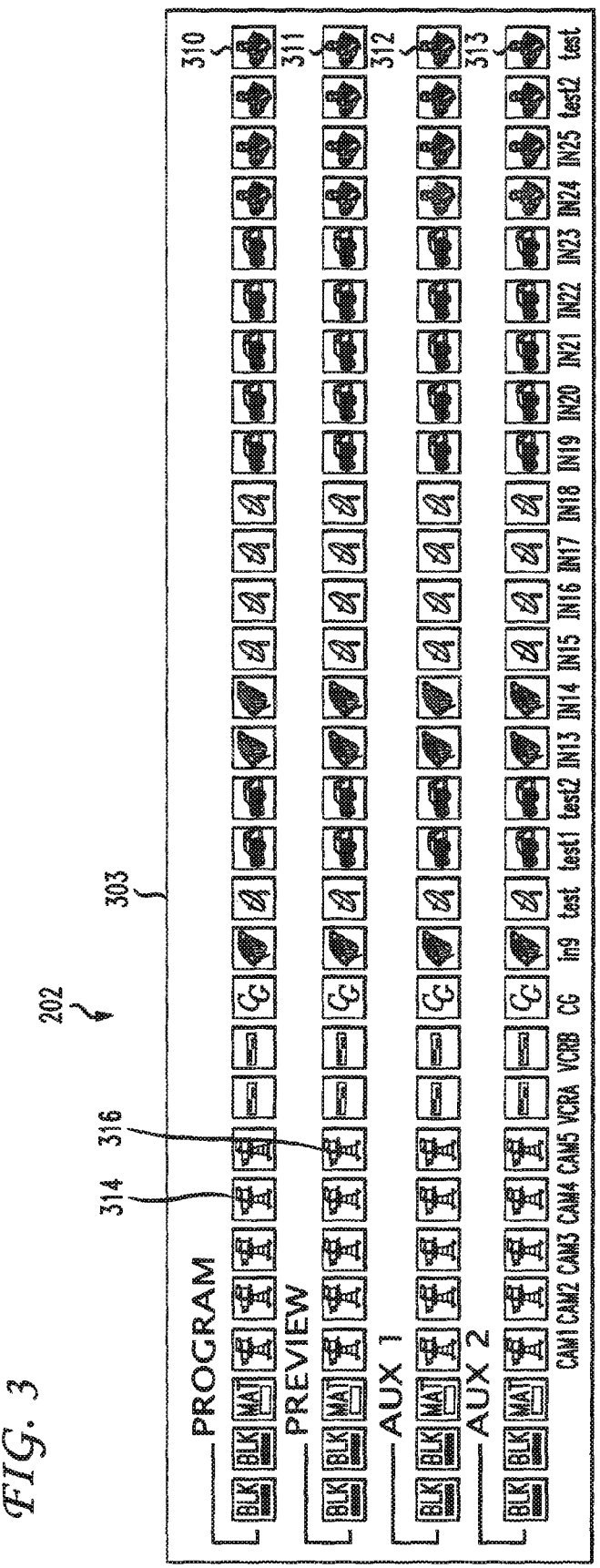
FIG. 3 illustrates exemplary video switcher graphical controls.

FIG. 3 further illustrates video switcher graphical controls 202. In one embodiment, video switcher controls 202 include four rows 310-313 of thirty selectable video source icons 303. Each video source icon 303 typically corresponds to a video input port of video switcher 104. In a preferred embodiment, some video source icons 303 can be internally generated such as black, matte patter, and test pattern. Further, each video source icon 303 can be configured with a graphics picture of a camera, an RPD, a satellite, a CG, a truck, or other type of video source for easy identification by video director 135.

In a preferred embodiment, video switcher 104 includes thirty (30) video input ports. However, for illustration purposes, only six video input ports 160-165 are shown. Video switcher 104, however, can support any number of video input ports. For example, in one embodiment, video switcher 104 supports only 8 video input ports. Referring again to FIG. 1, video input ports 160-165 of video switcher 104 can accept analog and/or digital video signals. Further, the video input ports 160-165 can be of the composite, component, or Y/C type.

Each video input port 160-165 can be connected to a video source. A video source is any device that produces a video signal of any type. Such devices include, but are not limited to, RPD's VTRs, cameras, DVDs, compression/decompression devices (codec), video recorder/server, and character generators. Any combination of these devices may be connected to video switcher 104. For example, as illustrated in FIG. 1, video outputs 140-143 from cameras 120-126 are connected to video input ports 160-163, respectively. A video output 144 of RPD 128 is connected to video input port 164. And video output 145 of character generator (CG) 130 is connected to video input port 165.

Referring again to FIG. 3, the four rows of video source icons 303 include a program row 310, a preview row 311, a first auxiliary row 312, and a second auxiliary row 313. More auxiliary rows can be added depending on the number of auxiliary buses available. Additional auxiliary buses allow for enhanced digital video effects in combination with keyers (such as luma keys, chroma keys, and downstream linear keys).

Program row 310 of video switcher controls 202 corresponds to a program output 154 of DVE 106, preview row 311 corresponds to a preview output 155 of DVE 106, first auxiliary row 312 corresponds to a first auxiliary bus of DVE 106, and second auxiliary row 313 corresponds to a second auxiliary bus of DVE 106.

Video director 135 is able to select which video signals 140-145 will appear on program output 154 and preview output 155 of DVE 106 by selecting a video source icon 303 from program row 310 and by selecting a video source icon 303 from preview row 311. For example, if video source icon 314 corresponds to video input port 161, and video director 135 selects video source icon 314, then video input port 161 is coupled to one of the video switcher outputs 150-153. Further, because video source icon 314 is in program row 310, video input port 161 is coupled to program output 154 of DVE 106. Consequently, video output signal 141, which is connected to video input port 161, appears on DVE program output 154.

Similarly, if video source icon 316 corresponds to video input port 162, and video director 135 selects video source icon 316, then video input port 162 is coupled to one of the video switcher outputs 150-153. Further, because video source icon 316 is in preview row 311, video input port 162 is coupled to preview output 155 of DVE 106. Consequently, video output signal 142, which is connected to video input port 162, appears on DVE preview output 155. In this manner, video director 135 interacts with processing unit 102 to manually control the operation of video switcher 104 and DVE 106.

Audio Mixer Graphical Controls

Figure 4:
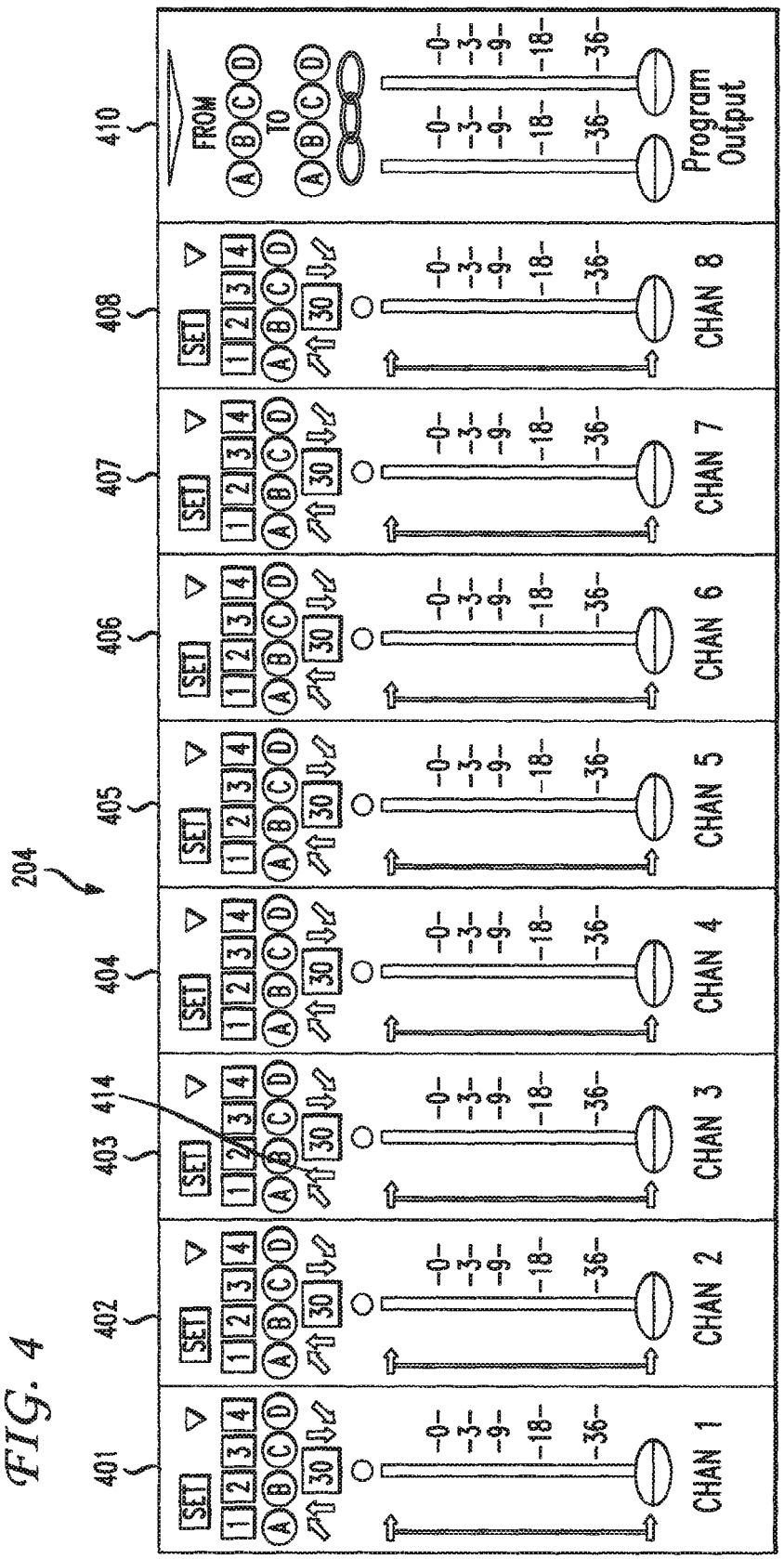
FIG. 4 illustrates exemplary audio mixer graphical controls.

FIG. 4 further illustrates audio mixer graphical controls 204. Audio mixer graphical controls 204 are manipulated by video director 135 to control audio mixer 110. In one embodiment, audio mixer 110 includes sixteen audio input channels 109(1)-(16), two analog/digital audio program outputs 111 and 113 (one for a left speaker and one for a right speaker); and five auxiliary outputs 117(1)-(5). Auxiliary outputs 117 are primarily used for monitoring and previewing audio signals before they are output to program outputs 111 and 113. The number of audio input channels is not limited to sixteen, fewer or more audio input ports are contemplated by the present invention.

Audio mixer graphical controls 204 include eight identical audio input channel controllers 401-408. Each audio input channel controller controls two of the sixteen audio input channels 109 of audio mixer 110. For example, audio input channel controller 401 controls audio input channel 109(1) and 109(9). More specifically, audio input channel controller 401 initially controls audio channel 109(1), but when icon 464 is selected, audio input channel controller controls audio input channel 109(9). In this same manner, each audio input channel controller 401-408 controls two audio input channels.

Figure 4A:
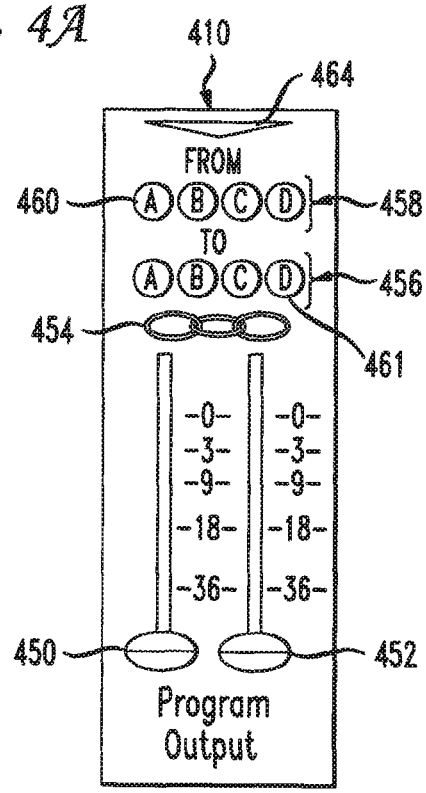
FIG. 4A illustrates an exemplary audio output channel controller.
Figure 4B:
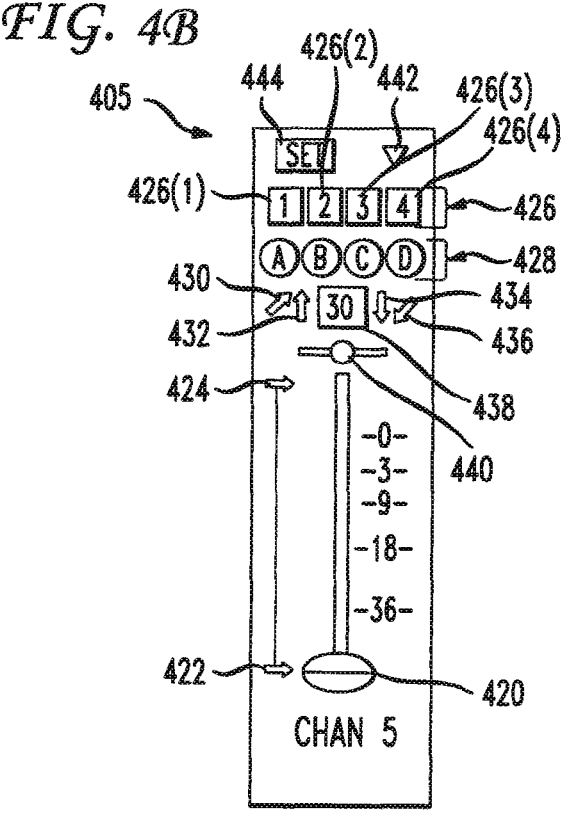
FIG. 4B illustrates an exemplary audio input channel controller.

Audio mixer graphical controls 204 also includes an audio output controller 410 for controlling the volume of audio outputs 111 and 113. FIG. 4A illustrates a representative audio output controller 410, and FIG. 4B illustrates a representative audio input channel controller 405.

Audio Output Controller

Audio output controller 410 includes a left volume control slider 450 and a right volume control slider 452. Left volume control slider 450 corresponds to audio mixer output 111. Right volume control slider 452 corresponds to audio mixer output 113. Video director 135 adjusts the volume level of audio mixer output 111 by adjusting the position of left volume control slider 450. Similarly, video director 135 adjusts the volume level of audio mixer output 113 by adjusting the position of right volume control slider 452. Video director 135 can adjust the position of both left or right using mouse 116, keyboard 118, or other input device.

Left volume control slider 450 and right volume control slider 452 can be "linked" together through chain link icon 454. When they are linked together, left volume control slider 450 moves automatically in response to video director 135 adjusting right volume control slider 452, and vice-versa. Clicking on chain link icon 454 with mouse 116 links the sliders together. The advantage of the linking feature is that video director 135 can easily make the same adjustment to both sliders 450, 452 simultaneously.

Audio output controller 410 also includes icon 464 for allowing video director 135 to control sixteen audio input channels. Initially, audio input channel controllers 401-408 control audio input channels 109(1) through 109(8), respectively. However, when icon 464 is activated, audio input channel controllers 401-408 control audio input channels 109(9) through 109(16). If icon 464 is activated again, audio input channel controllers 401-408 revert back to controlling audio input channels 109(1) through 109(8). Thus, icon 464 allows video director 135 to control up to sixteen audio input channels 109(1)-109(16).

Audio output controller 410 additionally includes a first set of four group icons 458 for specifying a "master" audio group, and a second set of four group icons 456 for specifying a "slave" audio group. Each audio input channel of audio mixer 110 can belong to one of four audio groups: audio group A, audio group B, audio group C, or audio group D. By selecting one of the four group icons 458, video director 135 specifies one of the audio groups as the "master" audio group. Similarly, by selecting one of the four group icons 456, video director 135 specifies a different one of the audio groups as the "slave" audio group. For example, if video director 135 selects group icon 460, which is labeled with an 'A', then audio group A is selected as the master audio group. If video director 135 selects group icon 461, which is labeled with a 'D', then audio group D is selected as the slave audio group. The significance of selecting a master and a slave audio group is described further below in conjunction with a description of cross-fading.

Audio Input Channel Controller

FIG. 4B illustrates exemplary audio input channel controller 405. Audio input channel controller 405 initially controls audio input channel five. Audio input channel controller 405 includes a volume control slider 420, four preset icons 426, four group icons 428, a cross-fade-up icon 430, a fade-up icon 432, a fade-down icon 434, a cross-fade-down icon 436, a duration window 438, a channel balance icon 440, and an equalizer icon 442.

By adjusting volume control slider 420 either up or down, video director 135 controls the volume of the audio input channel associated with audio input channel controller 405, which in this example is audio input channel five. To increase the volume of input channel five, video director 135 moves volume control slider 420 in an upward direction. Similarly, to decrease the volume of audio input channel five, video director 135 moves volume control slider 420 in a downward direction.

Channel balance icon 440, allows video director 135 to control the balance of audio channel five. Video director 135 moves the channel balance icon 440 to the left or to the right depending on how video director 135 desires to balance audio channel five between audio mixer output 111 and audio mixer output 113.

The four group icons 428, which are labeled 'A', 'B', 'C', and 'D', respectively, allow video director 135 to associate audio input channel five with one of four audio groups: audio group A, audio group B, audio group C, or audio group D. Each audio input channel of audio mixer 110 can be a member of one of the above four groups. Each audio input channel that is a member of the same group are linked together. Thus, a volume level adjustment of one input channel within the group causes the same volume level adjustment to occur for each other audio input channel in the group. For example, if audio input channel one and audio input channel two are both members of audio group C, then when video director 135 adjusts the volume of audio input channel one by an amount, the volume of audio input channel two is simultaneously adjusted. This grouping feature allows for the grouping of two sliders for stereo applications, as an example with stereo VTRs.

Audio input channel controller 405 includes a fade-up icon 432 and a fade-down icon 434. Activating fade-up icon automatically moves volume control slider 420 to a preset maximum volume level, which is also referred to as the fade-up target volume level. The amount of time that it takes for the slider to reach the fade-up target volume level is determined by a time duration entered into duration window 438. Similarly, activating fade-down icon automatically moves volume control slider 420 to a preset minimum volume level, which is referred to as the fade-down target volume level. The amount of time that it takes for the slider to reach the fade-down target volume level is determined by the time duration entered into duration window 438. The fade-up target volume level is determined by the vertical position of arrow icon 424. Similarly, the fade-down target volume level is determined by the vertical position of arrow icon 422. Video director 135 can adjust the vertical positions of arrow 422 and arrow 424 using mouse 116 or other input device.

Cross-fades can be achieved using the cross-fade-up icon 430 or the cross-fade-down icon 436. A cross-fade is an audio transition wherein when one audio channel or group of audio channels are faded up, another audio channel or group is automatically and simultaneously faded down, or vice-versa. To perform a cross-fade, video director 135 first selects a "master" audio group and a "slave" audio group, as described above with reference to FIG. 4A.

Cross fades are best described through an example. Assume video director 135 selects audio group A as the master and audio group B as the slave. Assume also that audio input channel five is a member of audio group A and audio input channel one is a member of audio group B. In this example, if video director 135 activates cross-fade-up icon 430, which is associated with audio input channel five, then the volume level of audio input channel five automatically increases to its preset maximum volume level, and, simultaneously, the volume level of audio input channel one automatically decreases to its preset minimum volume level. Alternatively, if video director 135 activates cross fade-down icon 436, which is also associated with audio input channel five, then the volume level of audio input channel five automatically decreases to its preset minimum volume level, and, simultaneously, the volume level of audio input channel one automatically increases to its preset maximum volume level.

Activating equalizer icon 442 causes processing unit 102 to display an equalizer 499, which is illustrated in FIG. 4C. Equalizer 499 includes three frequency sliders 490, three gain sliders 491, and three band width sliders 492 for controlling the frequency, gain, and band width, respectively, of audio input channel one. In addition, a toggle button 494 is provided. Toggle button 494 toggles between an "EQ" and a "FLAT" state. When toggle button 494 is in the EQ state, the sliders 490, 491, and 492 are active as set by video director 135. But when toggle button 494 is in the FLAT state, all sliders 490, 491, and 492 are set to zero. The FLAT state allows video director 135 to hear audio levels while bypassing equalizer settings. There are also included five auxiliary output sliders 493(1)-(5). Auxiliary output sliders 493(1)-(5) correspond to auxiliary outputs 117(1)-(5), respectively. For example, increasing auxiliary output slider 493(1) causes the volume of audio input channel five to increase on auxiliary output 117(1). Similarly, increasing auxiliary output slider 493(3) causes the volume of audio input channel five to increase on auxiliary output 117(3).

The four preset icons 426(1)-(4) allow video director 135 to store and recall four unique audio input channel controller 405 settings. That is, each audio preset icon 426(1)-(4) can be associated with a volume control slider 420 setting, a channel balance icon 440 setting, an arrow icon 424 setting, an arrow icon 422 setting, and an equalizer 499 setting. For example, to configure preset icon 426(1) to be associated with a volume control slider 420 setting, a channel balance icon 440 setting, an arrow icon 424 setting, an arrow icon 422 setting, and an equalizer 499 setting, video director 135 first configures volume control slider 420, channel balance icon 440, arrow icons 422 and 424, and equalizer 499 as desired, then activates set icon 444, and then activates preset button 426(1). The configuration is then associated with preset icon 426(1).

Once preset icon 426(1) is configured, video director 135 can activate the icon, which will cause the configuration associated with the icon to be automatically realized. That is, activating configured preset icon 426(1) causes volume control slider 420, channel balance icon 440, arrow icons 422 and 424, and equalizer 499 to automatically acquire the settings associated with preset icon 426(1). This functionality, therefore, allows for recall of settings through the use of preset icons 426.

RPD Graphical Controls

Figure 5:
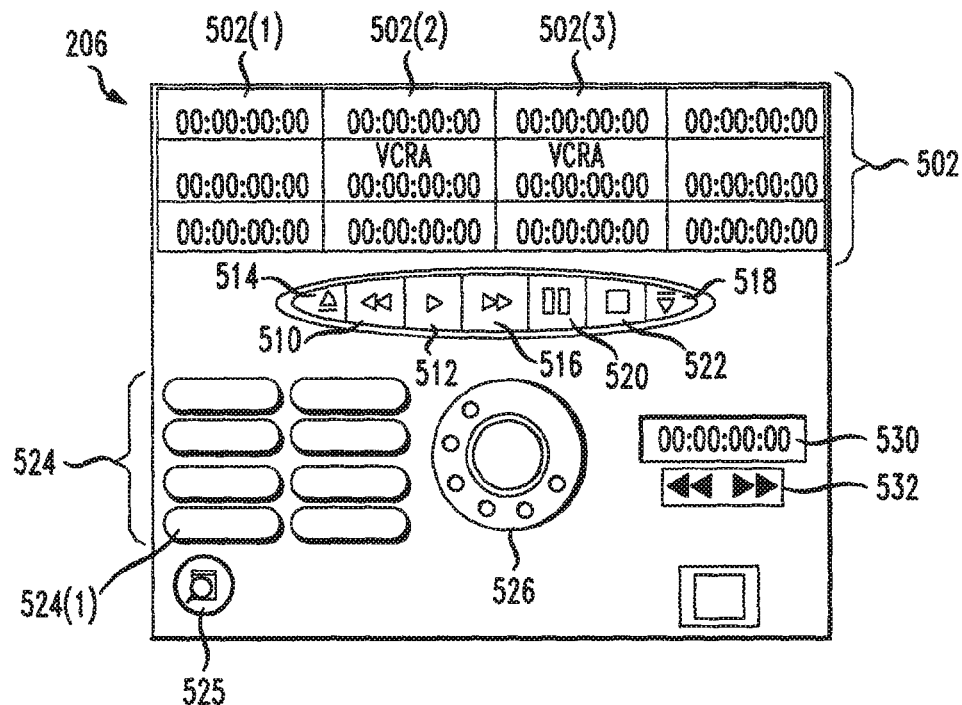
FIG. 5 illustrates exemplary a record/playback device (RPD) graphical controls.

FIG. 5 illustrates exemplary record/playback device (RPD) graphical controls 206. RPD graphical controls 206 enable video director 135 to control the operation of a number of RPDs. In one embodiment, RPD graphical controls 206 enables video director 135 to control up to twelve RPDs. RPD graphical controls 206 include twelve RPD select icons 502 for selecting one of twelve RPDs in communication with processing unit 102. RPD graphical control 206 further includes an eject icon 510, a reverse icon 512, a play icon 514, a fast-forward icon 516, a pause icon 518, a stop icon 520, a record icon 522, a shuttle knob icon 526, a timecode entry field 530, and a cue icon 532.

Once an RPD has been selected, video director 135 may control the operation of that RPD. Video director 135 controls the operation of a selected RPD by activating one of the above mentioned icons. In response to video director 135 activating one of the above mentioned icons, processing unit 102 transmits a corresponding video production command to the selected RPD. For example, when video director 135 activates play icon 514, processing unit transmits a play command to the selected RPD. The selected RPD will then perform the play function. Similarly, when video director 135 activates stop icon 520, processing unit transmits a stop command to the selected RPD. The selected RPD will then perform the stop function.

Timecode entry field 530 allows video director 135 to enter a timecode in the following format: hours:minutes:seconds:frames. After entering a timecode into timecode entry field 530, video director 135 can activate cue icon 532. Activating cue icon 532 causes processing unit 102 to send a cue command to the selected RPD. The cue command transmitted to the RPD includes the timecode that was entered into timecode entry field 530. Upon receiving the cue command, the selected RPD searches for the frame specified by the timecode in the cue command. In this manner, video director 135 can easily cue a tape or other video source.

RPD graphical controls 206 also enable video director 135 to associate eight video segments with each RPD select icon 502. A video segment is defined by a begin timecode and an end timecode. Video director 135 can associate eight video segments with an RPD select icon 502, such as icon 502(1), by first activating RPD select icon 502(1) and then configuring eight video segment preset icons 524. Similarly, video director 135 can associate eight video segments with RPD select icon 502(2), by first activating RPD select icon 502(2) and then configuring each of the eight video segment preset icons 524.

To configure a video segment preset icon 524, such as video segment preset icon 524(1), video director 135 first selects set-up icon 525 and then selects video segment preset icon 524(1). Upon selecting video segment preset icon 524(1) after selecting set-up icon 525, processing unit 102 displays a set-up window 527 (see FIG. 5A).

Figure 5A:
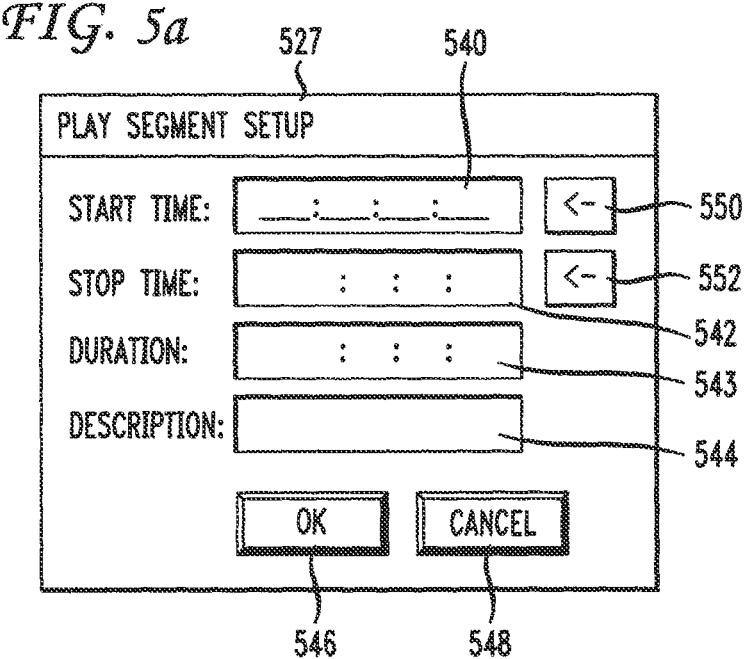
FIG. 5A illustrates an exemplary video segment preset icon set-up window.

Referring to FIG. 5A, set-up window 527 includes a start time field 540 for video director 135 to enter in or "mark" a begin timecode, a stop time field 542 for video director 135 to enter in an end timecode, a duration field 543 that displays the difference in time between the start time and the stop time (this difference is automatically calculated by processing unit 102 and automatically displayed in duration field 543), a description field 544 for video director 135 to specify descriptive text for video segment preset icon 524(1), an "ok" button, and a "cancel" button. There is also provided a start time auto fill button 550 and a stop time auto fill button 552 for automatically filling in start time field 540 and stop time field 542 with the current timecode of the selected RPD, respectively. After entering a begin timecode, an end timecode, and descriptive text into the appropriate fields of set-up window 527, video director 135 selects "ok" button 546 to associate the entered information with video segment preset icon 524 (1), otherwise video director 135 selects "cancel" button 548.

To play one of the up to eight video segments associated with RPD select icon 502(3), for example, video director 135 first selects RPD select icon 502(3) and then selects one of the video segment preset icons 524, such as video segment preset icon 524(1).

When video segment preset icon 524(1) is activated for the first time, processing unit 102 sends a search command to the RPD associated with RPD select icon 502(3), wherein the search command causes the selected RPD to search a tape, disc, or other tangible medium of expression for the begin timecode associated with video segment preset icon 524(1). By activating video segment preset icon 524(1) a second time, processing unit 102 sends a play segment command to the selected RPD. In response, the RPD begins to play and continues to play until the end timecode associated with video segment preset icon 524(1) is reached.

Teleprompting Graphical Controls.

Figure 6:
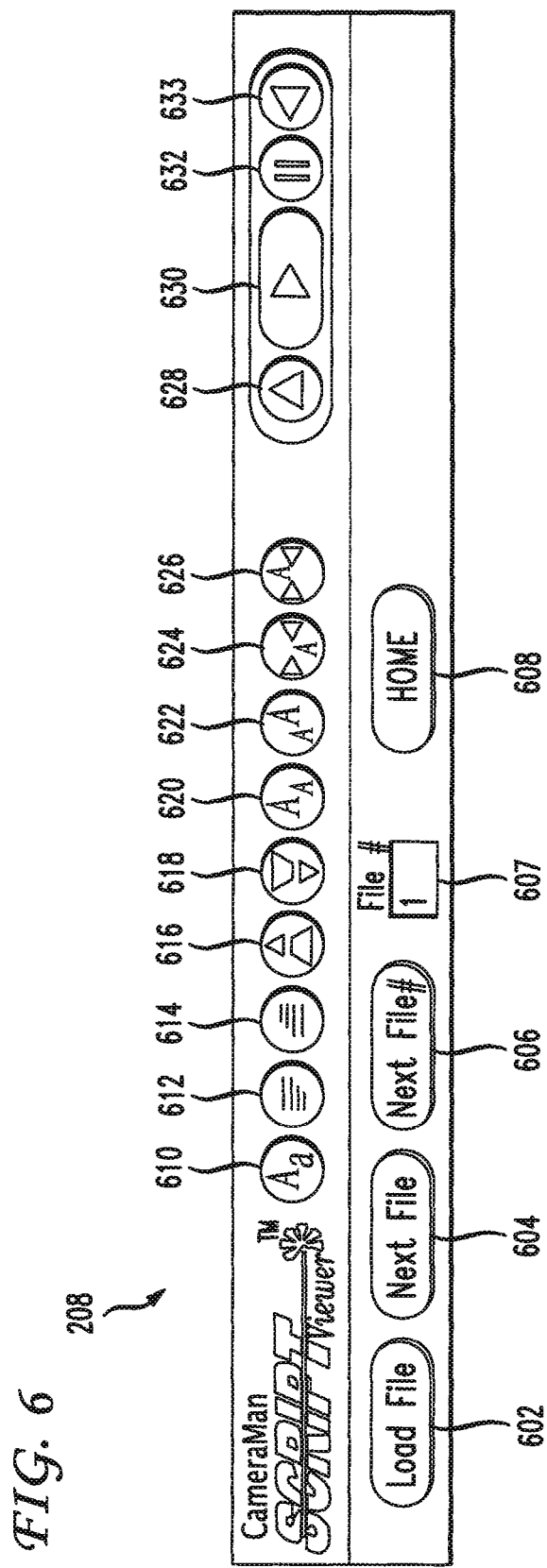
FIG. 6 illustrates exemplary teleprompting system graphical controls.

FIG. 6 illustrates teleprompting graphical controls 208. Teleprompting graphical controls enable video director 135 to control the operation of teleprompting system 108.

Teleprompting graphical controls 208 include the following buttons: a load file button 602, next file button 604, a next file number button 606, a file number window 607 to enter a file number associated with a script file in a script-list, a home button 608, a cue button 628, a play button 630, a pause button 632, a reverse play button 633, an "all caps" button 610, a left justify button 612, a center justify button 614, a speed-up button 616, a slow-down button 618, an increase font size button 620, a decrease font size button 622, a caret-up button 624, and a caret down button 626. There is provided a viewer window 211 (see FIG. 2B) for viewing a teleprompting script (hereafter "script") as the script scrolls.

Load file button 602 enables video director 135 to select a previously created script to be played by teleprompting system 108. Upon video director 135 activating load file button 602, a file select window is displayed. Video director 135 uses file select window to select a previously created script. Once a script has been selected, the beginning of the script is displayed in viewer window 211, and the script is ready to be played. To play the script, video director 135 activates play button 630. Upon video director 135 activating play button 630, processing unit 102 sends a play command to teleprompting system 108. The play command directs teleprompting system to begin scrolling the selected script across one or more teleprompter display screens 2012 (see FIG. 20) and viewer window 211.

After activating play button 630, video director 135 has a variety of options in controlling the script. Video director 135 may select pause button 632, which causes processing unit 102 to send a pause command to teleprompting system 108 directing teleprompting system 108 to pause the scrolling of the script. In addition, by selecting speed-up button 616 or slow-down button 618 video director 135 may increase or decrease the scrolling rate at which teleprompting system 108 scrolls the script, respectively. Further, video director 135 may increase or decrease the font size of the script by selecting increase size button 620 or decrease size button 622, respectively. In one embodiment, the scroll rate is measured in terms of words per unit of time, and, regardless of the font size of the script, teleprompting system automatically maintains the established scroll rate. Therefore, if the font size is increased, the script will scroll faster across display screen 2012. Similarly, if the font size is decreased, the script will scroll more slowly across display screen 2012.

Activating "all caps" button 610 causes teleprompting system 108 to change the text of the loaded script to all capital letters. Activating left justify button 612 and right justify button 614 causes teleprompting system 108 to left justify and right justify the loaded script, respectively. Activating caret-up button 624 and caret-down button 626 causes teleprompting system 108 to move the teleprompting carets 2302 up and down, respectively.

Next file button 604, next file number button 606, and home button 608 all operate on a script play-list. A script play-list is a list containing one or more previously created scripts. Each script in the play-list is sequentially numbered beginning with the number one (1). Creating a script play-list is described in the teleprompting system portion of this document. Activating home button 608 causes teleprompting system 108 to cue the first script in the script play-list. Activating next file button 604 causes teleprompting system 108 to cue the next sequential script in the play-list. Lastly, activating next file number button 606 causes teleprompting system 108 to cue the script identified by the number placed in file number window 607. That is, if the value seven (7) is entered into file number window 607 and video director 135 activates next file number button 606, teleprompting system 108 cues the seventh script from the play-list.

Character Generator

Figure 7:
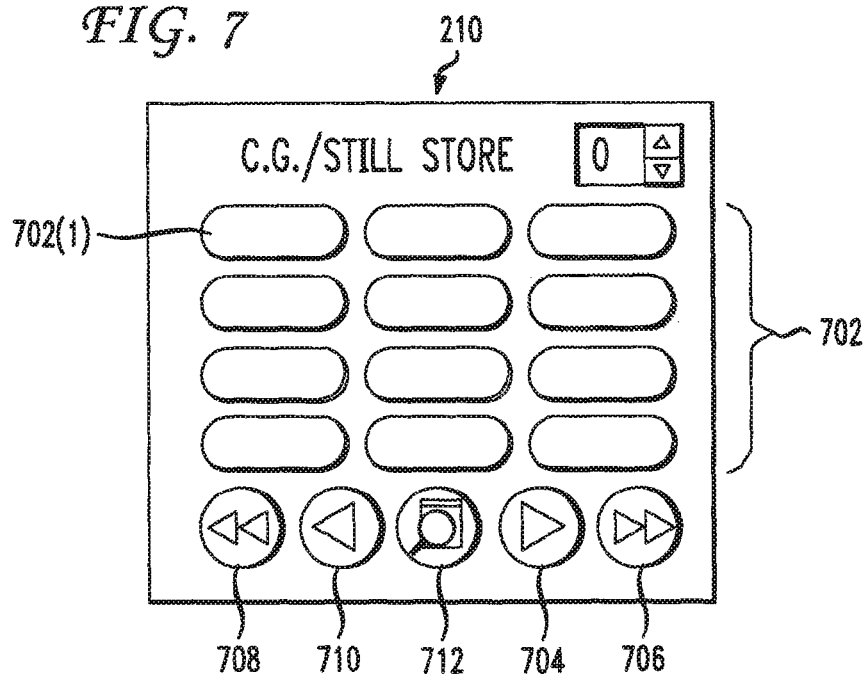
FIG. 7 illustrates exemplary character generator graphical controls.

FIG. 7 illustrates character generator (CG) graphical controls 210. CG graphical controls 210 are used to control CG 130, which provides titles, text, graphics and video still images (hereafter "graphic image") for inclusion within a video production. CG 130 includes a number of sequentially numbered "pages."Stored on each page is a graphic image.

In one embodiment, CG graphical controls 210 include twelve page preset icons 702, a read next icon 704, a read next buffer icon 706, a read previous icon 710, and a read previous buffer icon 708. Video director 135 can configure each page preset icon 702 such that each page preset icon 702 is associated with a particular CG 130 page number, a read status or a buffer status, and a descriptive name that is displayed on the icon.

Figure 7A:
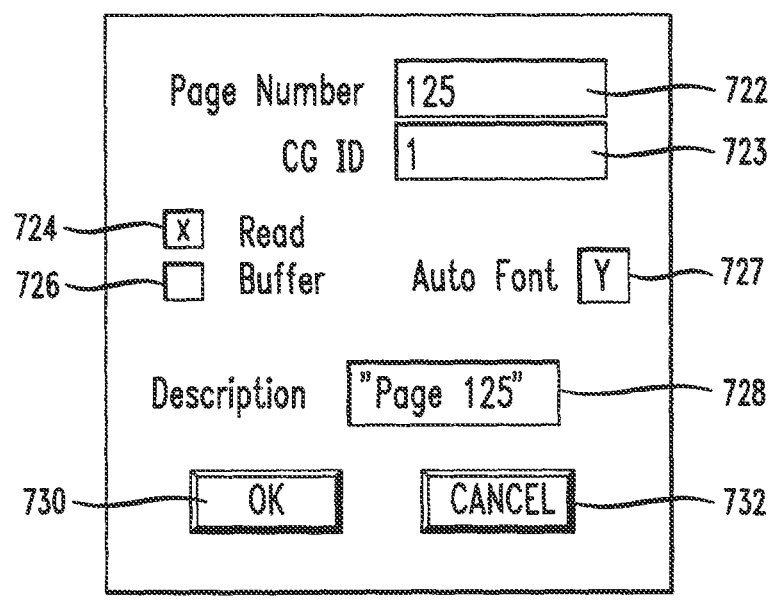
FIG. 7A illustrates an exemplary character generator preset icon set-up window.

To configure a page preset icon 702, such as page preset icon 702(1), video director 135 selects page preset icon 702 (1) and then selects set-up icon 712. Upon selecting set-up icon 712, processing unit 102 displays a set-up window 720 (see FIG. 7A). Set-up window 720 includes a page number field 722 for video director 135 to enter in a page number, a read check box 724 and a buffer check box 726 for associating either a read or buffer status with page preset icon 702(1), a description field 728 for video director 135 to specify descriptive text for page preset icon 702(1), an "ok" button 730, and a "cancel" button 732. After entering a page number, selecting either read check box 724 or buffer check box 726, and entering descriptive text, video director 135 selects "ok" button 730 to associate the entered information with page preset icon 702(1), otherwise video director 135 selects "cancel" button 732. The set-up window 720 also includes a CG ID 723. The CG ID 723 correlates to the address of the Character Generator that processing unit 102 is in communication with. An Auto Font button 727 is also provided to automatically loads font (or text) into a CG template.

Activating a configured page preset icon causes the processing unit 102 to transmit a read page or buffer page command to CG 130, depending on whether the activated page preset icon is associated with a read status or a buffer status, respectively. A read page or buffer page command transmitted to CG 130 includes the CG page number associated with the activated icon. Upon receiving a read page command, CG 130 outputs the graphic image stored at the CG page number included in the read page command. Upon receiving a buffer page command, CG 130 writes the graphic image stored at the CG page number included in the buffer page command to a CG buffer.

Activating read next button 704 causes CG 130 to output the next sequential graphic image. Activating read next buffer button 706 causes CG 130 to output the graphic image stored in the CG buffer and to write the next sequential graphic image to the CG buffer. Activating read previous button 710 causes CG 130 to output the previous sequential graphic image. Lastly, activating read previous buffer button 708 causes CG 130 to output the graphic image stored in the CG buffer and to write the previous sequential graphic image to the CG buffer.

Camera Controls

Figure 8:
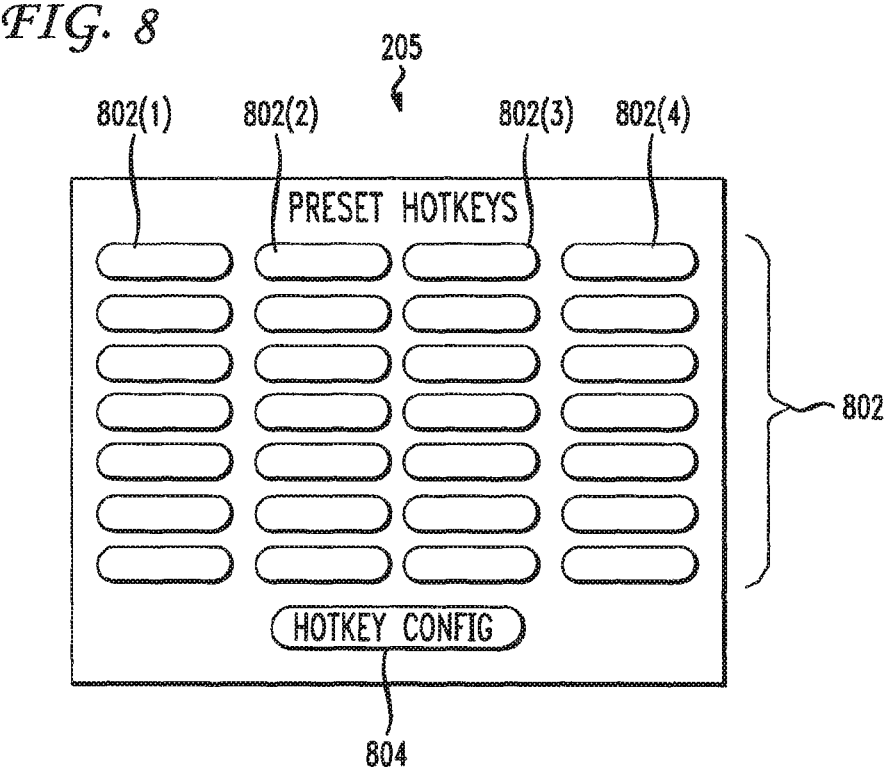
FIG. 8 illustrates exemplary camera graphical controls.

FIG. 8 illustrates camera graphical controls 205. In one embodiment, camera graphical controls 205 includes twenty eight camera hot-keys 802. Video director 135 can program (configure) each of the camera preset hot-keys 802 to be associated with a particular camera, a particular location preset or dynamic auto track view, and descriptive text. This allows video director 135 to control a camera simply by activating an icon.

A location preset includes a pan angle, a tilt angle, a zoom setting, an iris setting, and a focus setting for 1-charge coupled device (1-CCD) cameras. For 3-CCD cameras the location preset also include camera control unit (CCU) settings. A dynamic auto track view includes a zoom perspective, a frame offset setting, a sensitivity setting, and a window setting.

Figure 8A:
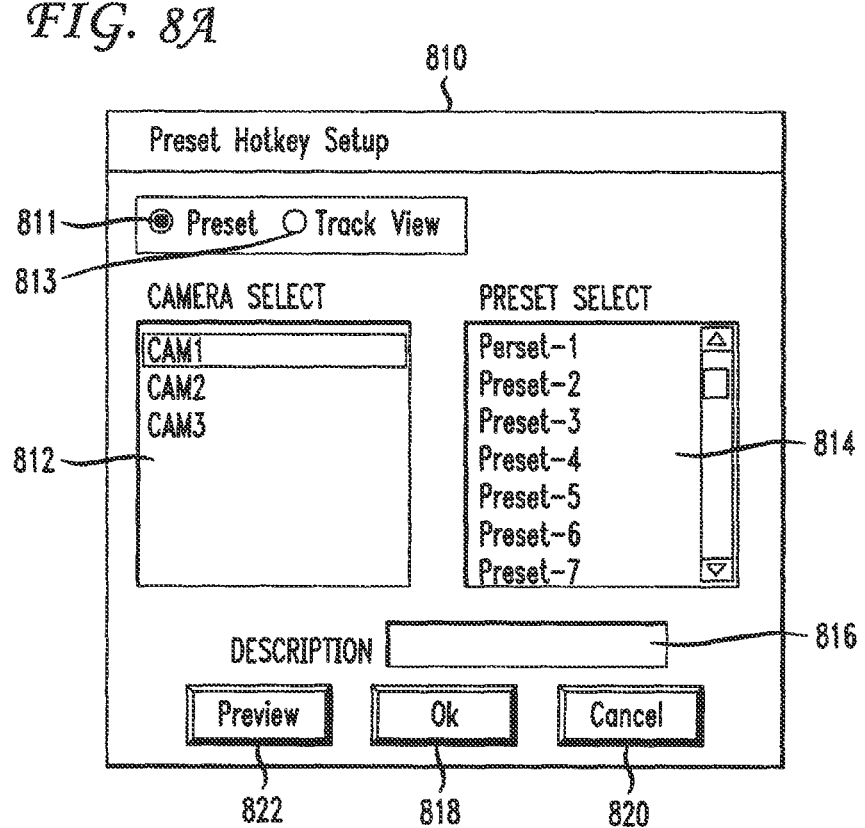
FIG. 8A illustrates an exemplary camera preset icon set-up window.

To associate a camera, a location preset or a dynamic auto track view, and descriptive text with one of the camera hot-keys 802, video director 135 first selects hot-key configuration button 804. Video director 135 then selects one of the camera hot-keys 802, such as camera hot-key 802(1). Upon activating camera hot-key 802(1) after selecting hot-key configuration button 804, processing unit 102 displays a camera hot-key set-up window 810 (see FIG. 8A).

Camera hot-key set-up window 810 includes a camera selection box 812 for selecting a camera that is in communication with processing unit 102. Camera selection box 812 lists all of the cameras that are in communication with and can be controlled by processing unit 102. Video director 135 first highlights one of the cameras listed in camera selection box 812. Next, if video director 135 desires to associate a location preset with hot-key 802(1) then video director 135 selects radio button 811, or if video director 135 desires to associate a dynamic auto track view with hot-key 802(1) then video director 135 selects radio button 813.

If radio button 811 is selected, the location presets corresponding to the highlighted camera are then listed in selection box 814. Video director 135 then selects one of the location presets listed in selection box 814. If radio button 813 is selected, the dynamic auto track views corresponding to the highlighted camera are then listed in selection box 814. Video director 135 then selects one of the dynamic auto track views listed in selection box 814.

After video director 135 has finished selecting a camera and a location preset or dynamic auto track view, video director 135 can activate preview button 822. Activating preview button 822 causes processing unit 102 to transmit a camera control command to the selected camera. The camera control command includes the selected location preset or dynamic auto track view. Upon receiving the camera control command, the selected camera is automatically configured according to the location preset or dynamic auto track view. This allows video director 135 to preview the camera shot that is selected to make sure that it is the desired camera shot.

If the desired camera shot is produced, video director 135 activates an ok button 818 to associate the selected camera, the selected location preset or dynamic auto track view, and the descriptive text entered into description field 816 with camera hot-key 802(1), or Video director 135 activates a cancel button 820 to cancel the operation.

Once a camera and a location preset or dynamic auto track view has been associated with a hot-key 802, video director 135 need only activate the hot-key 802 to control the camera. That is, when the hot-key 802 is activated, processing unit automatically transmits a camera control command to the camera associated with the hot-key. Upon receiving the camera control command, the camera is automatically configured according to the location preset or the dynamic auto track view. In this manner, video director 135 can control cameras 120-126 with a touch of an icon.

Location presets and dynamic auto track views for a given camera are created by using a multi-camera control device 112. For example, video director 135 uses multi-camera control device 112 to remotely control and position the cameras that are in communication with processing unit 102, such as camera 120. Once camera 120 is positioned and configured such that it produces the desired camera shot, such as a close-up or wide angle shot of a particular subject, video director 135 saves camera 120's configuration to one of one-hundred-twenty-five camera presets for camera 120 with control device 112. The camera preset is then listed as a location preset in selection box 814.

DVE Graphical Controls

Figure 9:
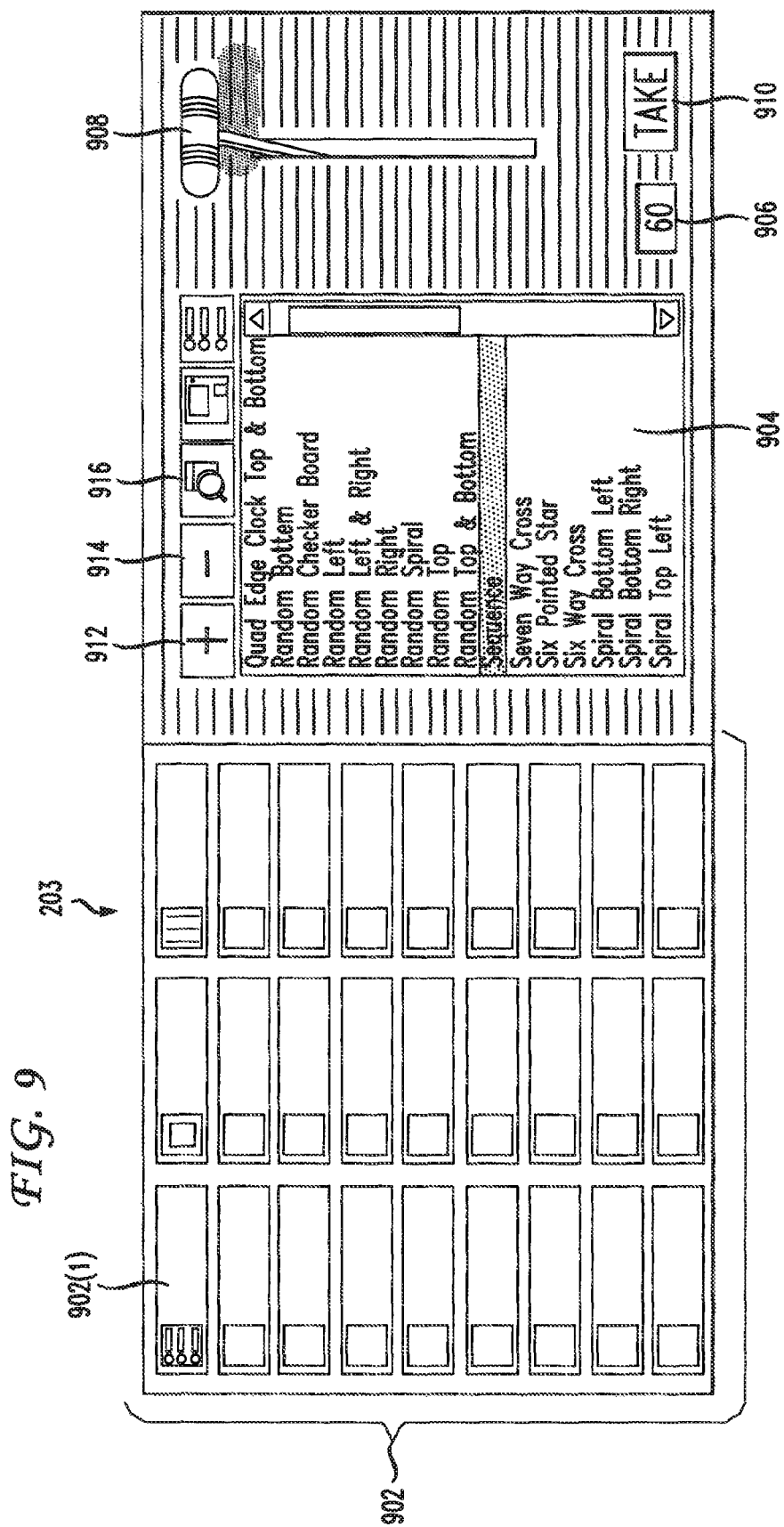
FIG. 9 illustrates exemplary DVE graphical controls.

FIG. 9 illustrates DVE graphical controls 203. DVE graphical controls 203 include twenty seven programmable video transition hot-keys 902. Video director 135 can program each video transition hot-key 902 such that each video transition hot-key 902 is associated with a video transition effect. A variety of transition effects are supported. Such transition effects include, but are not limited to, fades, wipes, digital video effects (DVE) and downstream keyer (DSK) effects. Digital video effects include, but are not limited to, warps, dual-box effects, page turns, slab effects, and sequences. DSK effects include both DVE and DSK linear, chroma and luma keyers.

A Video transition hot-key is programmed by highlighting the desired hot-key 902 to be programmed, selecting a wipe, fade, or other video transition effect from list 904, and then activating an add button 912. After activating add button 912, a video transition configuration window 950 is displayed (See FIG. 9A). If video director 135 wants to un-program a video transition hot-key 902, video director 135 highlights the hot-key and selects a minus button 914. If video director 135 wants to modify a programmed video transition hot-key 902, video director 135 selects the hot-key 902 and then activates a modify button 916. After activating modify button 916, video transition configuration window 950 is displayed (See FIG. 9A).

FIG. 9A illustrates an example video transition configuration window 950. Video transition configuration window 950 is the configuration window that is displayed if, for example, video director 135 selected "wipe" from list 904. Therefore, video transition configuration window 950 includes wipe effect controls 952. These controls adjust the "wipe" effect for a different look and feel such as adding borders to the wipe or configuring sharp or soft edges on the wipe pattern.

Video transition configuration window 950 also includes a background select box 954, a DVE On select box 956, and a DSK On select box 958. Video director 135 selects background select box 954 if the video transition effect selected from list 904 involves a background transition.

Figure 9B:
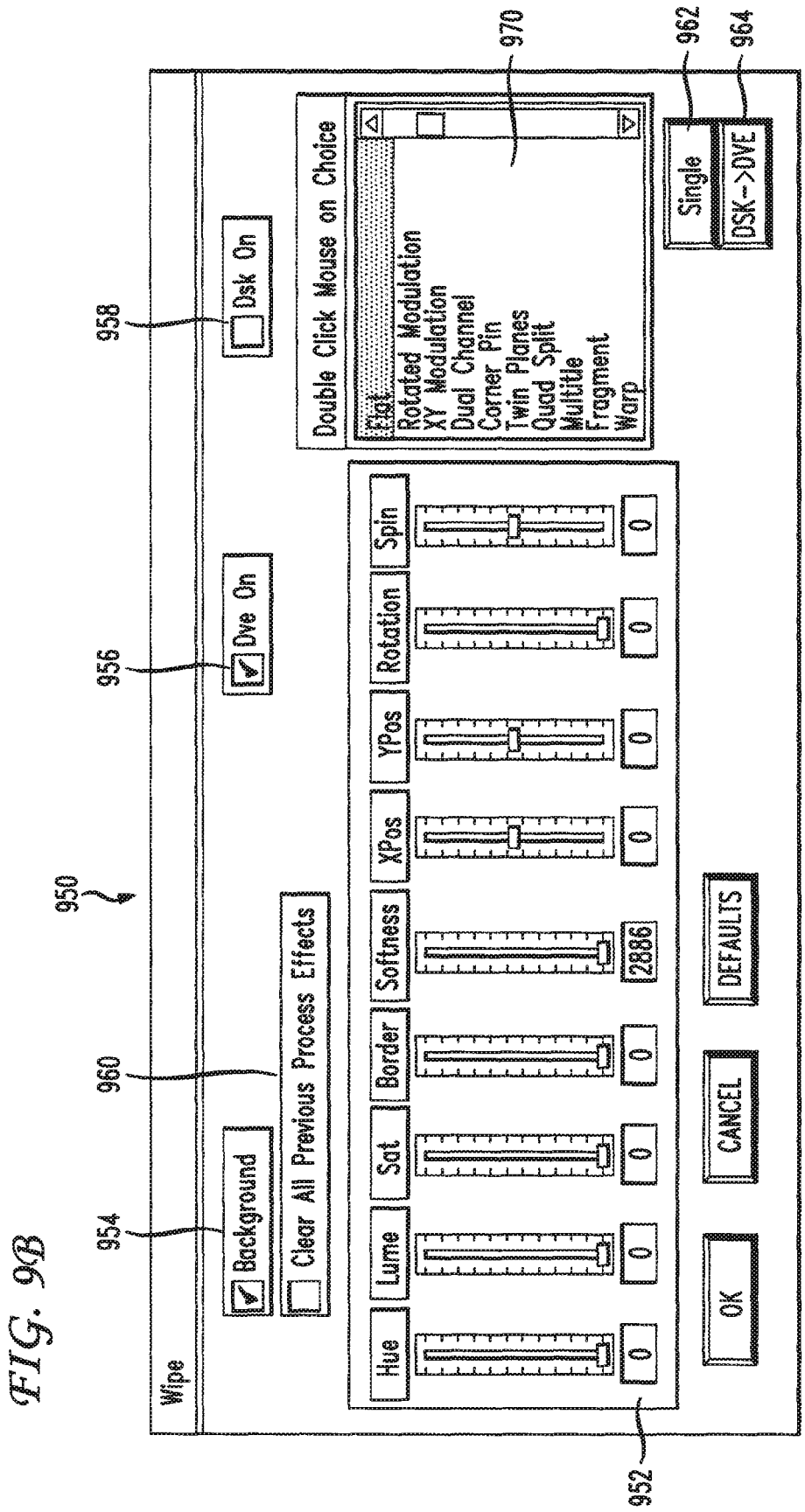

If video director 135 wants to have a DVE effect, with or without a "background" transition, video director 135 can select DVE On select box 956. Upon selecting DVE On select box 956, a list of DVE effect options are displayed in select window 970 (See FIG. 9B). Video director 135 can then select a desired DVE effect by highlighting a DVE effect listed in select window 970.

Figure 9C:
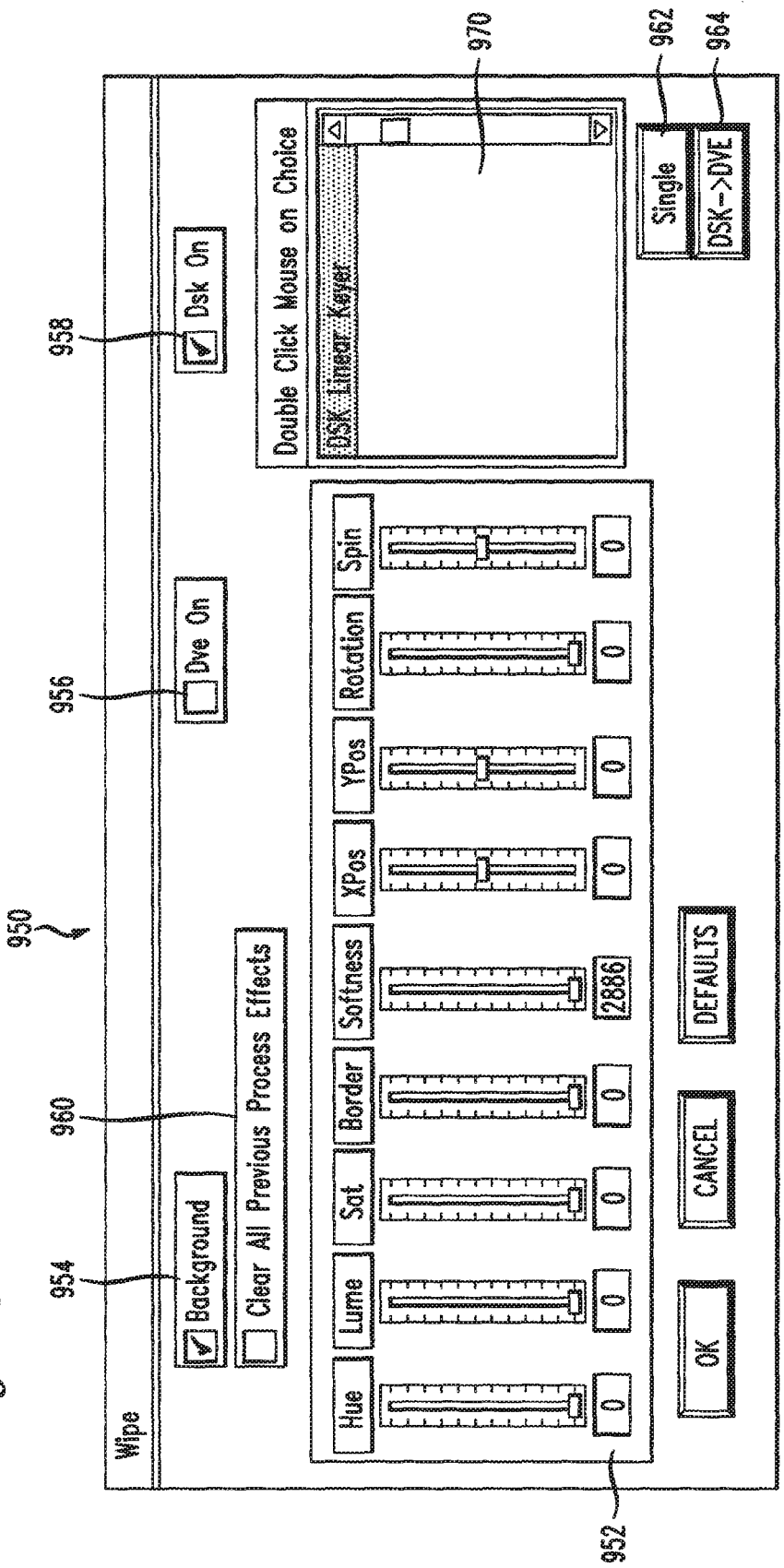

If video director 135 wants to select a downstream keyer effect, video director 135 selects DSK On select box 958. Upon selecting DSK On select box 958, a list of DSK Keyers are displayed in select window 970 (See FIG. 9C). Video director 135 can then select a desired DSK Keyer by highlighting a DSK Keyer listed in select window 970.

The DVE graphical controls 203 manages a video routing switcher that routes key signals and key inputs from multiple devices to the downstream keyer. "Key" information is additional information, graphics or captions placed over a video (e.g., the NBC® peacock located in the bottom right corner of screen). Video director 135 can overlay additional key layers over the video segments. The System permits the creation of additional or multiple character generators and still stores, and routes the signal to the DSK Keyer so that video director 135 can decide which layer to place the character generator or still store. The key layer can be expanded from one to four layers. This is accomplished by expanding an I/O matrix to handle more signals and adding more control protocols to communicate with multiple devices supplying key signals.

Referring again to FIG. 9A, a "Clear ALL Previous Process Effects" select box 960 is checked when the next transition does not use a pre-configured process effect such as Chroma Key, Luma Key or other process effect. When a process effect is desired and selected, select box 960 should not be checked. Process effects are configured on DVE and DSK property configuration pages that are accessed by selecting them on the DVE/DSK dialog window effects list. As an example, if a transition shows the talent with a chroma keyed background that is filled through an auxiliary bus one source and the next shot requires just the talent without a chroma key background, then, in order to transition over appropriately, the next video transition will need to have background select box 954 checked.

Video transition configuration window 950 provides a first toggle button 962 and a second toggle button 964. First toggle button 962 toggles between "single" mode and "double" mode. That is, if first toggle button 962 displays "single", then activating first toggle button 962 causes it to display "double", and if first toggle button 962 displays "double", then activating first toggle button 962 causes it to display "single." When first toggle button 962 displays "single," this means that one auxiliary bus is used for DVE and the other for DSK. When first toggle button 962 displays "double," this means that both auxiliary bus one and auxiliary bus two are active for DVE use only.

Second toggle button 964 toggles between "DSK->DVE" mode and "DVE->DSK" mode. That is, if second toggle button 964 displays "DSK->DVE", then activating second toggle button 964 causes it to display "DVE->DSK". If, on the other hand, second toggle button 964 displays "DVE->DSK", then activating second toggle button 964 causes it to display "DSK->DVE". Second toggle button 964 allows video director 135 to either place the DSK in front of the DVE effect layer or vice versa. In other words if second toggle button 964 displays "DSK->DVE", then the DSK effect is in the foreground and the DVE is in the background. Similarly, if second toggle button 964 reads "DVE->DSK," then the DVE effect is in the foreground and the DSK effect is in the background.

Referring again to FIG. 9, upon activating a programmed video transition hot-key 902 (that is, a video transition hot-key 902 that is associated with a transition effect), the video transition effect associated with the video transition hot-key 902 is ready to be produced via a take slider 908 or a take button 910.

To produce or "take" the video transition effect associated with a selected video transition hot-key 902, video director 135 first selects the appropriate program source, preview source, auxiliary one source, and auxiliary two source by selecting a button from rows 310, 311, 312, and 313, respectively. Next, video director 135 can either manually "take" the effect by manually moving take slider 908 down, or automatically "take" the effect by entering a duration into duration window 906, and activating take button 910.

When a video transition effect is produced in its simplest form, the video source coupled to preview output 155 is transitioned to program output 154 and the video source coupled to program output 154 is transitioned to preview output 155. The video transition effect associated with the selected video transition hot-key specifies the manner in which the transition occurs.

Alternative Embodiments of GUI 132 and 133

Figure 26:
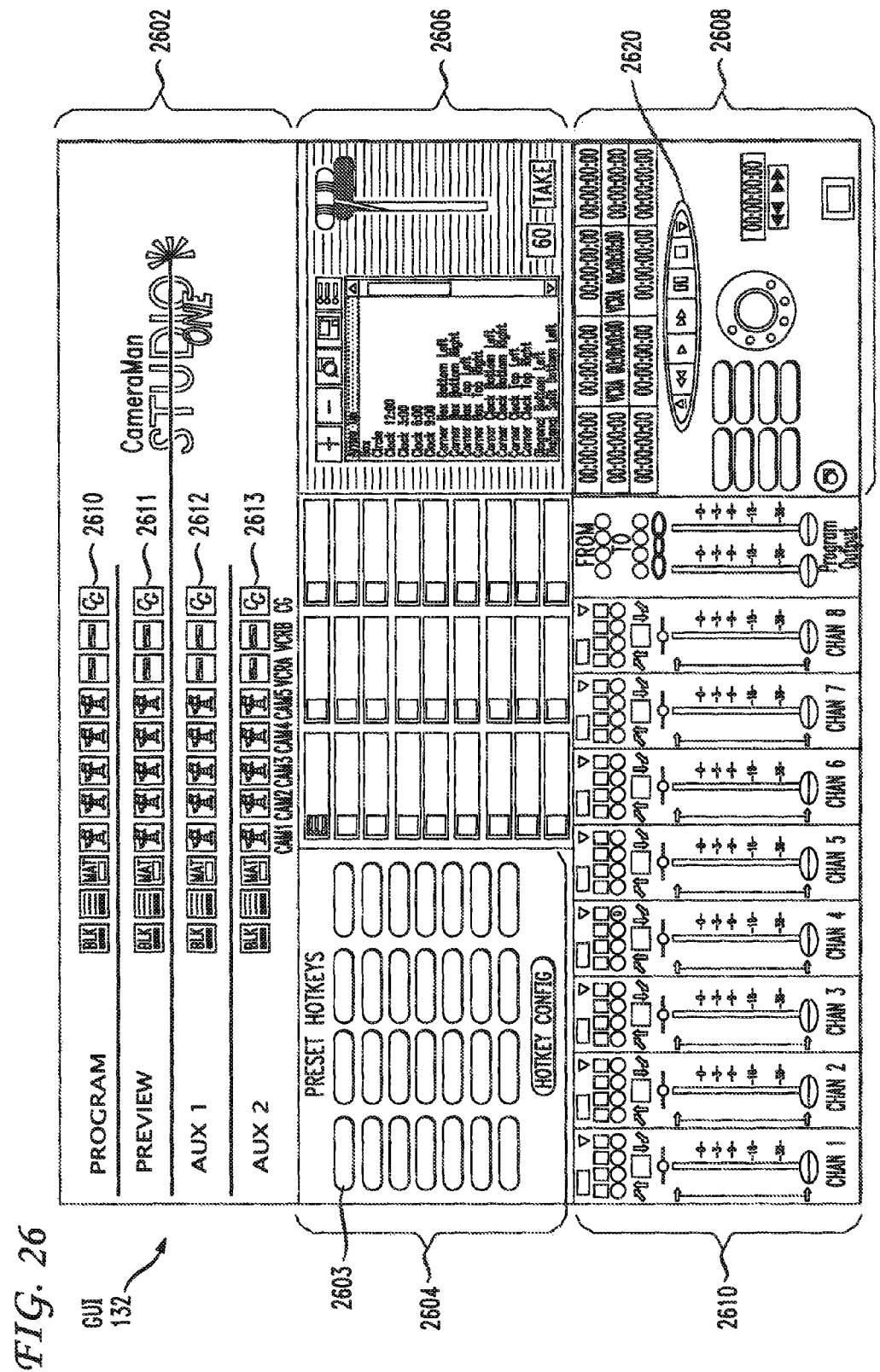
FIG. 26 illustrates a second embodiment of GUI 132.

FIG. 26 illustrates a second embodiment of GUI 132. Like the first embodiment of GUI 132, the second embodiment of GUI 132 includes video switcher graphical controls 2602 for controlling video switcher 104, camera graphical controls 2604 for controlling cameras that are in communication with processing unit 102, DVE graphical controls 2606 for controlling DVE 106, RPD graphical controls 2608 for controlling up to eight RPDs, and audio mixer graphical controls 2610 for controlling audio mixer 110. DVE graphical controls 2606 and camera graphical controls 2604 are identical to DVE graphical controls 203 and camera graphical controls 205, respectively.

Video switcher graphical controls 2602 are identical to video switcher graphical controls 202 with the exception that video switcher graphical controls 2602 include four rows 2610-2613 of only eleven selectable video source icons 2603 instead of thirty as in the first embodiment. Similarly, RPD graphical controls 2608 are identical to RPD graphical controls 206 with the exception that RPD graphical controls 2608 only includes eight RPD select icons 2620 instead of twelve as in the first embodiment. Audio mixer graphical controls 2610 are identical with audio mixer graphical controls 204 with the exception that audio mixer graphical controls 2610 are limited to controlling at most eight audio input channels without an upgrade module that adds an additional eight audio inputs.

Figure 27:
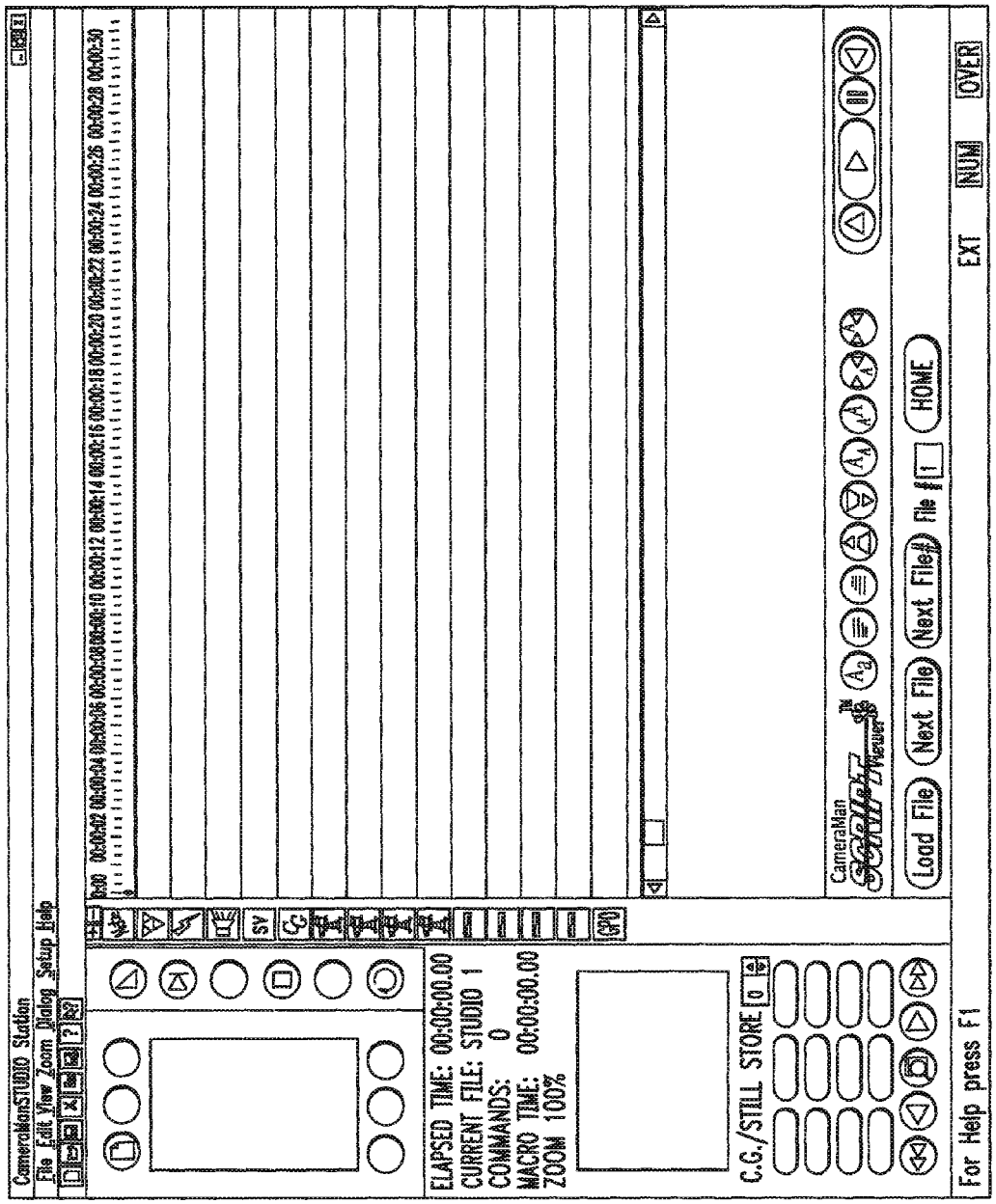
FIG. 27 illustrates a second embodiment of GUI 133.

FIG. 27 illustrates a second embodiment of GUI 133. The second embodiment of GUI 133 is identical to the first embodiment with the exception that the second embodiment of GUI 133 does not include transition macro hot-keys 212.

Transition Macros

In addition to providing the above described graphical controls for manually controlling video production devices, processing unit 102 provides a means for automating the execution of a show. That is, processing unit 102 provides a means for executing a show without the need for an expensive production crew to control the video production devices.

The execution of a show is automated by creating and executing a transition macro. In one embodiment, a transition macro is a set of video production commands, where each video production command is associated with a timer value and at least one video production device. The following is an illustration of a simple transition macro representing a "voice over" segment of a directors rundown sheet. The transition macro includes the following four video production commands and their associated timer values: (1) play RPD 128, one second; (2) fade up talent microphone (audio channel 109(1)), one second; (3) connect the video output 144 from RPD 128 to program output 154, two seconds; and (4) fade down talent microphone, ten seconds. The stated timer values indicate when the command is to be executed as measured by a transition macro timer.

To perform the above transition macro, video director 135 activates the transition macro timer. Processing unit 102 continuously monitors the timer. When the timer reads one second, processing unit 102 executes the first two commands simultaneously or substantially simultaneously. That is, when the timer reads one second, processing unit 102 performs the following steps: (1) processing unit 102 transmits a play command to RPD 128 and (2) transmits a command to audio mixer 110 that causes audio mixer 110 to fade up audio channel 109(1). When the transition macro timer reads two seconds, processing unit 102 transmits a control command to video switcher 104 and DVE 106 that causes video switcher 104 and DVE 106 to link program output 154 with the video switcher input port 164, which is coupled to a video output of 144 RPD 128, thereby connecting RPD 128's video output 144 with program output 154. Lastly, when the timer reads 10 seconds, processing unit transmits a control command to audio mixer 110 that causes audio mixer 110 to fade down audio channel 109(1). In this manner, a video production is automated.

Processing unit 102 provides a transition macro time sheet (hereafter "time sheet") 299 (see FIG. 2B) for creating and executing a transition macro. A transition macro is created by placing icons onto time sheet 299, where each icon is associated with one or inure video production commands and at least one video production device, or where each icon can be configured to be associated with one or more video production commands and at least one video production device. In an embodiment, the icons that form the graphical controls 202, 203, 204, 205, 206, 208, 210 can be placed on transition macro time sheet 299, as well as other icons from GUI 133, such as icons 270-282.

Figure 10:
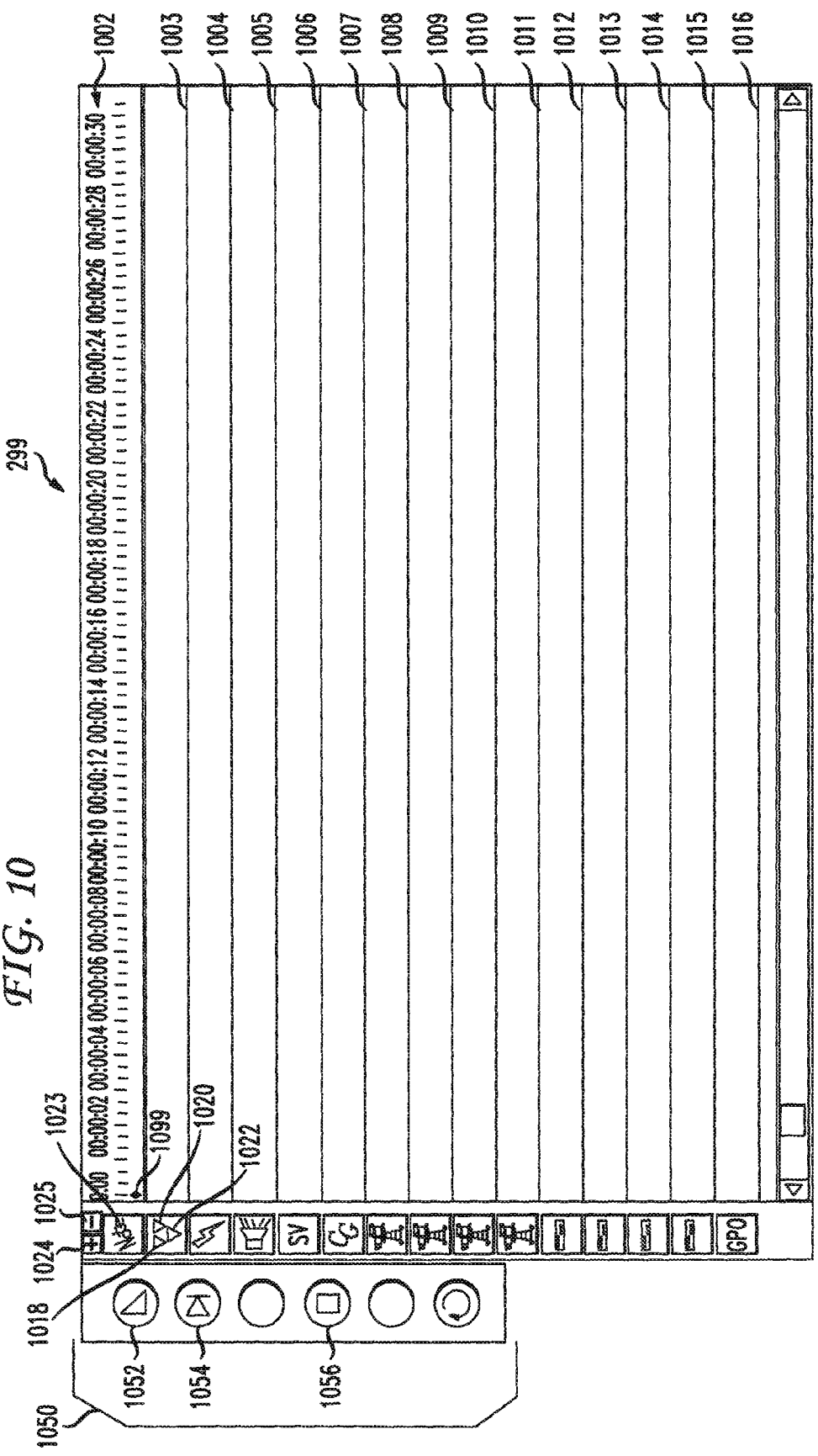
FIG. 10 illustrates a transition macro time sheet.

FIG. 10 illustrates an embodiment of time sheet 299. Time sheet 299 includes a transition macro timer (hereafter timer) 1002, which is represented as a horizontal time line, and fourteen control lines 1003-1016. There is also provided timer controls 1050 for controlling timer 1002. Timer controls 1050 include a start/step button 1052, a cue/reset button 1054, and a stop button 1056. Activating start/step button 1052 causes timer 1002 to run. Activating stop button 1056 causes timer 1002 to stop running. Activating cue/reset button 1054 causes timer 1002 to reset to zero (0) seconds.

Time sheet 299 can be reduced or enlarged by activating minus zoom icon 1025 or plus zoom icon 1024, respectively. Reducing time sheet 299 means that timer 1002 and all of the icons placed on time sheet 299 are scaled down, while maintaining the dimensions of time sheet 299. Similarly, enlarging time sheet 299 means that timer 1002 and all of the icons placed on time sheet 299 are scaled up, while maintaining the dimensions of time sheet 299.

In another embodiment of the present invention, timer sheet 299 includes DVE-DSK indicators that are used to inform the system operator, i.e. video director 135, of the current status of DVE and DSK effects as the show executes. The transaction macro must account for the required time to initiate and prepare the DVE and DSK effects for operation. The DVE can take, for example, five frames to initiate. External and internal DSK lights also require setup time. The DVE-DSK status lights indicate three states for the video production devices: "OFF," "PREPARATION," and "ON." "OFF" indicates the event is not being executed. "ON" indicates the event is in the process of being executed. "PREPARATION" indicates the event is being prepared for execution.

In an embodiment, control line 1004 is a DVE control line, which means that only video transition hot-keys 902 and icon 270 can be placed onto control line 1004. Control line 1005 is an audio mixer control line, which means that only icons from audio mixer graphical controls 204 and icon 271 can be placed onto control line 1005. Control line 1006 is a teleprompting control line, which means that only icons from teleprompter graphical controls 208 and icon 272 can be placed onto control line 1006. Control line 1007 is a CG control line, which means that only icons from CG graphical controls 210 and icon 273 can be placed onto control line 1006. Control lines 1008-1011 are camera control lines, which means that only camera preset hot-keys 802 and icons 274-277 can be placed onto control lines 1008-1011. Control lines 1012-1015 are record/playback device (RPD) control lines, which means that only icons from RPD graphical controls 206 and icons 278-281 can be placed on control lines 1012-1015. The video production system of the present invention allows audio/video feeds to be saved or retrieved by filename. The video can be integrated into the control lines and executed during a live broadcast. Alternatively, the video can be archived and broadcasted at a later time.

Control line 1003 is a step mark line. A step mark icon 1018, a user mark icon 1022, and a GPI mark icon 1020 can be placed on control line 1003. Label icon 1023 can also be placed on control line 1003 to allow video director 135 to name a segment or portion of time sheet 299. Once label icon 1023 is dragged and dropped on to control line 1003, video director 135 can double click the icon to open up a dialogue box that allows video director 135 to enter in text. The text is then displayed on the label icon. This allows video director 135 to label one or more portions of the transition macro.

Figure 11:
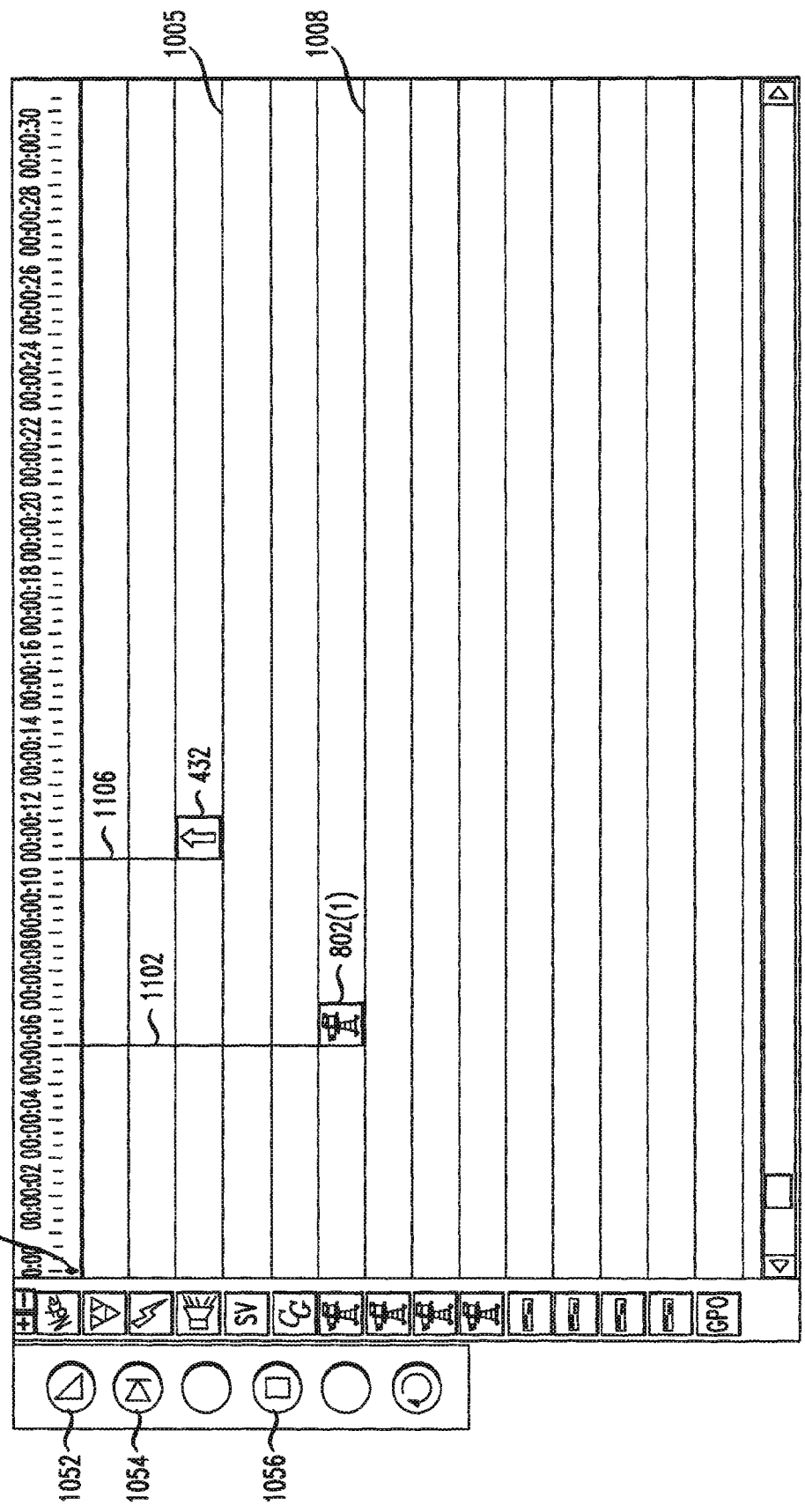
FIG. 11 illustrates a simple transition macro that is formed by two icons that have been dragged and dropped onto a transition macro time sheet.

FIG. 11 illustrates a simple transition macro that is formed by two icons that have been dragged and dropped onto time sheet 299. Specifically, camera hot-key 802(1) has been dragged and dropped on camera control line 1008 and fade-up icon 432 has been dragged and dropped onto audio mixer control line 1005. For this example, we will assume camera hot-key 802(1) has been configured such that it is associated with camera 120 and is associated with a location preset as opposed to a dynamic auto track view. The method and means for associating a camera and a location preset with camera hot-key 802(1) was described above with reference to FIG. 8 and FIG. 8A.

To drag and drop an icon from GUI 132 or 133, such as camera hot-key 802(1) or fade-up icon 432, video director 135 maneuvers mouse 116 such that a mouse cursor is placed over the icon, depresses a mouse button, then while holding down the mouse button, maneuvers the mouse 116 such that the mouse cursor is placed over the desired location on the appropriate control line for that icon and then releases the mouse button. In this manner, video director 135 can place an icon anywhere along the appropriate control line. Further, once an icon has been placed on a control line, video director 135 can move the icon to another location on the control line using the same drag and drop process. Additionally, by depressing a right mouse button while the mouse cursor is positioned over an icon on time sheet 299, video director 135 can select from among several editing options, including, but not limited to, cut, copy, paste, delete, and insert. Thus, for example, video director 135 can easily delete icons from time sheet 299 or cut, copy, and paste icons on time sheet 299 as desired.

Each icon placed on time sheet 299 is associated with a timer value. Further each icon placed on time sheet 299 is associated with a video production command and a video production device or can be configured to be associated with a video production command and a video production device. For example, camera hot-key 802(1) is associated with camera 120 and the video production command associated with hot-key 802(1) is a camera control command, where the camera control command includes the location preset that is associated with camera hot-key 802(1).

The timer value associated with camera hot-key 802(1) is determined by its location on camera control line 1008. Each location on each control line 1003-1016 has an associated timer value. To determine the timer value associated with a particular location on a control line, video director 135 draws a line that is perpendicular to the control line and that intersects the particular location on the control line and also intersects timer 1002. The point of intersection on timer 1002 determines the timer value associated with the particular location on the control line. For example, line 1102, which is perpendicular to camera control line 1008, intersects timer 1002 at the six (6) second mark 1104. Thus, the timer value associated with camera hot-key 802(1) is six seconds.

To view the timer value associated with any icon placed on time sheet 299, such as camera hot-key 802(1), video director 135 clicks on the icon. Upon clicking on the icon a pop up window is displayed that shows the timer value associated with the icon. If the icon is then moved, the timer value associated with the icon changes, therefore the pop up window moves with the icon and continuously displays each new timer value associated with the icon. The timer value displayed by the pop up window is displayed in hours, minutes, seconds, and frames to allow video director 135 to perform fine timing adjustments.

To view and modify the timer value, the camera, and the location preset that is associated with camera hot-key 802(1), video director 135 opens a property page corresponding to camera hot-key 802(1). Each icon that is placed on time sheet 299 has a corresponding property page that can be viewed and modified by video director 135. To view and modify the property page for an icon placed on time sheet 299, video director 135 positions the mouse cursor over the icon and double clicks the left mouse button (double click). A property page is then displayed on the graphical user interface 133. The property page is unique to each icon. That is, relevant information for that icon is displayed.

Figure 12:
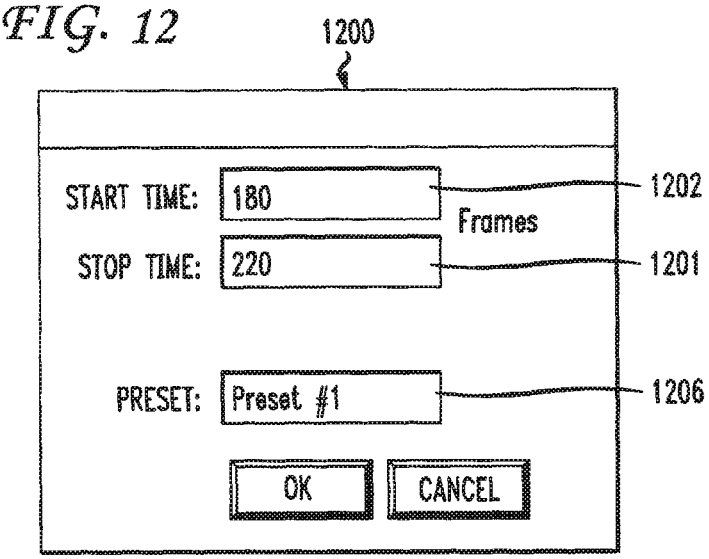
FIG. 12 illustrates an exemplary property page for camera hot-key 802(1).

FIG. 12 illustrates an exemplary property page 1200 for camera hot-key 802(1). Property page 1200 includes a start time field 1202. Start time field displays the timer value associated with the camera hot-key 802(1). As shown in FIG. 12, the timer value associated with camera hot-key 802(1) is 180 frames (6 seconds). In a preferred embodiment, the timer value is shown in the format "hh:mm:ss:ff" (i.e., hours, minutes, seconds, frames). Video director 135 can modify the timer value by entering in a new timer value into start time field 1202. If video director 135 enters a new timer value into start time field 1202, camera hot-key 802(1) will automatically move to the location on camera control line 1008 corresponding to the new timer value.

Property page 1200 further includes a camera field 1204 and a location preset field 1206. Camera field 1204 displays a camera identifier that identifies the camera that is associated with camera hot-key 802(1). Similarly, location preset field 1206 displays a location preset identifier that identifies the location preset that is associated with camera hot-key 802(1). Activating the preset field 1206 initiates a drop down box of preset hot-keys related to GUI 132, which allows the director to select a predefined configuration.

Referring again to FIG. 11, the video production device associated with fade-up icon 432 is audio mixer 110 and the video production command associated with fade-up icon 432 is an audio input channel five fade-up command. This is so because fade-up icon 432 is from audio input channel controller 405, which controls audio input channel five. When the audio input channel five fade-up command is transmitted to audio mixer 110, audio mixer 110 fades up audio channel five. The timer value associated with the fade-up icon 432 is determined by its location on audio mixer control line 1005. As line 1106 indicates, the timer value associated with fade-up icon 432 is ten seconds.

Figure 13:
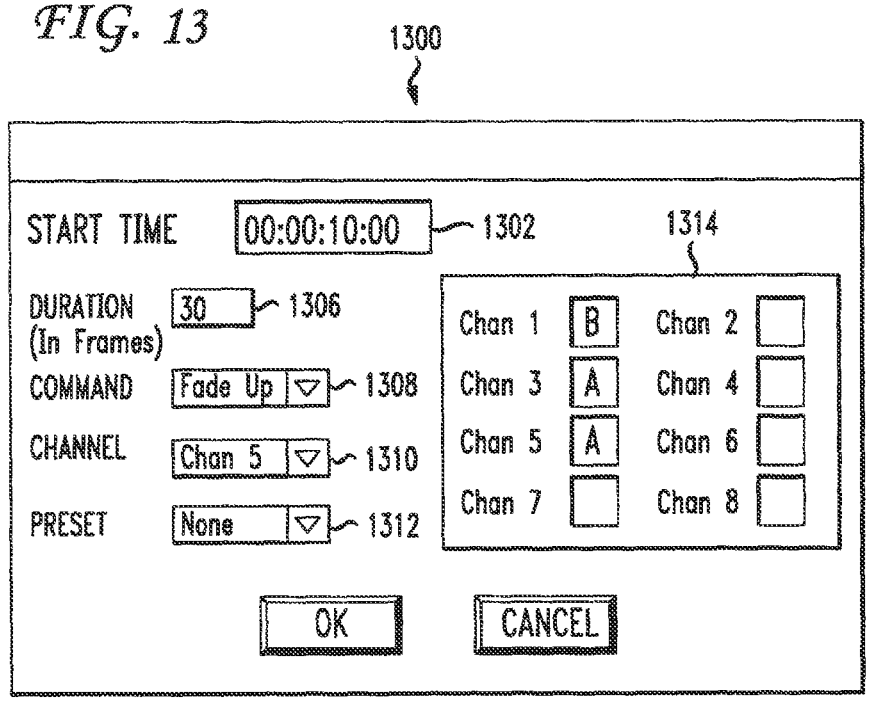
FIG. 13 illustrates an exemplary property page for fade-up icon 432.

FIG. 13 illustrates an exemplary property page 1300 for fade-up icon 432. Like property page 1200, property page 1300 includes a start time field 1302. Start time field displays the timer value associated with fade-up icon 432. As shown in FIG. 13, the timer value associated with fade-up icon 432 is 10 seconds. Video director 135 can modify the timer value displayed in start time field 1302.

Property page 1300 also includes a channel field 1310, a duration field 1306, a preset field 1312, a command field 1308, and sixteen group fields 1314. Command field 1308 displays the command associated with fade-up icon 432, which in this example is a fade up command. Channel field 1310 displays the audio input channel that is controlled by fade-up icon 432, which in this example is audio input channel five. Duration field 1306 displays the duration of the audio fade in frames. In this example, the duration is 30 frames (1 second). Preset field 1312 displays the preset icon 426 associated with fade-up icon 432. In this example, no preset icon 426 is associated with fade-up icon 432. Group fields 1314 display the group that each channel is a member of (in this example, channel 1 is a member of group B, channel 3 is a member of group A, and channel 5 is also a member of group A).

Given the above configuration, when fade-up icon 432 is activated, processing unit 102 sends a control command to audio mixer 110 that causes audio mixer 110 to fade up audio channel five and all of the audio channels that are a member of group A, which is the group in which channel five is a member. Video director 135 can modify the contents of property page 1300. For example, video director 135 can modify the duration of the fade up command by modifying the contents of duration field 1306. This gives video director 135 the ability to change how a show will be executed merely by modifying property pages.

Video director 135 is provided with a means to shift a group of icons placed on time sheet 299 to the left or to the right by a predetermined amount, thereby modifying the timer value associated with each icon in the group by the predetermined amount. Shifting a group of icons to the right is referred to as inserting time into time sheet 299, and shifting a group of icons to the left is referred to as deleting time from time sheet 299.

Figure 28:
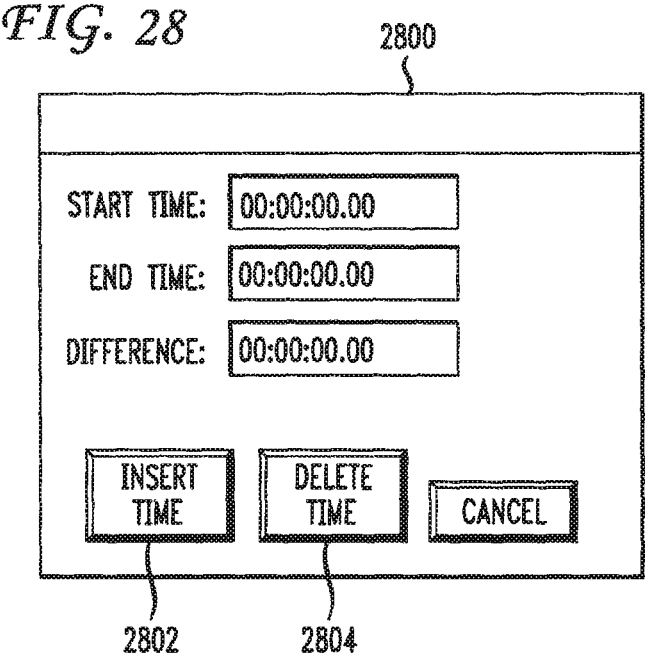
FIG. 28 illustrates an insert/delete time pop up window.

In one embodiment, video director 135 can insert time into time sheet 299 by positioning the mouse cursor on time sheet 299 at the location at which video director 135 desires to insert time. This location is referred to as the insert time location. Video director 135 then double clicks the left mouse button. With the left mouse button depressed, video director 135 moves the mouse cursor to a second location and then releases the left mouse button. The amount of time to be inserted is the absolute value of the difference between the timer value associated with the insert time location and the second location. Activating an insert time button 2802 on a pop up window 2800 (see FIG. 28), which is displayed when video director 135 double clicks the left mouse button, causes processing unit 102 to shift to the right all of the icons that are positioned to the right of the insert time location by the amount of time to be inserted.

In one embodiment, video director 135 can delete time from time sheet 299 by positioning the mouse cursor on time sheet 299 at the location at, which video director 135 desires to delete time. This location is referred to as the delete time location. Video director 135 then double clicks the left mouse button. With the left mouse button depressed, video director 135 moves the mouse cursor to a second location and then releases the left mouse button. The amount of time to be deleted is the absolute value of the difference between the timer value associated with the delete time location and the second location. Activating a delete time button 2804 on pop up window 2800 causes processing unit 102 to shift to the left all of the icons that are positioned to the right of the delete time location by the amount of time to be deleted.

Figure 14:
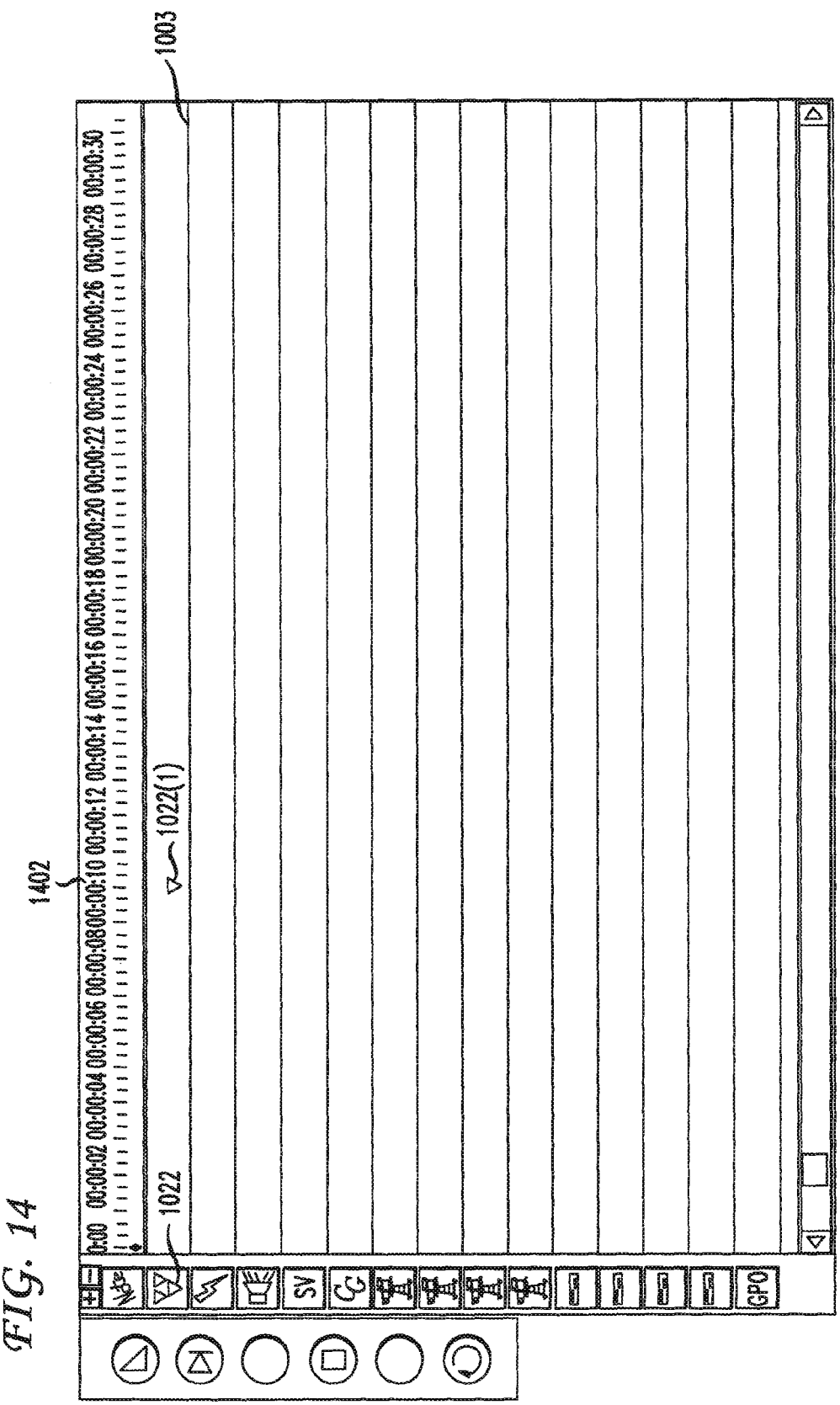
FIG. 14 illustrates a user mark icon.

Referring now to FIG. 14, user mark icon 1022 is described. User mark icon 1022 is provided for precisely associating a particular timer value with an icon placed on time sheet 299. For example, if video director 135 desired to place camera hot-key 802(1) on a camera control line such that the timer value associated with camera hot-key 802(1) is exactly 10 seconds, video director 135 first drags and drops user mark icon 1022 onto step mark control line 1003 at the ten second mark 1402. Video director 135 would then drag and drop camera hot-key 802(1) onto the user mark icon 1022(1). Camera hot-key 802(1) is then automatically placed on a camera control line such that the timer value associated with camera hot-key 802(1) is ten seconds. In short, any icon that is drag and dropped onto the user mark 1022(1) is automatically placed on the appropriate control line and has a timer value of ten seconds. This feature helps to provide multiple icons with the exact same timer value.

Once a transition macro is created by placing icons onto time sheet 299, the execution of a show can be automated by executing the transition macro. Referring again to FIG. 11, to execute the transition macro displayed therein, video director 135 activates timer 1002. In one embodiment, there are two ways to activate timer 1002. First, the video director 135 can use mouse 116 to activate transition macro start/step button 1052. Alternatively, teleprompting system 108 can transmit a transition macro start command to processing unit 102 using communication path 186. Teleprompting system 108 is described in more detail in a later section of this document.

Upon activating timer 1002, a time indicator 1099 moves across timer 1002, thereby indicating to video director 135 the status of timer 1002. When time indicator 1099 reaches six seconds, which is the timer value associated with camera hot-key 802(1), camera hot-key 802(1) is activated. Activating an icon that is placed on time sheet 299 means that processing unit 102 transmits the video production command associated with the icon to the video production device associated with the icon. Thus, when camera hot-key 802(1) is activated, processing unit 102 transmits a camera control command to the camera that is associated with camera hot-key 802(1), where the camera control command includes the location preset identifier that is associated with camera hot-key 802(1). Upon receiving the camera control command, the camera automatically adjusts itself according to the location preset identified by the preset identifier included in the camera control command. In this manner, a camera is automatically controlled.

When time indicator 1099 reaches ten seconds, which is the timer value associated with fade-up icon 432, Fade-up icon 432 is activated. This means that processing unit 102 transmits the command associated with fade-up icon 432, which is an audio input channel five fade-up command, to audio mixer 110. Upon receiving the command, audio mixer 110 fades-up audio input channel five. In this manner, audio mixer 110 is automatically controlled.

In the above manner, a transition macro provides for automatic control of video production devices and allows video director 135 to execute a show without a production crew.

Figure 15:
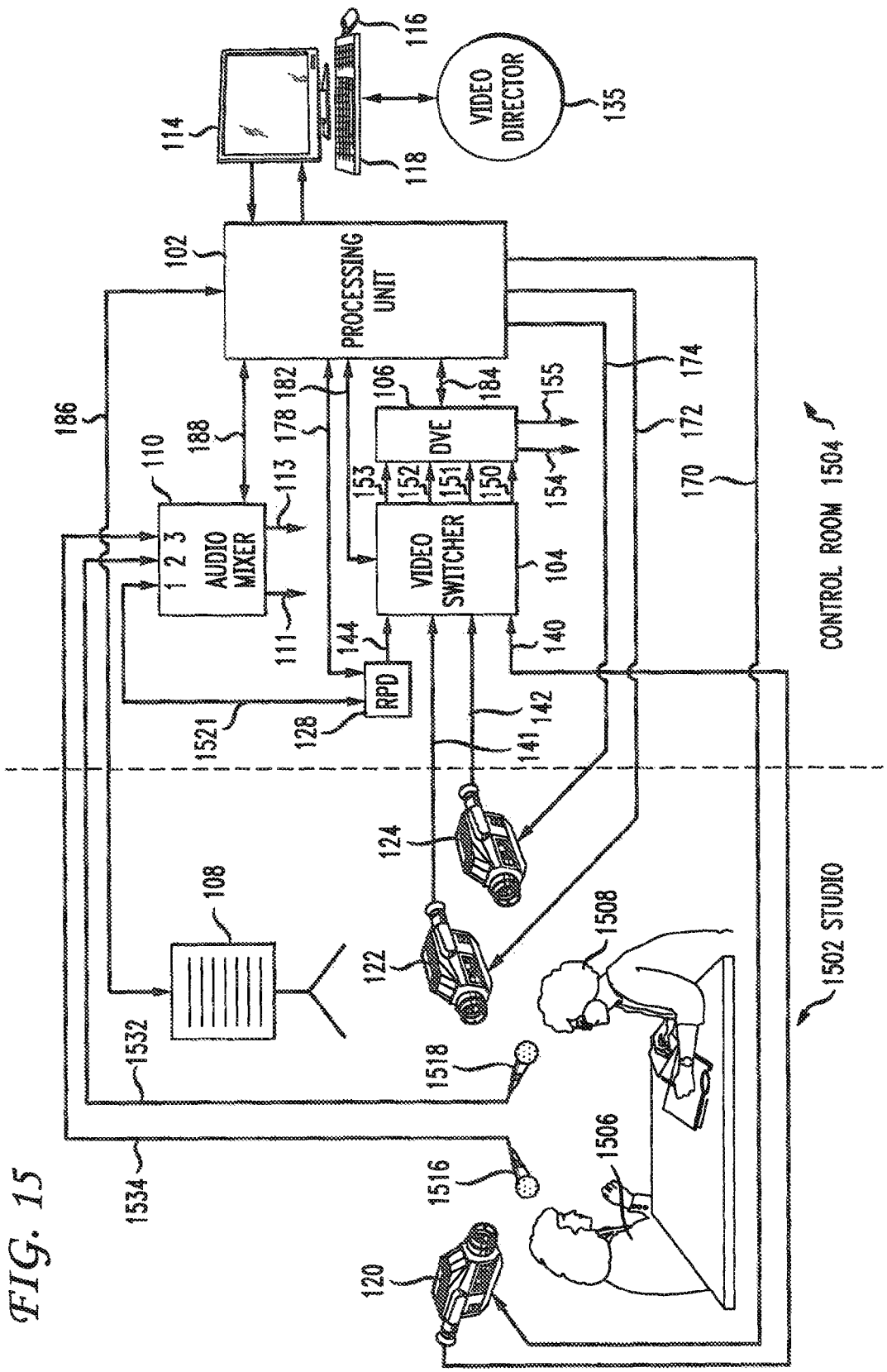
FIG. 15 illustrates an exemplary video production studio.

An example show and an example transition macro for automating the execution of the example show is described with reference to FIGS. 15 and 16. FIG. 15 illustrates an exemplary video production studio 1502 and an exemplary video production control room 1504. The example is a talk show with one host 1506 and one guest 1508.

In one embodiment, processing unit 102, video switcher 104, DVE 106, RPD 128, and audio mixer 110 are all within control room 1504. Cameras 120, 122, and 124 and microphones 1516 and 1518 are in the studio 1502. Video outputs 140, 141, and 142 from cameras 120, 122, and 124 are coupled to video switcher input ports 160, 161, and 162, respectively. Video output 144 of RPD 128 is coupled to video switcher input port 164. Audio output 1521 from RPD 128 is coupled to input 1 of audio mixer 110. Audio outputs 1532 and 1534 from microphones 1516 and 1518 are coupled to input 3 and 2 of audio mixer 110, respectively. Consequently, audio output 1521 is designated audio input channel one, audio output 1532 is designated audio input channel two, and audio output 1534 is designated audio input channel three.

The first step in automating the execution of the talk show is to pre-produce the show. Pre-producing a show means defining a production script for the show and then defining a director's rundown sheet for the show. A production script for a show defines the show's segments or layout. A director's rundown sheet defines all of the desired video production settings for each segment and all of the video production transitions between segments. For this example, the production script for the talk show has five segments, which are shown below:

(1) Welcome by host (6 seconds)
(2) Brief discussion between host and guest (8 seconds)
(3) Guest provides information on a movie the guest is starring in (8 seconds)
(4) Show brief video clip (4 seconds)
(5) Wrap-up and closing by host For this example, the desired video production settings are as follows. For the first segment, camera 120 is set to give a close-up shot of host 1506 and camera 120's video output 140 is coupled to program output 154, and the host's microphone 1516 is brought up.

For the second segment, camera 122 is set to give a wide shot of both the host 1506 and the guest 1508 and its video output 141 is connected to program output 154, and the guest's microphone 1518 is brought up. Because the program output has changed from camera 120 to camera 122 in going from segment one to segment two, a video transition needs to be defined. Possible video transitions include fading, wiping, or cutting. For this example, the transition will be a cut from camera 120 to camera 122.

For the third segment camera 124 is set to give a close-up shot of guest 1508 and its video output 142 is selected for program output. The video transition will be a cut from camera 122 to camera 124.

For the fourth segment video output 144 of RPD 128 is selected for program output, both the guest's and the host's microphone 1516 and 1518 are brought down, audio output 1521 of RPD 128 is brought up, the video transition is a fade from camera 124 to RPD video output 144, and RPD 128 is programmed to play a video segment.

For the fifth and final segment of the show, the video transition is a fade from RPD video output 144 to camera 120, camera 120 is set up for a close-up shot of the host 1506, the host's microphone 1516 is brought up, and audio output 1521 of RPD 128 is brought down.

After pre-producing a show as described above, video director 135 places the appropriate icons onto time sheet 299 to create a transition macro that will be used to automate the execution of the show.

Figure 16:
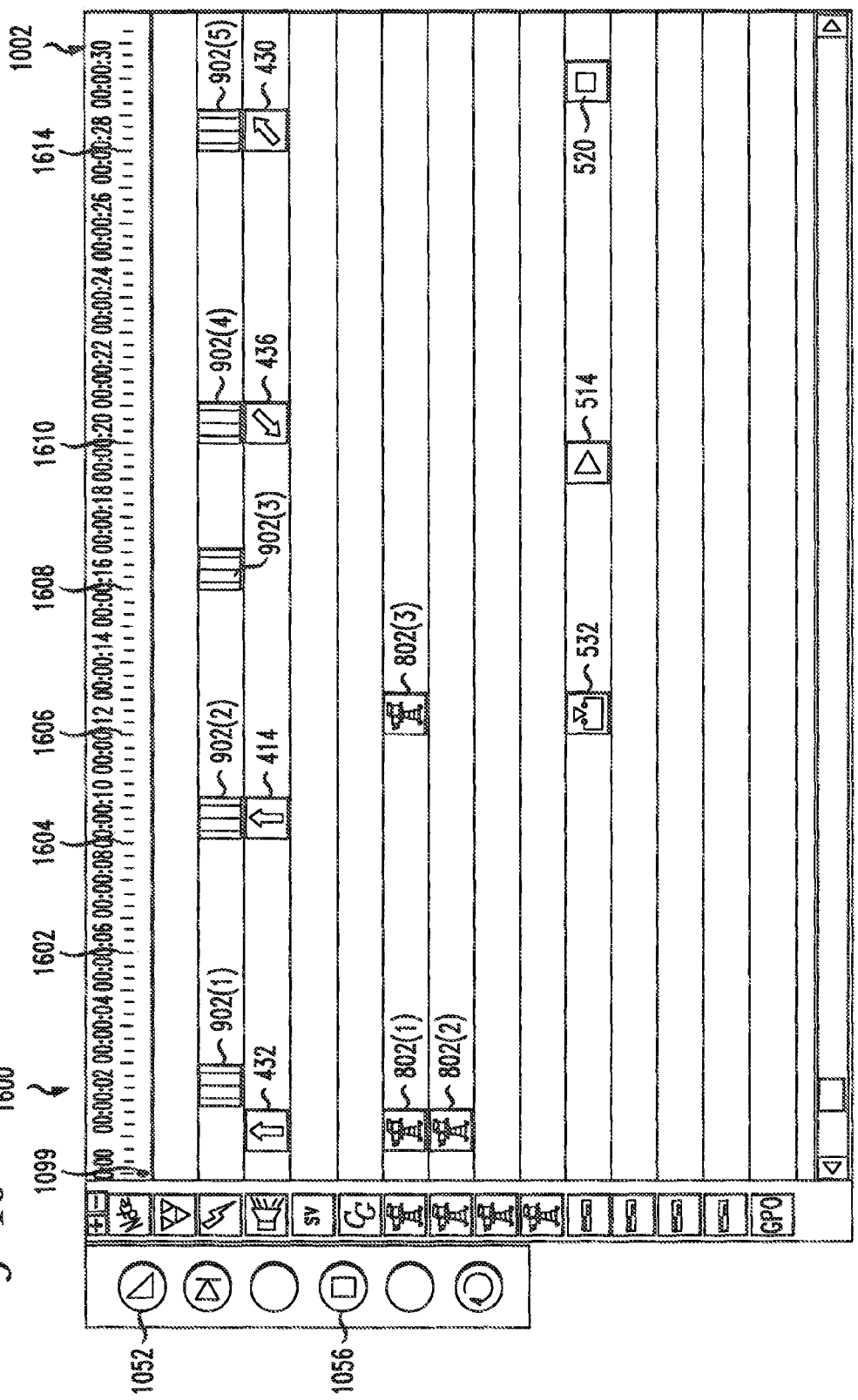
FIG. 16 illustrates an example transition macro.

FIG. 16 illustrates a simple example transition macro 1600 for producing the talk show described above. Obviously, other more complex transition macros could be used to produce the talk show.

Transition macro 1600 assumes that timer 1002 is activated two (2) seconds before the beginning of the first segment of the talk show. This two second period provides a set-up or cue period to ensure that the video production devices are set up properly for the first segment of the show.

Once timer 1002 is activated, elapsed time indicator 1099 moves across the timer 1002, thereby indicating to video director 135 the status of timer 1002. Timer 1002 can be stopped at any time by the video director 135 activating the transition macro stop button 1056. The timer 1002 can then be restarted manually by video director 135 activating start/step button 1052 or can be restarted automatically by a general purpose interface (GPI) trigger from an external source connected to GPI port 190 or by teleprompting system 108 transmitting a start command to processing unit 102 over communication interface 186.

As shown in FIG. 16, within the two second cue period there is a fade-up icon 432 and two camera hot-keys 802(1) and 802(2). The timer value associated with fade-up icon 432 and camera hot-keys 802(1) and 802(2) is one second.

Segment one of the talk show requires camera 120 to provide a close-up shot of host 1506. Thus, camera 120 is associated with camera hot-key 802(1) and a location preset that provides the desired close-up shot is associated with camera hot-key 802(1). When timer 1002 reaches one second, camera hot-key 802(1) is activated, which means that processing unit 102 sends a camera control command to camera 120, where the camera control command includes the camera preset associated with camera hot-key 802(1). Upon receiving the camera control command, camera 120 automatically adjusts itself to provide the desired close-up of the host 1506.

Similarly, segment one of the talk show requires the host's microphone 1516 be brought up. Microphone 1516 is connected to audio input channel five. Thus, fade-up icon 432, which controls audio input channel five, is placed within the two second cue period. When fade-up icon 432 is activated (that is, when timer 1002 reaches one second), processing unit 102 sends an audio mixer control command to audio mixer 110 using communication interface 188. The control command causes audio mixer 110 to fade up audio input channel five, which corresponds to the audio output 1534 of microphone 1516. In this manner, microphone 1516 is automatically brought up.

Camera hot-key 802(2) is configured such that when it is activated processing unit 102 sends a camera control command to camera 122 causing camera 122 to provide a wide-shot of the host 1506 and guest 1508. This camera shot is used during the second segment of the talk show.

At the two second mark 1602, which marks the beginning of the talk show, video transition hot-key 902(1) is placed on video transition control line 1004. Thus, when timer 1002 reads two seconds, video transition hot-key 901(1) is activated and processing unit 102 communicates with the video switcher 104 and DVE 106 to produce the desired video transition, which in this case is to couple the video output 140 of camera 120 to program output 154 and the video output 141 of camera 122 to preview output 155.

The eight second mark 1604 marks the beginning of the second talk show segment. At the eight second mark 1604 there is a video transition hot-key 902(2) and fade-up icon 414. Video transition hot-key 902(2) is configured to provide a cut transition effect from camera 120 to camera 122. Thus, when timer 1002 reaches eight seconds, processing unit 102 communicates with the video switcher 104 and DVE 106 to perform a cut from camera 120 to camera 122. Camera 122 was configured during the two second cue period by camera hot-key 802(2). Thus, by the time timer 1002 reaches eight second mark 1604, camera 122 is positioned and configured to provide the desired wide-shot of the host 1506 and the guest 1508.

Segment two of the talk show requires the guest's microphone 1518 to be brought up. Microphone 1518 is connected to audio input channel three. Thus, fade-up icon 414, which controls audio input channel three, is placed at the eight second mark 1604. When fade-up icon 414 is activated (that is, when timer 1002 reaches eight seconds), processing unit 102 sends an audio mixer control command to audio mixer 110 using communication interface 188. The control command causes audio mixer 110 to fade up audio input channel three, which corresponds to the audio output 1532 of microphone 1518. In this manner, microphone 1518 is automatically brought up.

Camera hot-key 802(3) is placed at the twelve second mark 1606. Camera hot-key 802(3) is configured to control camera 124 to provide a close-up shot of the guest 1508. This camera shot is to be used during the third segment of the show, which occurs at the sixteen second mark 1608.

Also placed at twelve second mark 1606, is RPD cue icon 532. Cue icon 532 is associated with a particular RPD and is associated with a particular timecode. The RPD that cue icon 532 is associated with is the RPD that was selected at the time cue icon was dragged and dropped onto time sheet 299. As described above with reference to FIG. 5, video director 135 selects an RPD by selecting one of the RPD select icons 502. In this example, RPD 128 was selected by video director 135 at the time cue icon 532 was dragged and dropped onto time sheet 299. Similarly, the timecode that cue icon 532 is associated with is the timecode that was displayed by timecode entry field 530 at the time cue icon 532 was dragged and dropped onto time sheet 299. Video director 135 can change the timecode associated with cue icon 532 by opening and editing the property page associated with cue icon 532.

Figure 17:
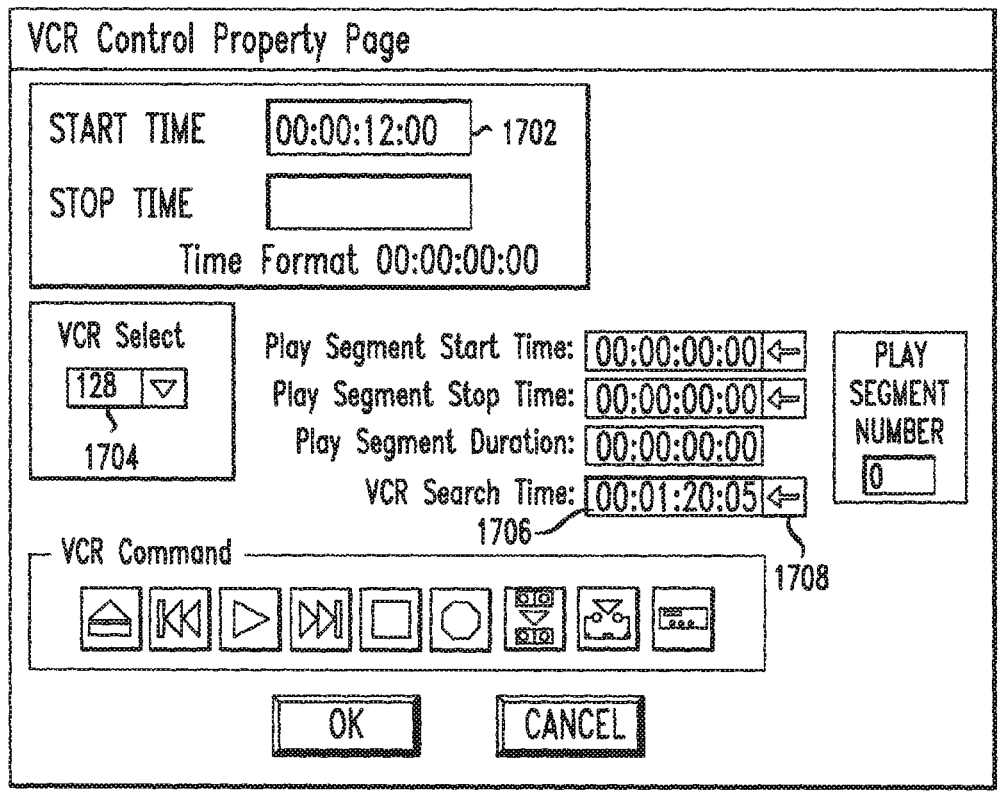
FIG. 17 illustrates an exemplary cue icon property page.

FIG. 17 illustrates the property page 1700 that is associated with cue icon 532. Property page 1700 includes a start time field 1702 that displays the timer value associated with cue icon 532, a RPD identifier field 1-704 that displays the RPD that is associated with cue icon 532, a timecode field 1706 for displaying the timecode that is associated with cue icon 532, and a cue mark button 1708 for enabling video director 135 to enter a timecode into timecode field 1706 simply by activating cue mark button 1708. For example, when video director 135 activates cue mark button 1708, the current timecode of the RPD identified in RPD identifier field 1704 is automatically placed in timecode field 1706. Therefore, video director 135 need not type in a timecode.

As illustrated in FIG. 17, the timer value associated with cue icon 532 is twelve seconds (360 frames), the RPD associated with cue icon 532 is RPD 128, and the timecode associated with cue icon 532 is 00:01:20:05. When cue icon 532 is activated, processing unit 102 sends a cue command to RPD 128. The cue command transmitted to RPD 128 includes the timecode that is associated with cue icon 532. Upon receiving the cue command, RPD 128 searches for the frame specified by the timecode in the cue command. In this manner, a video tape can be automatically cued.

At the sixteen second mark 1608, which marks the beginning of the third segment of the show, there is a video transition hot-key 902(3). Video transition hot-key 902(3) is configured to provide a video cut transition from camera 122 to camera 124. Camera 124 is configured to provide a close-up shot of the guest 1508 as a result of camera hot-key 802(3) being activated at the twelve second mark 1606.

The third segment of the show should last four seconds, therefore, the twenty second mark 1610 marks the beginning of the fourth show segment. During the fourth show segment a video clip is to be shown to the show's audience. Consequently, placed just before the twenty second mark 1610 is RPD play icon 514, and placed at the twenty second mark is video transition hot-key 902(4) and cross fade-down icon 436.

When play icon 514 is activated, processing unit 102 transmits a play command to the RPD associated with play icon 514. The RPD associated with play icon 514 is the RPD that was selected by video director 135 at the time play icon 514 was dragged and dropped onto time sheet 299. As described above with reference to FIG. 5, video director 135 selects an RPD by selecting one of the RPD select icons 502. In this example, RPD 128 was selected by video director 135 at the time play icon 514 was dragged and dropped onto time sheet 299.

Video transition hot-key 902(4) is configured to provide a fade transition from camera 124 to RPD 128, such that the video output 144 of RPD 128 is coupled to program output 154. Play icon 514 is placed on time sheet 299 before video transition hot-key 902(4) so that by the time video transition hot-key 902(4) is activated, there is a clean video signal on video output 144 or RPD 128.

Figure 18:
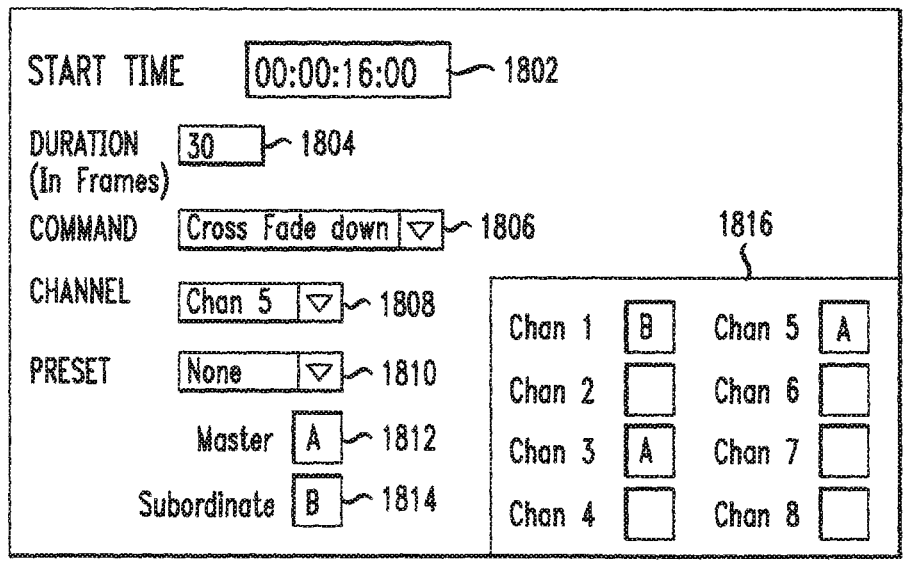
FIG. 18 illustrates an exemplary cross-fade-down icon property page.

Cross-fade-down icon 436 is configured to fade down the host's and guest's microphone 1516 and 1518, respectively, and simultaneously fade up audio output 1521 of RPD 128. FIG. 18 illustrates a property page 1800 that is associated with cross-fade-down icon 436. Video director 135 can change the configuration of cross-fade-down icon 436 by editing property page 1800.

Property page 1800 includes a start time field 1802 that displays the timer value associated with cross-fade-down icon 436, a duration field 1804 that displays the fade duration (in frames), a command field 1806 that displays the command associated with icon 436, an audio channel field 1808 that displays the audio channel that is associated with cross-fade-down icon 436, a preset field 1810 that displays the preset associated with icon 436, a master group field 1812 that displays the master group (in this example, group A is the master group), a subordinate group field 1814 that displays the subordinate group (in this example, group B is the subordinate group), and eight group fields 1814 that displays the group that each channel is a member of (in this example, channel 1 is a member of group B, channel 3 is a member of group A, and channel 5 is also a member of group A). Given the above configuration, when cross-fade-down icon 436 is activated, processing unit 102 sends a control command to audio mixer 110 that causes audio mixer 110 to fade down all of the audio channels that are a member of group A (in this case, channel 3 and channel 5) and to simultaneously fade up all channels that are a member of group B (in this case, channel 1). As described above with reference to FIG. 15, microphones 1516 and 1518 are associated with channel 3 and channel 5, respectively, and the audio output 1521 of RPD 128 is associated with channel 1. Thus, when cross-fade-down icon 436 is activated, microphones 1516 and 1518 are faded down according to the fade duration displayed in duration field 1804, while audio output 1521 is faded up.

Referring again to FIG. 16, the twenty-eight second mark 1614 marks the beginning of the fifth and final show segment. Video transition hot-key 902(5) and cross-fade up icon 430 are placed at the twenty-eight second mark 1614. RPD stop icon 520 is placed after both video transition hot-key 902(5) and cross-fade up icon 430 to prevent any undesired video/audio pauses on air. The video transition hot-key 902(5) is configured to provide a fade transition from RPD 128 to camera 120, such that the video output 140 of camera 120 is coupled to program output 154. The cross-fade up icon 430 is configured to fade up the host's and guest's microphone 1516 and 1518 while simultaneously fading down audio output 1521 of RPD 128. RPD stop icon 520 causes processing unit 102 to send a stop play command to RPD 128 when stop icon 520 is activated.

As is illustrated in the above example, a live show can be executed automatically without the need of a production crew to operate the video production devices used in producing the show. That is, by pre-producing a show and then creating a transition macro, a live show can be automatically executed by executing the transition macro. Consequently, a team of video production professionals is not needed to operate the various video production devices used in producing the show.

FIG. 16 illustrated a fully automatic transition macro 1600. That is, a transition macro in which timer 1002 is not paused at predetermined pause points. However, the invention also contemplates a semi-automatic transition macro. A semi-automatic transition macro is a transition macro in which timer 1002 is paused at predetermined pause points. A semi-automatic transition macro provides video director 135 with greater control in executing a show.

Referring again to FIG. 10, a semi-automatic transition macro is created using step mark icon 1018 or general purpose input (GPI) mark icon 1020. By placing a step mark icon 1018 or a GPI mark icon 1020 onto step mark control line 1003, video director 135 specifies a point when timer 1002 should automatically stop running. That is, timer 1002 stops running without video director 135 having to activate the stop button 1056 or without an external device transmitting a timer stop command to processing unit 102. After timer 1002 is stopped by a step mark icon 1018, timer 1002 can be restarted either manually by the video director 135 activating start/step button 1052 or automatically by an external device, such as the teleprompting system 108, transmitting a step command to processing unit 102. Similarly, after timer 1002 is stopped by a GPI mark icon 1020, timer 1002 can be restarted by receiving a GPI input on GPI interface 190.

Step mark icon 1018 and GPI mark icon 1020 also serve to logically break a transition macro into two or more segments. Video director 135 places step mark icon 1018 and GPI mark icon 1020 onto step mark control line 1003 by dragging and dropping step mark icon 1018 and GPI mark icon 1020, respectively.

Figure 19:
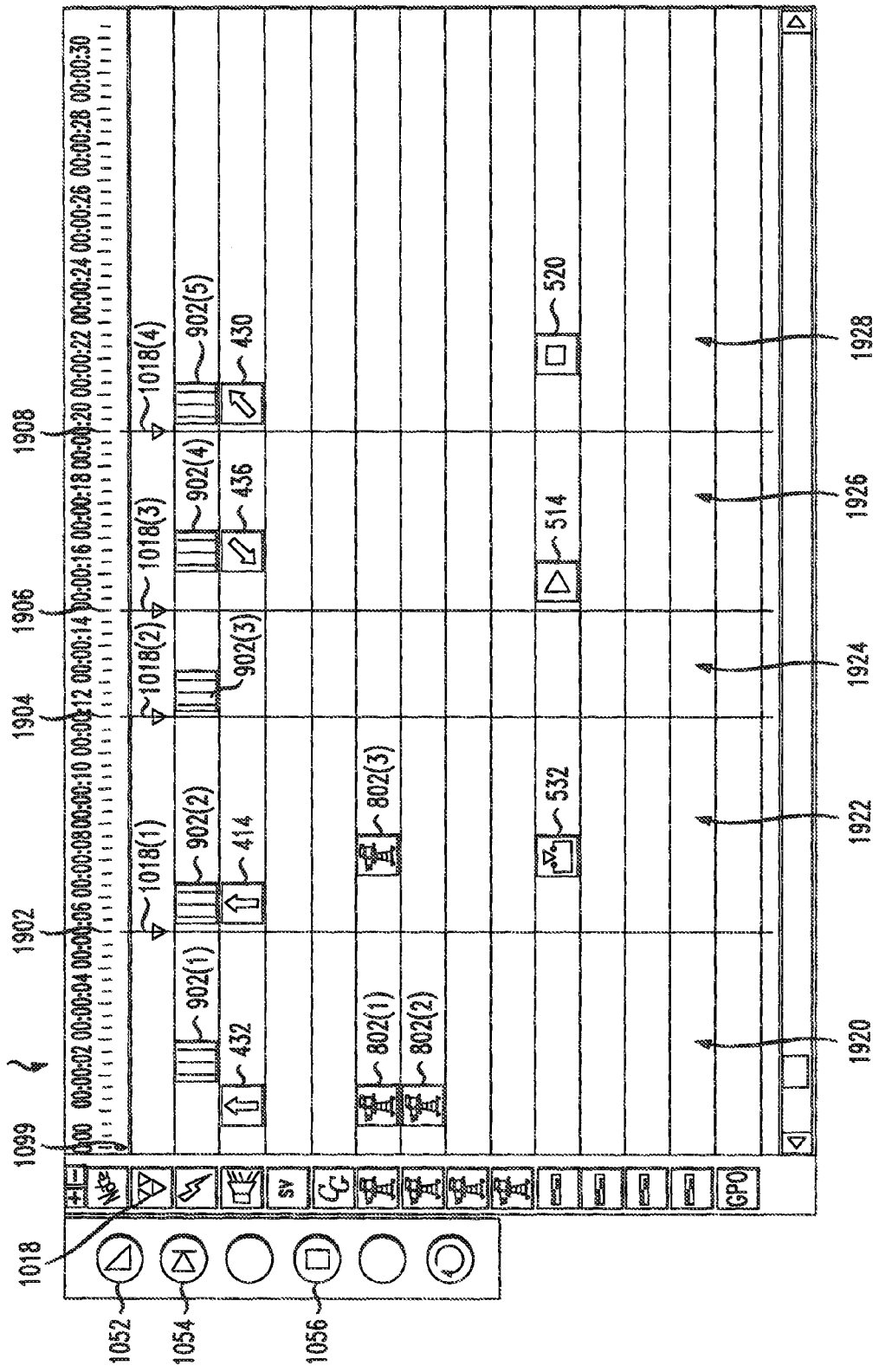
FIG. 19 illustrates an example semi-automatic transition macro.

FIG. 19 illustrates a semi-automatic transition macro 1900 that can be used to execute the talk show described above. The icons that form semi-automatic transition macro 1900 are the exact same icons that form transition macro 1600 illustrated in FIG. 16. The difference between the fully automatic transition macro illustrated in FIG. 16 and the semi-automatic transition macro illustrated in FIG. 19 is the location of the icons on the control lines and the use of step mark icons 1018(1)-(4).

As illustrated in FIG. 19, step mark icon 1018(1) is placed at the six second mark 1902, step mark icon 1018(2) is placed at the ten second mark 1904, step mark icon 1018(3) is placed at the twelve second mark 1906, and step mark icon 1018(4) is placed at the fourteen second mark 1908. Thus, because of the placement of step mark icons 1018(1)-(4) on step mark control line 1003, timer 1002 will automatically stop running when it reaches the six second mark 1902, the ten second mark 1904, the twelve second mark 1906, and the fourteen second mark 1908. Step mark icons 1018(1)-(4) also logically divide transition macro 1900 into five segments: segment 1920, segment 1922, segment 1924, segment 1926, and segment 1928.

When timer 1002 is activated, time indicator 1099 moves across timer 1002, thereby indicating the status of timer 1002. Like Transition macro 1600, the timer value associated with icons 432, 802(1) and 802(2) shown in FIG. 19 is one second and the timer value associated with icon 902(1) is two seconds. Thus, like Transition macro 1600, icons 432, 802(1) and 802(2) are activated when timer 1002 reaches one second and icon 902(1) is activated when timer 1002 reaches two seconds.

Unlike Transition macro 1600, however, when timer 1002 reaches six seconds, timer 1002 automatically stops running because of the presence of step mark icon 1018(1) at the six second mark 1902. Because icons 902(2) and 414 are placed just after the six second mark, those icons have a timer value that is greater than six seconds. Thus, those icons are not activated until timer 1002 is restarted because timer 1002 is stopped at the six second mark 1902 by step mark icon 1018 (1).

This feature provides video director 135 with greater control in executing a show. This is because shows do not always proceed as planned. For example, it is planned that the first segment of the talk show (the welcome by the host) is planned to last for six seconds. But, for one reason or another, the first segment of the talk show may take longer than six seconds or may take less than six seconds to complete. If it takes longer than six seconds to complete, then icon 902(2) in transition macro 1600, which should only be activated when the first segment of the talk show has completed, would be activated prematurely. This is because icon 902(2) of transition macro 1600 is automatically activated eight seconds after timer 1002 is activated, and timer 1002 is activated two seconds before the beginning of the first talk show segment. Likewise, if the first segment of the talk show concludes in less than six seconds, then icon 902(2) in transition macro 1600 would be activated too late.

This problem does not occur with semi-automatic transition macro 1900. Semi-automatic transition macro 1900 allows video director 135 to control when icon 902(2) is activated because video director 135 controls when timer 1002 is restarted after having been stopped by step mark icon 1018(1). For example, referring to FIG. 19, if the timer value associated with icon 902(2) is 6.2 seconds, then 0.2 seconds after director restarts timer 1002 after it has been stopped at step mark icon 1018(1), icon 902(2) is activated because 0.2 seconds after director restarts timer 1002, timer 1002 would read 6.2 seconds. Semi-automatic transition macro 1900, however, requires video director 135 to pay close attention to the progress of the talk show. Video director 135 must recognize the end of each talk show segment so that he or she knows when to restart timer 1002. This represents an "event" driven transition macro, which is typical for talk show formats.

Shortly after timer 1002 is restarted after being stopped by step mark 1018(1), icons 902(2) and 414 are activated according to their timer values. For example, icons 902(2) and 414 have a timer value of 6.2 seconds, thus when timer 1002 reaches 6.2 seconds, the icons 902(2) and 414 are activated. Icons 802(3) and 532 have a timer value of eight seconds, thus when timer 1002 reaches eight seconds those icons are activated.

When timer 1002 reaches twelve seconds, timer 1002 is stopped by step mark icon 1018(2). When the second segment of the talk show has completed, video director 135 restarts timer 1002. Shortly after timer 1002 is restarted icon 902(3), which has a timer value of 12.1 seconds, is activated. Timer 1002 continues running until it reaches step mark icon 1018 (3), which is placed at the fifteen second mark 1906.

When the third segment of the talk show has completed, video director 135 restarts timer 1002. Shortly after timer 1002 is restarted icon 514, which has a timer value of 15.1 seconds, is activated. Shortly thereafter, when timer 1002 reaches sixteen second mark 1907, icons 902(4) and 436, which each have a timer value of sixteen seconds, are activated. Timer 1002 continues running until it reaches step mark icon 1018(4), which is placed at the twenty second mark 1908.

When the fourth segment of the talk show has completed, video director 135 restarts timer 1002. Shortly after timer 1002 is restarted icons 902(5) and 430, which have a timer value of 20.1 seconds, are activated. Shortly thereafter, when timer 1002 reaches 20.5 seconds, icon 520 is activated.

As illustrated in FIG. 19, semi-automatic transition macro 1900 provides video director 135 with more control in executing a show than does the fully automatic transition macro illustrated in FIG. 16. With semi-automatic transition macro 1900 video director 135 has complete control in determining when the icons that form transition macro 1900 are activated.

A preview feature is provided with the semi-automatic feature described above. The preview feature allows video director to preview a video signal before it is transitioned to program output 154. In one embodiment, when timer 1002 is stopped at a step mark, processing unit 102 looks for the first video transition hot-key 902 that is placed after the step mark. Processing unit 102 then sends a command to video switcher 104 and DVE 106 such that the video source that is configured to be coupled to program output 154 when the video transition hot-key is activated is coupled to DVE preview output 155. For example, referring to FIG. 19, video transition hot-key 902(2) is configured such that video output 141 from camera 122 will be coupled to program output 154 when video transition hot-key 902(2) is activated. Furthermore, video transition hot-key 902(2) is the first video transition hot-key that is placed after step mark 1018(1). Therefore, when timer 1002 is stopped at step mark 1018(1), processing unit sends a command to video switcher 104 and DVE 106 to couple video output 141 from camera 122 to preview output 155. Typically, preview output 155 is connected to a preview monitor. This allows video director 135 to see exactly what the next camera shot looks like before the next camera shot is coupled to program output 154. This feature is important when executing a live show, such as a nightly news broadcast.

A transition macro, whether it is semi-automatic or fully automatic, can be stored in a file for later retrieval and modification. This allows video director 135 to store show "templates." A show template is a generic transition macro that can be re-used many times to produce a variety of different shows. By storing show templates, new shows can easily be produced by leveraging a previously created transition macro. Video director 135 recalls the template by file name, makes the necessary modifications as required (according to the new rundown sheet) and saves the transition macro with a new file name. Leveraging "templates" can save time, improve quality and preserve format consistency.

Referring back to FIG. 2B, Video director 135 saves a transition macro to a file by activating a save button 250. Upon activating save button 250, video director 135 is prompted for a file name. After providing a file name, the current transition macro is saved with that file name. The transition macro can then be retrieved at a later time, modified, and saved under a new name by activating a "save as" button 252. To open a previously saved transition macro, video director 135 activates an open file button 249. Upon activating open file button 249, video director 135 is prompted for a file name. At this point, video director 135 enters the desired file name and the file is then retrieved and the transition macro is displayed on time sheet 299. All of these commands are also accessible through pull-down menu items on GUI 133.

Referring still to FIG. 2B, in one embodiment, video director 135 has the capability to create a transition macro play-list. A transition macro play-list is a sequential list of transition macro files.

Video director 135 creates a transition macro play-list by inserting transition macro files into play-list window 262. To insert a transition macro file into play-list window 262, video director 135 activates an insert file button 260. Upon activating insert file button 260, video director 135 selects a transition macro file that has been previously saved and stored in processing unit 102. After video director 135 selects a transition macro file, the transition macro file is inserted into play-list window 262. To insert additional transition macro files to play-list window 262, video director 135 merely activates insert file button 260. To delete a transition macro file from play-list window 262, video director 135 selects the transition macro file using mouse 116 or other device, and then either drags the file to delete icon 261 or activates a delete button on keyboard 118.

Video director 135 can also name and save a transition macro play-list. To name and save a transition macro play-list, video director 135 activates save button 265. Upon activating save button, video director 135 is prompted to name the transition macro play-list. After naming the transition macro play-list, the transition macro play-list is saved to a file. To load a previously saved transition macro play-list into play-list window 262, video director 135 activates play-list open button 264. Upon activating play-list open button 264, video director 135 selects a transition macro play-list that has been previously saved and stored to a file. After video director 135 selects a transition macro play-list, each transition macro file that is in the play-list is inserted into play-list window 262. To insert additional transition macro files to play-list window 262, video director 135 merely activates insert file button 260.

Once a play-list has been created by inserting transition macro files into play-list window 262, the play-list can be executed automatically with a touch of a single button. To automatically execute a play-list, video director 135 first double clicks the top transition macro file in play-list window 262, thereby loading the top transition macro file in the play-list into transition macro time sheet 299. Video director 135 then activates auto-play/step button 266. Activating auto-play/step button 266 activates transition macro timer 1002. When the currently executing transition macro finishes executing, the next transition macro file specified in the play-list is loaded into transition macro time sheet 299 and automatically executed. This process continues until all of the transition macro files in the play-list are executed.

The advantage of the transition macro play-list feature is that it enables the video director 135 to execute a show using multiple transition macros. Consequently, instead of creating one very large transition macro to execute a show, a video director 135 can create several small, more manageable transition macros to execute the show.

As a show is executed from the transition macro, a show script file is created and stored by filename for seamless, continuous scrolling and future recall. Each segment on the show has an associated story file that contains the script and related elements. As each segment is broadcasted, the story file for the subsequent segment is automatically appended to the story file for the active segment. Once the file is appended, video director 135 cannot detach the file to drop the news story. The appended file also includes instructions for teleprompting system 108 to cue the talent for the upcoming news story, i.e. VO, SOT, CAM-3, etc. Upon completion of the broadcast, the show script file contains all of the appended files.

Referring back to FIG. 2B, another feature of the present invention is that a transition macro or a segment of a transition macro can be associated with one of many transition macro hot-keys 212. When a transition macro hot-key 212 is activated by video director 135, the transition macro or the transition macro segment associated with the hot-key 212 is automatically inserted into the current transition macro wherever time indicator 1099 happens to be located. The video director 135 can activate a transition macro hot-key at any time, even when the current transition macro is in the middle of being executed. A further feature is that each transition macro hot-key has an associated label for identifying each hot-key 212.

Transition macro hot-keys 212 are typically used for "late breaking news" stories that come in after a show has been pre-produced and after a transition macro has been created to execute the show. Typically, a video director 135 creates one or more late breaking news transition macro segments and associates each late breaking news transition macro segment with a transition macro hot-key 212. Thus, when a late breaking news event occurs, video director 135 merely need activate one of the transition macro hot-keys 212 to insert a late breaking news segment into a pre-existing transition macro.

In one embodiment, video director 135 associates a transition macro or a transition macro segment with a transition macro hot-key 212 by selecting one or more icons that have been placed onto time sheet 299. After selecting the one or more icons, video director 135 selects one of the transition macro hot-keys 212, such as transition macro hot-key 212(1). As a result, the selected icons are associated with transition macro hot-key 212(1). When video director 135 activates hot-key 212(1), the icons associated with hot-key 212(1) are inserted into the current transition macro that is displayed on time sheet 299. In this manner, in the event of last minute changes to a show's script, video director 135 can modify the show's transition macro to create a new transition macro that recognizes the changes to the script, even when the show is in the process of executing.

Alternatively, instead of using transition macro hot-keys 212 to modify an existing transition macro, video director 135 always has the ability to modify an existing transition macro by adding icons to and deleting icons from time sheet 299. However, transition macro hot-keys 212, provide a quicker and more precise way to add icons to an existing transition macro. In addition, a new transition macro can be assembled using pre-configured transition macro hot-keys 212 or using a combination of transition macro hot keys 212 and dragging and dropping icons.

Another feature of the present invention is that as the video show is executed, the transition macro routes signals to a tally controller on video switching, audio mixing and other configurable conditions to control tally lights on cameras, monitors and other equipment to make personnel and talent aware of "status." This tally controller also activates the lights based on the activity inside the studio, e.g. "ON AIR."

Another feature provided by the present invention is that video director 135 always has the ability to manually control the video production devices in communication with processing unit 102. This is true even when a transition macro is being executed. Thus, at any time, video director 135 can assume manual control over a video production. That is, video director 135 can manually control any video production device.

Teleprompting System

Figure 20:
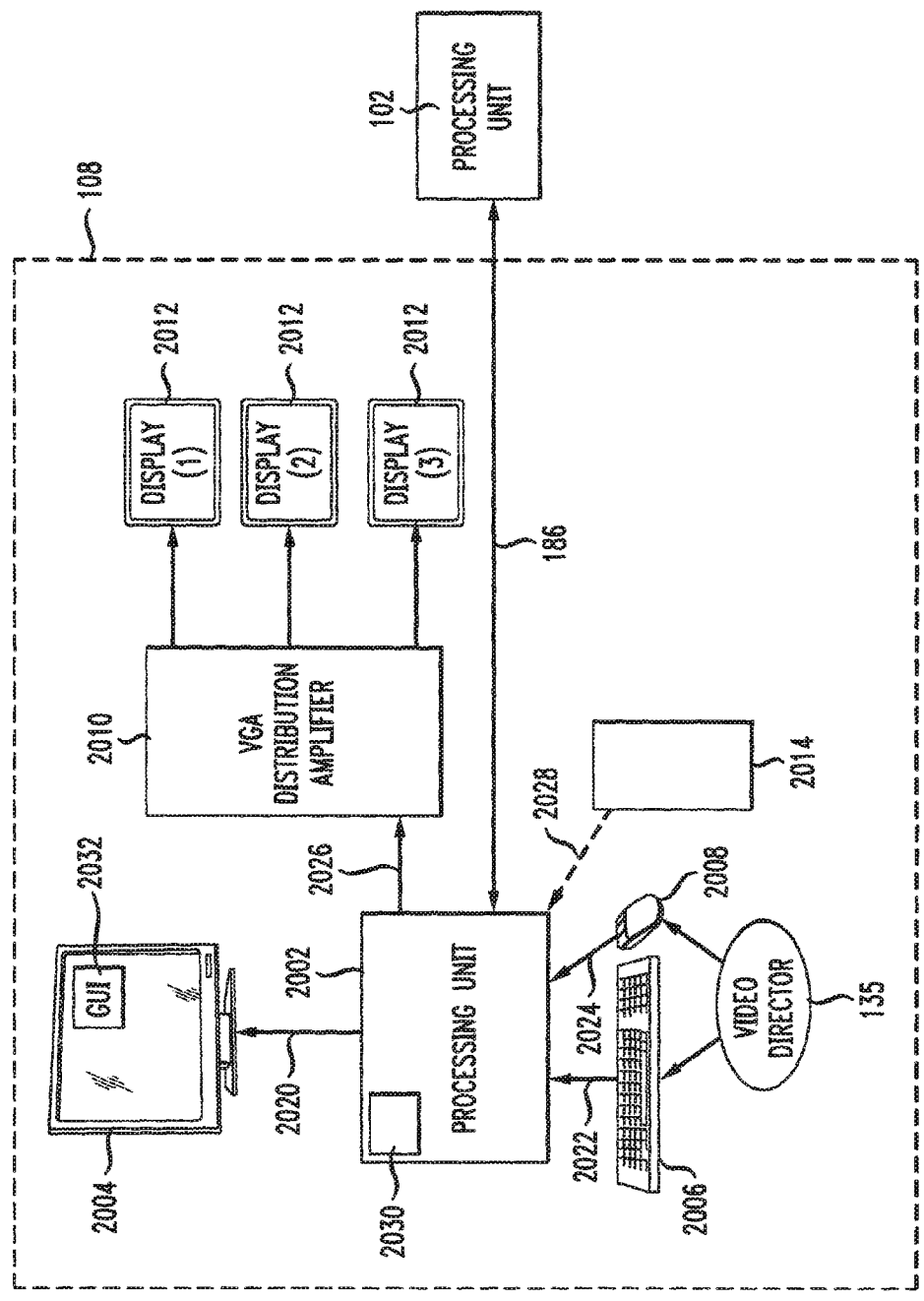
FIG. 20 illustrates a teleprompting system according to one embodiment.

FIG. 20 illustrates one embodiment of teleprompting system 108. In one embodiment, teleprompting system 108 includes a processing unit 2002, a monitor 2004, a keyboard 2006, a mouse 2008, a video graphics array (VGA) distribution amplifier 2010, and one or more displays 2012 for displaying a teleprompting script to the talent. Additionally, the system 108 includes a remote control keypad 2014 for remotely controlling processing unit 2002. The monitor 2004, the keyboard 2006, the mouse 2008, and amplifier 2010 are each coupled to processing unit 2002 preferably through cables 2020, 2022, 2024 and 2026, respectively. Remote control keypad 2014 is preferably coupled to processing unit 2002 through a radio frequency (RF) interface 2028.

Preferably, processing unit 2002 is controlled by the Microsoft Windows® operating system, and preferably includes software 2030 that enables a video director 135 to create and edit scripts that are to be displayed on display 2012. One embodiment of a graphical user interface 2032 that is created by software 2030 is illustrated in FIG. 21.

Figure 21:
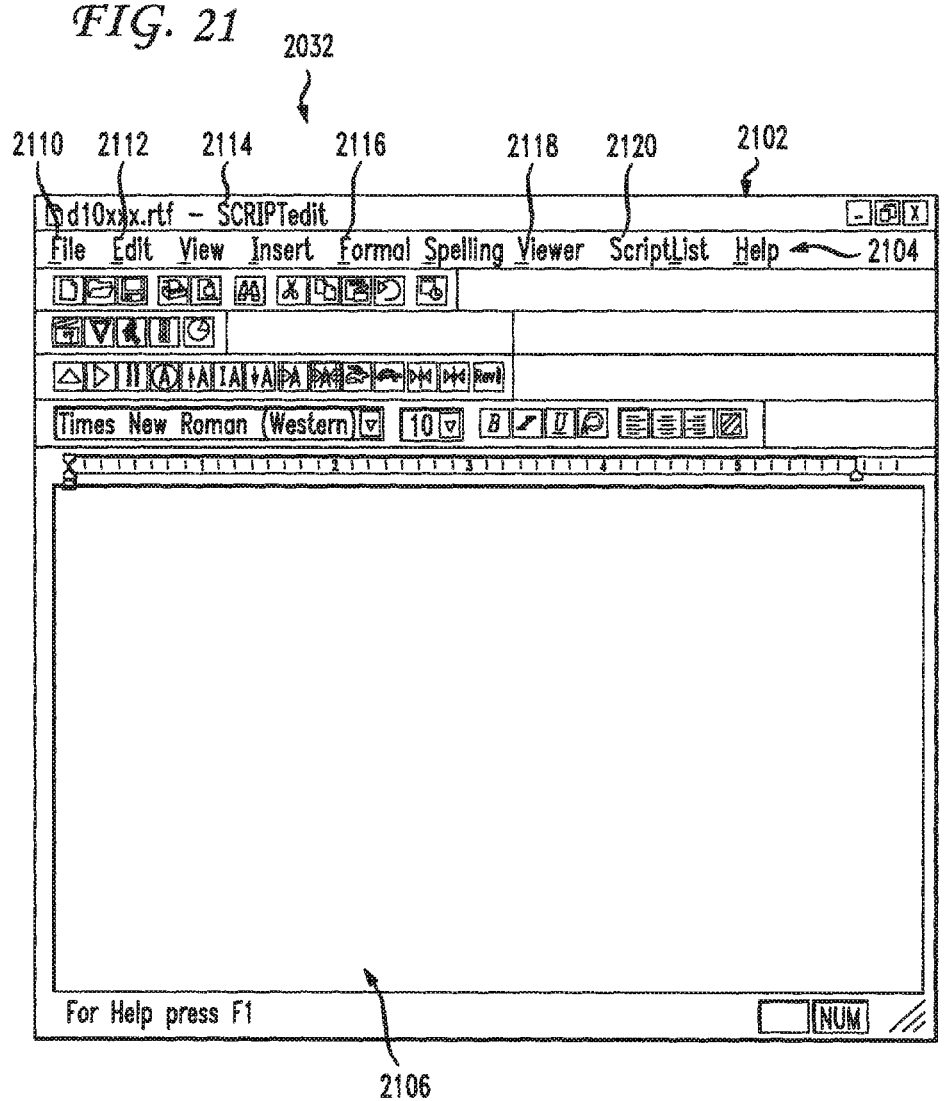
FIG. 21 illustrates the teleprompting system's graphical user interface (GUI).

As shown in FIG. 21, user interface 2032 includes a script edit window 2102. Script edit window 2102 allows video director 135 to create, edit, and run scripts of any length, at multiple speeds, in a variety of colors and fonts. Script edit window 2102 includes a menu bar 2104 for accessing the features of software 2030. There is also a text editing area 2106 used to import, write, and edit scripts.

By selecting a "file" option 2110 on menu bar 2104 video director 135 may open a blank edit window where video director 135 can create a new script, open an existing script for editing and/or playing, save an open script to a file, and print an open script to a printer.

By selecting an "edit" option 2112 on menu bar 2104 video director 135 may perform a variety of editing functions. Such functions include an undo function which reverses the last action, a cut function which cuts selected text and copies it to a clipboard, a copy function which copies selected text to the clipboard, and a paste function which pastes the contents of the clipboard at a cursor's 2108 insertion point.

The "insert" option 2114 on menu bar 2104 enables video director 135 to insert commands into a script in text edit window 2106. In one embodiment, video director 135 may insert the following commands into a script: a cue command, a delay command, a pause command, and a transition macro step command. The present invention is not limited to those commands just listed. As would be readily apparent to one skilled in the art, commands other than those just listed can be inserted into a script.

By selecting the cue command, video director 135 can enter a startup delay time for the script—this will pause application 2030 a given length of time before beginning to scroll the script. By inserting a delay command into a script, video director 135 can pause the script for a given length of time anywhere within the script. Inserting a pause command stops the script at the point the pause command was inserted until the script is manually restarted (or automatically restarted by a transition macro teleprompter play command). Finally, inserting a transition macro step command into a script causes processing unit 2002 to send a "start" command to processing unit 102 when the point in the script where the command was inserted is reached. Upon receiving the start command, processing unit 102 starts transition macro timer 1002 if it is currently not running. For example, if timer 1002 is stopped at step mark 650 and a "start" command is received at the processing unit 102, processing unit 102 will re-start timer 1002.

The "format" option 2116 on menu bar 2104 enables video director 135 to format the text that is entered into text edit window 2106. In one embodiment, video director 135 is given the option to change the font, the font size, and color of the text that is in text edit window 2106.

Once a script has been entered or loaded into text edit window 2106 and the various commands have been inserted into the script as desired, the script may be played. When a script is played the text of the script is scrolled across display screens 2012 at a predetermined scroll rate. Preferably, the scroll rate is measured in terms of words per minute.

In one embodiment, there are three ways to initiate the playing of a script. First, video director 135 can select a play option from viewer menu option 2118 on menu bar 2104. Second, the talent who is to read the script can select a play button 2402 (See FIG. 24) from remote control keypad 2014. Lastly, processing unit 102 can transmit a play command to processing unit 2002. For example, processing unit 102 sends a play command to processing unit 2002 in response to video director 135 activating play button 630.

Figure 22:
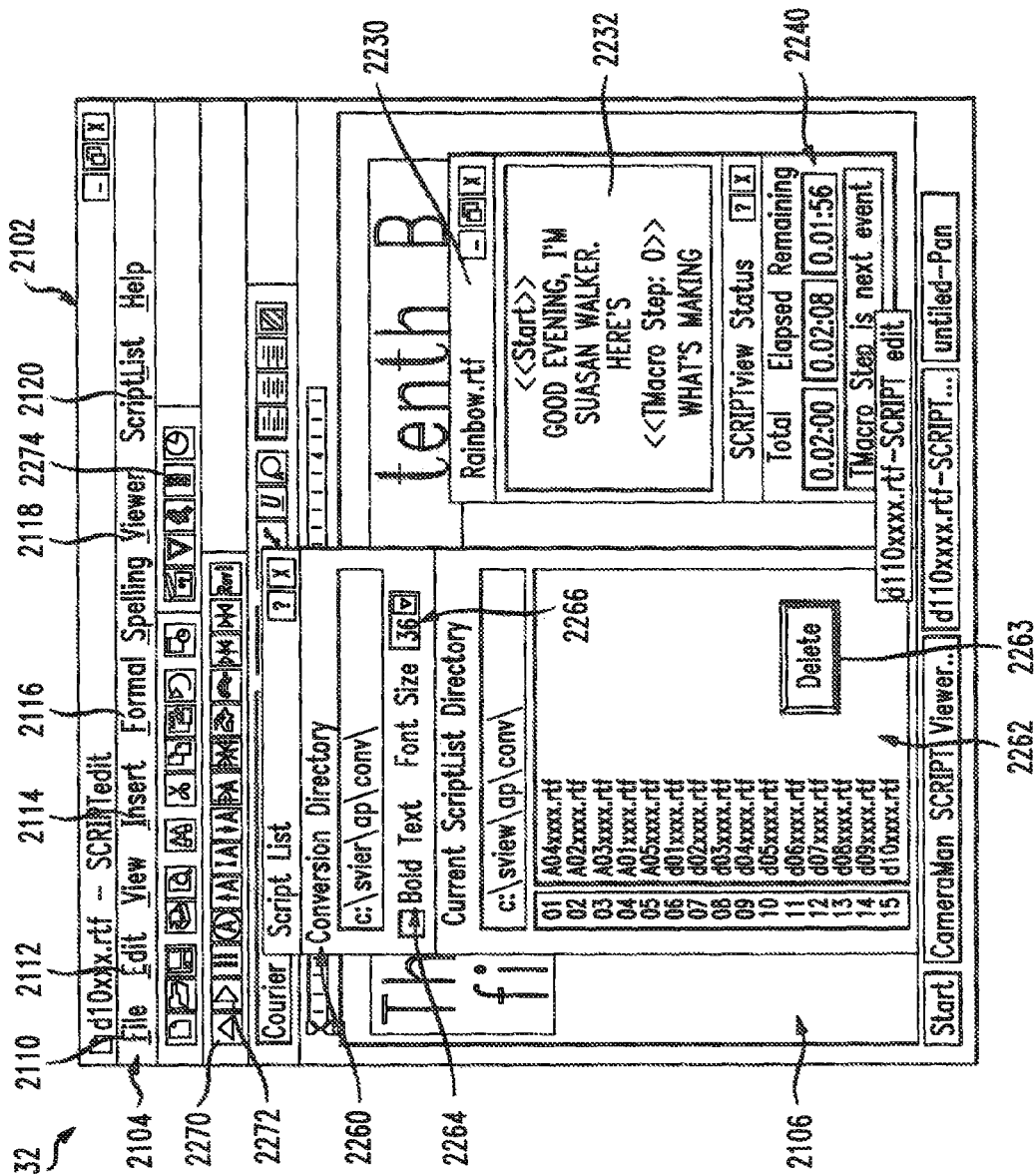
FIG. 22 illustrates an exemplary create script-list GUI window.

By selecting a "viewer" menu option 2118, a mini-viewer window 2230 and a status window 2240 are displayed on monitor 2004 (see FIG. 22). Mini-view window 2230 and status window 2240 are used as a feedback display for video director 135. The scrolling text is displayed in mini-viewer display area 2232 in the same manner that the scrolling text is displayed on displays 2012. Thus, video director 135 can see exactly what is being displayed to the talent who is to read the scrolling text from a display 2012. Status information, including total run time, elapsed run time and time remaining, is displayed in status window 2240.

The "script-list" menu option 2120 allows video director 135 to create and play a script-list. A script-list is a list of scripts to be played successively during a show. The script-list menu option 2120 also allows video director 135 to insert or delete scripts from a script-list. Upon selecting a create script-list option under script-list menu 2120, a create script-list window 2260 is displayed on monitor 2004 (see FIG. 22). Create script-list window 2260 includes a script-list window 2262, a bold text selection box 2264, a font size select window 2266 and a "delete" button 2263 that allows for the deletion of scripts from the list.

Video director 135 creates a script-list by selecting one or more previously saved scripts located using Windows Explorer. Once the scripts are located, video director 135 selects the appropriate scripts and then drags and drops them into the script-list window 2262. Once a script is added to script-list window 2262 it is converted from standard text format to rich text format. It is also converted to bold text if bold text selection box 2264 is checked by video director 135. Further, its font size is determined by the font size value that video director 135 enters into font size selection window 2266. This process is also used to add additional scripts to an existing script-list at a later date or time by dragging and dropping the additional scripts into the existing script-list at the appropriate location. The mouse pointer is used to identify the location point of where an additional script is to be placed. Finally, if a script needs to be deleted, video director 135 highlights the script in question and presses delete button 2263.

Activating home button 2270 or home button 608 directs teleprompting system to cue the script that is at the top of the script-list window 2262. Activating next script button 2272 or next file button 604 directs teleprompting system to select and cue up the next script in the script-list window 2262. Finally, activating play button 2274 or play button 630 directs teleprompting system to play the cued script. Additionally, commands to select and play a script within script-list window 2262 can be inserted into a transition macro by placing the appropriate icons from teleprompter graphical control 208, such as next file button 604, on teleprompter control line 1006.

The play-list feature is advantageous because it allows multiple reporters/writers to develop scripts in parallel and also organize them to correlate with the producer/director rundown sheet.

Figure 23A:
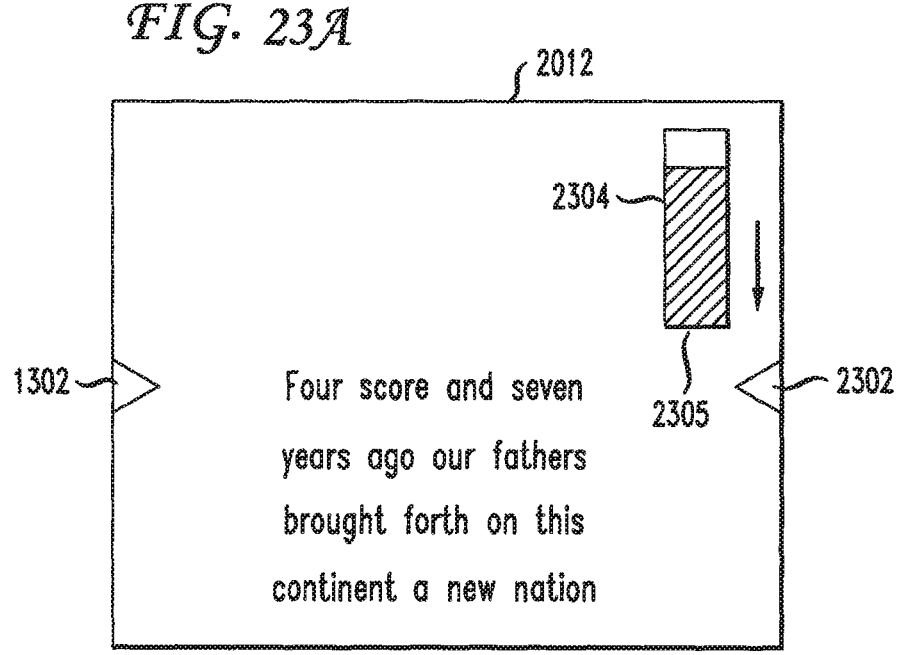
FIGS. 23A and 23B illustrate the playing of a script.
Figure 23B:
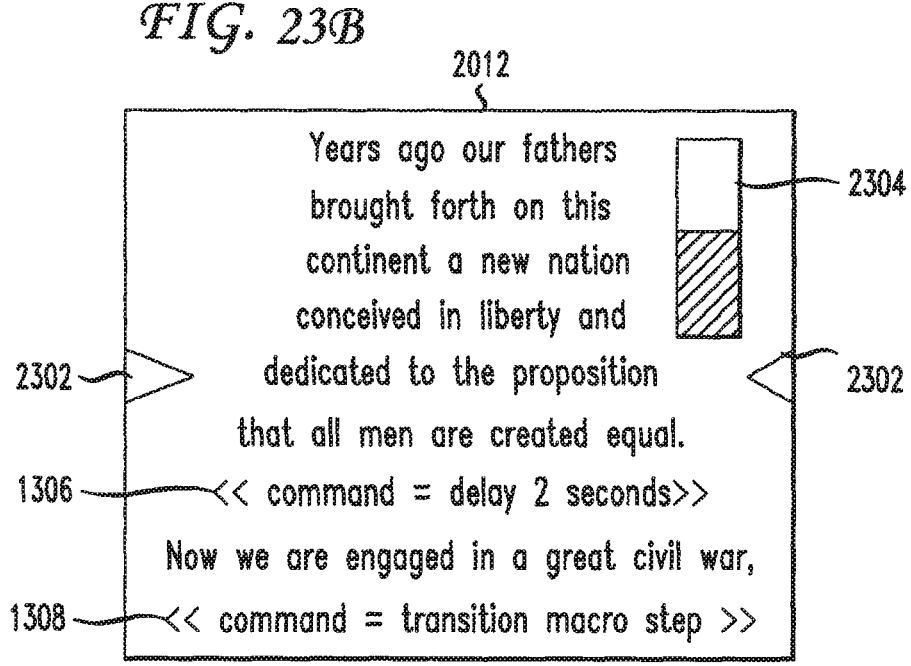

FIGS. 23A and 23B illustrate the playing of a script. More specifically, FIG. 23A illustrates flat panel display 2012 at a first point in time and FIG. 23B illustrates flat panel display 2012 at a later point in time. As shown in FIGS. 23A and 23B, the text of the script is scrolled across the display screen 2012. Also shown in FIG. 23B are two commands that have been inserted into the script. The first command is a delay command 2306 and the second command is a transition macro step command 2308. When the commands 2306 and 2308 reach the "read from" carats 2302, the commands are executed. That is, when delay command 2306 reaches the "read from" carats 2302, the scrolling of the script is stopped for a predetermined amount of time and is then automatically resumed. Similarly, when the transition macro step command 2308 reaches the read from carats 2302 a start command is transmitted from processing unit 2002 to processing unit 102. Upon receiving the start command, processing unit 102 activates timer 1002 if timer 1002 is not already activated.

A progress indicator 2304 is also provided on flat panel display 2012. The progress indicator 2304 indicates how much text remains in the script. Indicator 2305 moves downward (in the direction of the arrow) as the script scrolls from the beginning of the script towards the end.

Figure 24:
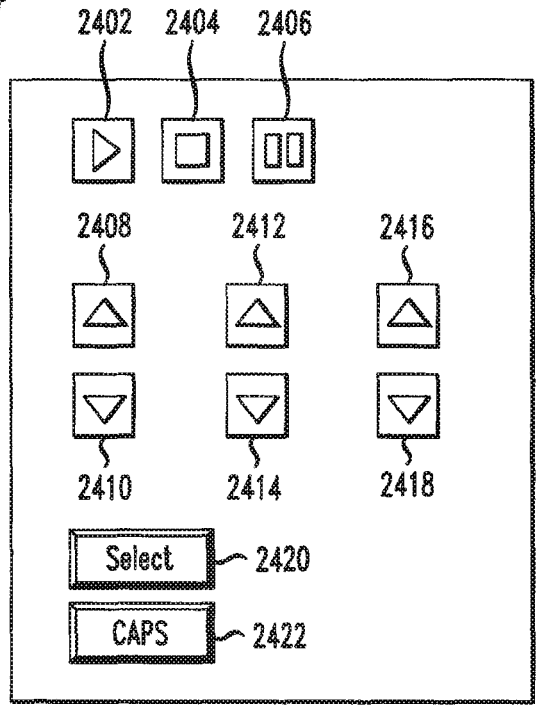
FIG. 24 illustrates an exemplary remote control keypad for remotely controlling the teleprompting system.

FIG. 24 illustrates one embodiment of remote control keypad 2014. In one embodiment, keypad 2014 includes a play button 2402, a stop button 2404, a pause button 2406, an increase speed button 2408, a decrease speed button 2410, an increase font size button 2412, a decrease font size button 2414, carat adjust buttons 2416 and 2418, a select button 2420, and a caps button 2422.

Select button 2420 allows video director 135 to select which script it would like loaded. Upon activating select button 2420, a list of saved scripts are displayed on display 2012. Increase speed button 2408 and decrease speed button 2410 are used to select one of the listed scripts.

After a script is loaded into the system, video director 135 can activate play button 2402. Upon activating play button 2402 the text of the script scrolls across display screen 2012 at the predetermined scroll rate. To increase or decrease the scroll rate video director 135 can activate the increase speed button 2408 or the decrease speed button 2410, respectively. To stop or pause the scrolling of the script video director 135 activates the stop button 2404 or pause button 2406, respectively.

Caps button 2422 puts the text of the playing script into all capital letters. Carat control button 2416 enables user to move the read from carats 2302 upward, whereas carat control button 2418 enables user to move the read from carats 2302 downward. Finally, to increase the font size of the playing script, video director 135 activates the increase font size button 2412, and to decrease the font size of the text of the playing script video director-135 activates the decrease font size button 2414.

Keypad 2014 communicates to processing unit 2002 which button has been activated by transmitting an RF signal over RF interface 2028.

Figure 25:
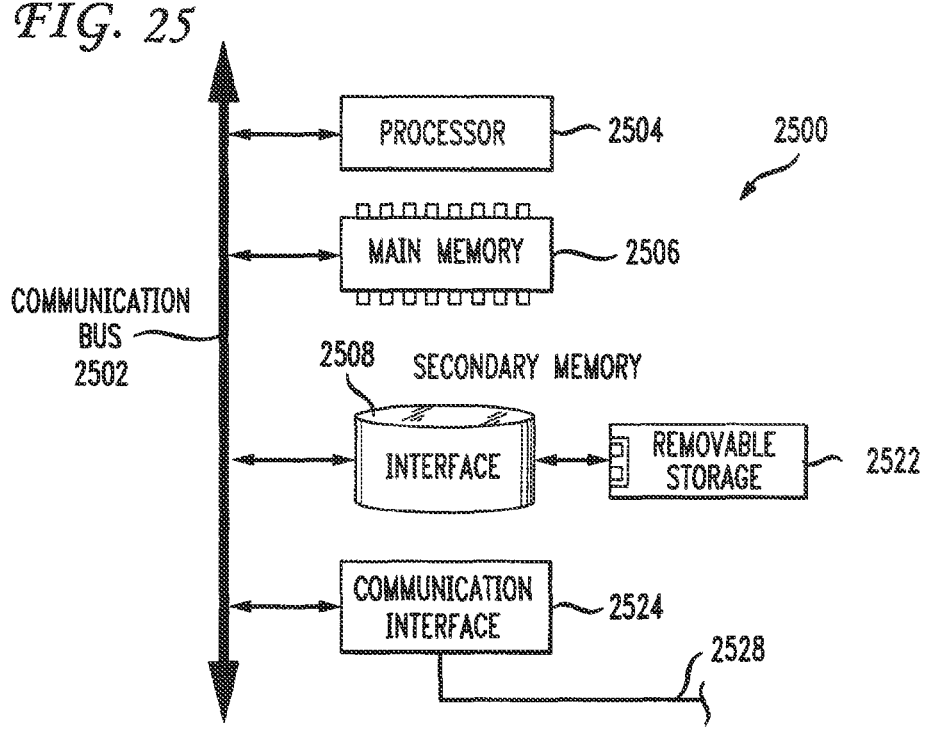
FIG. 25 illustrates an exemplary processing unit.

FIG. 25 illustrates an exemplary processing unit 2500. Exemplary processing unit 2500 can be used to implement processing unit 102 and processing unit 2002. Processing unit 2500 includes one or more processors, such as processor 2504. Processor 2504 is connected to a communication bus 2502.

Processing unit 2500 also includes a main memory 2506, preferably random access memory (RAM), and can also include a secondary memory 2508. The secondary memory 2508 can include, for example, means for allowing computer programs or other instructions to be loaded into processing unit 2500. Such means can include, for example, a storage device 2522 and an interface 2520. Examples of such can include a memory chip (such as an EPROM, or PROM) and associated socket, and other storage devices 1222 and interfaces 2520 which allow software and data to be transferred from the storage device 2522 to processing unit 2500.

Processing unit 2500 can also include a communications interface 2524. Communications interface 2524 allows software and data to be transferred between processing unit 2500 and external devices or other processing units. Examples of communications interface 2524 can include a modem, a network interface (such as an Ethernet card), a serial communications port, a PCMCIA slot and card, etc. Software and/or data transferred via communications interface 2524 are in the form of signals which can be electronic, electromagnetic, optical or other signals capable of being received by communications interface 2524. These signals 2526 are provided to communications interface via a channel 2528. This channel 2528 carries signals 2526 and can be implemented using wire or cable, fiber optics, a phone line, a cellular phone link, an RF link and other communications channels.

In this document, the terms "computer program medium" and "computer usable medium" are used to generally refer to media such as removable storage 2522 and main memory 2506. These computer program products are means for providing software to processing unit 2500. Depending on the software provided to processing unit 2500, processing unit 2500 can be used to implement processing unit 102 or processing unit 2002.

Control or computer programs (also called computer control logic) are stored in main memory 2506 and/or secondary memory 2508. Such computer programs, when executed, enable processing unit 2500 to perform the features of the present invention as discussed herein. Accordingly, such computer programs represent controllers of the processing unit 2500.

In another embodiment, the processing unit 2500 is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, processing unit 2500 is implemented using a combination of both hardware and software.

Broadcast Interface

Figure 29:
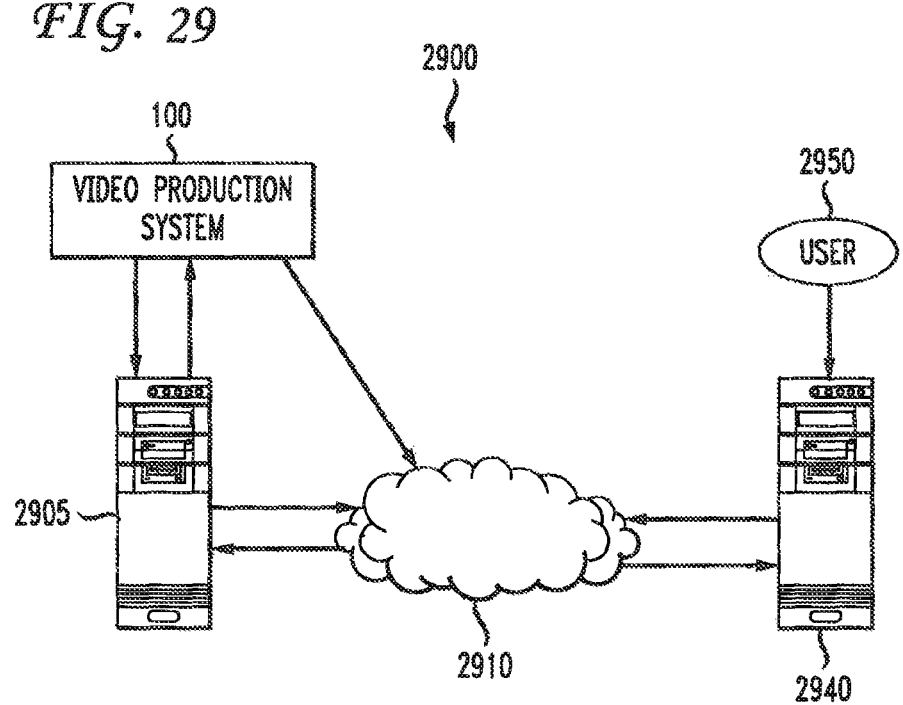
FIG. 29 illustrates one embodiment of an integrated, fully automated video production and broadcasting system.

FIG. 29 illustrates, according to one embodiment of the present invention, a video production system 2900 that is configurable to stream "live" video, and/or record and store to a record/playback device (RPD) 128 a "live" video show comprising news stories related to weather, sports, business, technology, human interests and other news topics. System 2900 can subsequently broadcast the video show over a diverse computer network 2910 which includes wired or wireless local area networks (LANs) and/or wide area networks (WANs), such as the Internet, via a server 2905 either "live" or "on-demand." In a preferred embodiment, the entire show can be video streamed over the Internet for viewing by one or more users 2950 logging into the source 100, 2905 (broadcast station's) web site. If the user 2950 cannot log in at the scheduled time to view the "live" broadcast, "on-demand" functionality is available to replay the entire show or selected segments from the show. As would be readily apparent to persons skilled in the relevant art(s), the "live" or "on-demand" broadcasts can be streamed from server 2905 in real time or downloaded to permanent or temporary files on a client apparatus 2940 for subsequent viewing. Client apparatus 2940 can be a personal computer, personal digital assistant (PDA), telephone, or other device linked to computer network 2910 and including a display device with the ability to select one or more news segments. In an alternative embodiment, client apparatus 2940 can have direct access to the video production system 100. System 2900 can be integrated with Real Network, Microsoft and Apple applications, or other applications as would be apparent to a person skilled in the relevant art(s).

Server 2905 represents one or more computers providing various shared resources to the other network devices. The shared resources include files for programs, databases and libraries; output devices such as printers, teleprompter systems 114 and audio/video recorders and players; and communications devices such as modems and Internet access facilities. Server 2905 is configured to support the standard Internet Protocol (IP) developed to govern communications over public and private Internet backbones. The protocol is defined in Internet Standard (STD) 5, Request for Comments (RFC) 791 (Internet Architecture Board). The communications device can support wired and wireless communications, including satellite based, etc. Server 2905 is also configured to support various operating systems, such as Novell® Netware™ and Microsoft® DOS™, Windows NT™ and Window 95/98™ operating systems.

The "on-demand" functionality selected by user 2950 permits the show or selected segments from the show to be replayed because a show script file, containing transition macro time codes, is created during the original video production and saved directly to server 2905 in real time. The video show can be recorded or stored to RPD 128 with time code segment stamps. In a preferred embodiment, segment stamps are a type of time code format that is created as the transition macro time indicator 1099 moves across the timer 1002 to activate the step mark 1018 preceding the segment and trigger the first video transition. The advancement beyond the step mark 1018 triggers video production system 100 to time stamp a particular segment following a video transition. The segment stamps permit the selection of specific segments from a show along with the appropriate identification of segment descriptors, i.e., sports, weather and news story topic tags. Time stamps can also be created in other ways as would be readily apparent to a person skilled in the relevant art(s).

In an embodiment of the present invention, the Internet user 2950 can browse the web page and select the entire show or segments from the show for "on-demand" viewing. After user 2950 makes the selection by clicking on one or more icons, processing unit 102 for system 100 would load and execute the prerecorded show script file to feed the video show over the Internet, or subscript files of selected segments to user 2950. In a preferred embodiment, system 100 creates a network interface transition macro, retrieves the time codes for the selected show segment(s) from the show script file, integrates the time codes into the network interface transition macro, and executes the network interface transition macro to feed the video to user 2950. In another embodiment, System 100 creates a "bin" play list for "on-demand" play out. Once user 2950 selects a show or segments of a show, the selected video clips (identified by time code stamps and identification labels) are stored in the play out "bin" in the appropriate sequence as identified by user 2950. Once all of the segments are assembled in the "bin" in the appropriate order, play out begins for viewing by user 2950. The play out or viewing by user 2950 can be started, stopped or paused at any time. In addition, segments can be advanced or skipped as desired by user 2950.

Another feature of the present invention is that system 2900 is configurable to permit user 2950 to customize the broadcasts. For instance, user 2950 can establish a profile to specify the contents, duration and layout for current and subsequent broadcasts. Since the saved elements, clips, and segments from the show can be rearranged for subsequent broadcasts, user 2950 can select the type of news stories (i.e., college football, local weather, traffic, stock market, etc.) and the priority or sequencing of the news stories. Accordingly, whenever user 2950 accesses the web site, only those news stories of interest would be routed to user 2950. User 2950 can also select and store specific news stories for future broadcasts. The new stories can be downloaded and saved on a memory device on the client apparatus 2940, or user 2950 can access the news stories at a later time from server 2905 to obtain the most updated version of the new stories.

In one embodiment, information about the video show can be streamed to a web page by the broadcasting station directly from system 100. The information can include a schedule listing the contents and duration of the show, or data relative to a live segment or story that is currently being broadcasted. The data can be located on side panels or frames of the web page synchronized with the segment or story. Data is entered into system 100 and linked via the transition macro to the appropriate segment or story. As system 100 "steps" through the show from one segment to the next, the data changes in sync with the segment as assembled on the transition macro.

In one embodiment, the show script file includes links to advertisements. While a video show is being broadcasted over network 2910, the advertisements are streamed at specified intervals and durations with the video show. The advertisements can be located on the side panels of the same frame or window. Alternatively, the advertisements can be streamed in separate frames. The advertisements can be stored as separate files on server 2905, and loaded, placed and played according to icon placements on the transition macro time sheet 299. The advertisements can provide a hyperlink directly to the web site for the sponsor of the advertisement.

The web page permits user 2950 to submit questions to a Webmaster or network systems administrator for the broadcasting station. User 2950 can also initiate searches on a specific topic tied to the newscast. Each time user 2950 selects a topic from the search results, the advertisements linked to the topic via the transition macro is routed to user 2950. The web page is also configurable to support monitoring and data logging to track web hits, advertisement hits, billing and costs.

Server 2905 can also include a time shifting apparatus that automatically records and plays back shows at programmable or user-designated time slots. In one embodiment, the playback includes a built-in news "cut-in" to provide updated information or late-breaking news. The built-in news cut-in can be implemented by inserting a live segment at the beginning of a step-marked frame (time stamped during the recording) of any segment. The server can route the original advertisements or other data linked to the segments, or server 2905 can route newly associated data links.

In one embodiment, the built-in news cut-in can be placed into the network interface transition macro by the Webmaster or video director 135. News cut-in hot-key icons 212 are used to insert the live segments into a transition macro that was previously created for broadcast and saved to server 2905. This updates server 2905 with a new show and segment architecture for user 2950 to choose. User 2950 would automatically receive updated information or late-breaking news as the video show is streamed over the network or recalled "on-demand." In another embodiment, user 2950 can decide whether to receive built-in news cut-ins for designated topics, i.e. weather forecasts, stock quotes, sports scores, etc., by clicking on the appropriate icon. As a result of the user's input, the processing unit 102 would edit the original transition macro to create a network interface transition macro to insert the live segment as directed.

The video segment for the user-designated or programmable news cut-ins would be routed to user 2950 as the network interface transition macro time indicator 1099 activates the news cut-in icon. If, for instance, no news stories are available when time indicator 1099 activates the icon, processing unit 102 would skip over the news cut-in icon to activate the icon for the next video segment.

After the show script files are created, system 100 can be programmed to either save over previously made files or create a historical archive of the news segments. For instance, user 2950 may only be interested in the most recent weather forecast. Therefore, in this instance, system 100 would save over the weather segment files to make available only the latest data. On the other hand, a specific news segment on a human interest feature can be archived for subsequent broadcasts.

Figure 30:
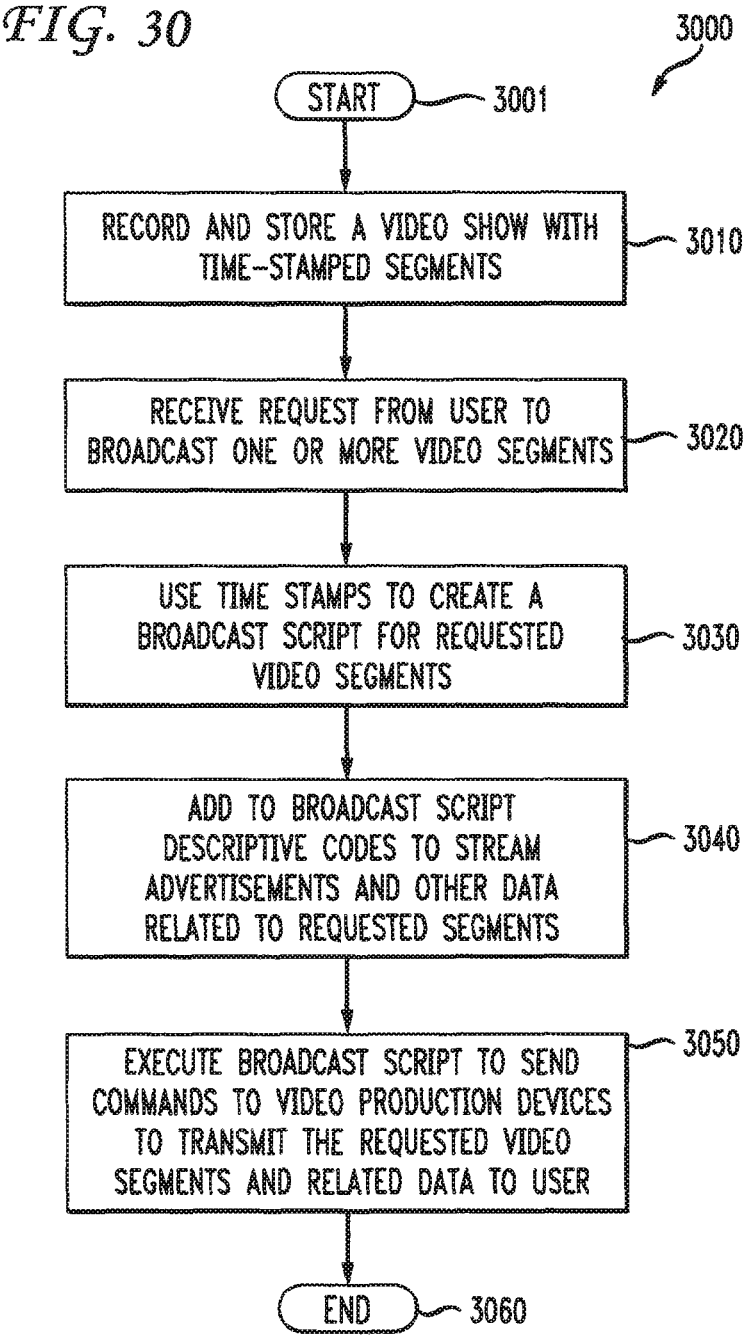
FIG. 30 is a flow chart representing the general operational flow of a video production and broadcasting system according to an embodiment of the present invention.

Referring to FIG. 30, flowchart 3000 represents the general operational flow of an embodiment of the present invention. More specifically, flowchart 3000 shows an example of a control flow for producing a news program in an automated video production environment and broadcasting the entire program or selected segments from the program to one or more users 2950.

Generally speaking, system 100 can produce and stream live video across network connection 2910. Referring to step 3010, when the show is originally produced for streaming, time stamps can be used to mark specific segments from the show. A show script file is created to record the time stamps identifying each video segment. Each video segment is likewise recorded and stored on RPD 128. The show script file enables system 100 to use the time stamps to retrieve specific video segments for future viewing.

At step 3020, user 2950 accesses the broadcasting station's web site and selects one or more video segments for viewing. The user can indicate the selection by clicking on one or more icons representing the video segment(s). The user's requests are routed across network 2910 to server 2905 for processing. At step 3030, processing unit 102 creates a new script file to transmit the video segment(s) requested by user 2950. This can be accomplished by using the original script file to locate the time stamps associated with the video segment(s). Processing unit 102 then inserts the appropriate time segments in the new script file.

At step 3040, processing unit 102 can insert additional codes into the new script file to stream other data related to the requested video segment(s). The other data can include advertisements or information related to the contents and duration of the video segment. The additional codes can be inserted at the discretion of user 2950 or the broadcasting station's Webmaster.

At step 3050, processing unit 102 executes the new script file to send commands to one or more video production devices to transmit the video segments and related data to user 2950. As such, system 2900 supports synchronize datacasting provided that the Webmaster and/or user 2950 has requested advertisements or other information to be routed with the video segment(s).

Figure 31:
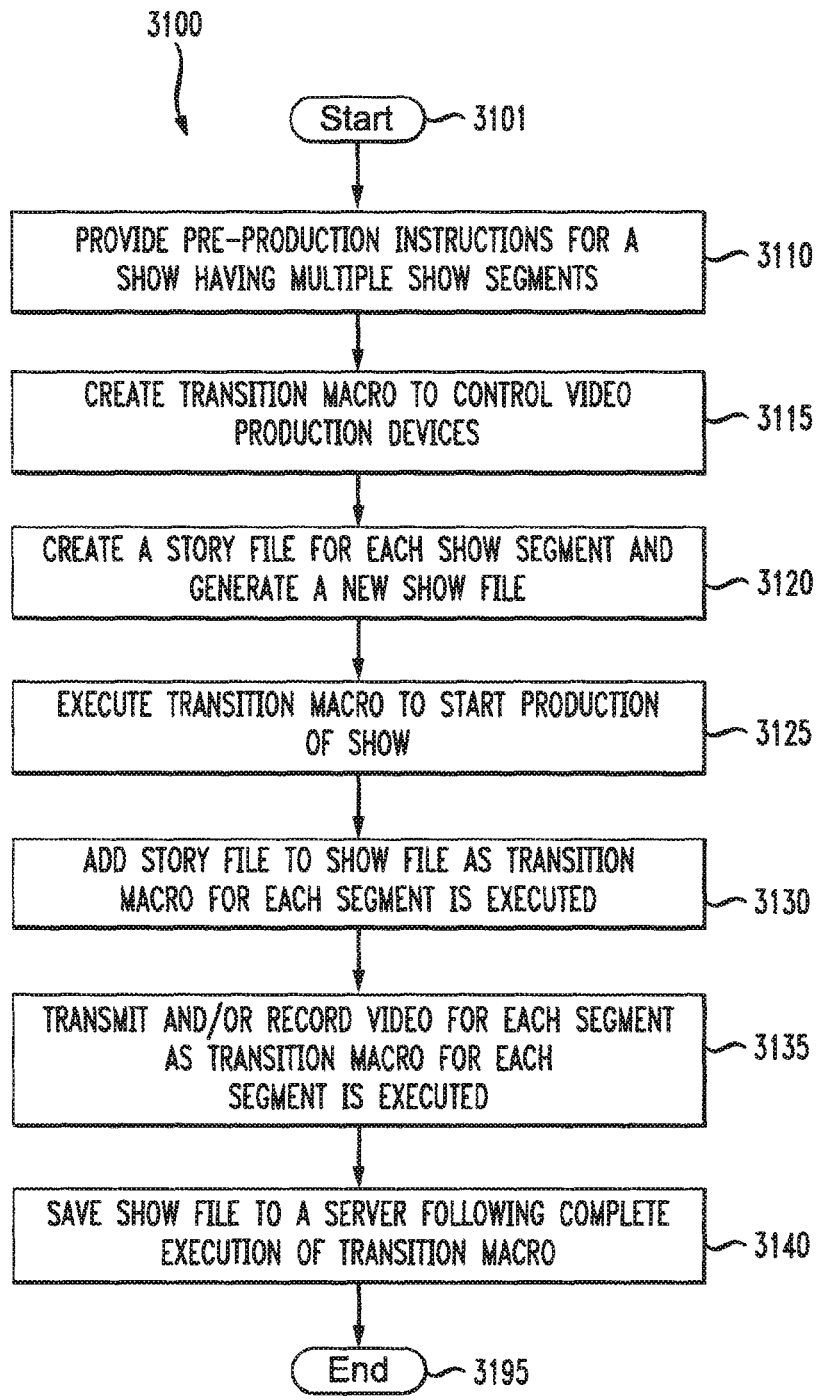
FIG. 31 is a flow chart representing the general operational flow of a video production and broadcasting system for recording production instructions according to another embodiment of the present invention.

Referring to FIG. 31, flowchart 3100 represents the general operational flow of an embodiment of the present invention. More specifically, flowchart 3100 shows an example of a control flow for producing a news program in an automated video production environment and recording the video production instructions for future broadcasts.

At step 3110, video director 135 or some other member of the production crew generates a list of pre-production instructions to produce a show, such as a news program. As discussed above, the pre-production instructions can include an order of news stories, transition effects, camera signals, etc. The show can be divided into multiple segments where each segment would correspond to a specific news story or type of news story.

At step 3115, a transition macro is created from the pre-production instructions. As discussed above, the transition macro is a set of video production commands, where each video production command is associated with a timer value and at least one video production device. When the transition macro is created, a story file is also created, at step 3120, for each of the show segments. Therefore, each show segment has its own story file which contains all video production commands related to the respective show segment. Also, at step 3120, processing unit 102, generates a show script file. At step 3120, the show script file is empty, but eventually the show script file will include all story files for the transition macro segments that have been executed, as discussed below. As such, video production system 100 creates a separate show script file for each news program or video show.

At step 3125, processing unit 102 executes the transition macro to start producing the video show. At step 3130, the story file for each show segment is added to the show script file as the transition macro segment for each show segment is executed. In a preferred embodiment of the present invention, as processing unit 102 executes the transition macro segment for a show segment, the story file for the subsequent segment is automatically appended to the story file for the active segment within the show script file. After a story file is appended within the show script file, the transition macro segment for the subsequent segment cannot be deleted from system 100. Processing unit 102 would then automatically execute the subsequent segment and its story file would be recorded in the show script file. In another embodiment, video director 135 can manually alter the subsequent transition macro segment after the story file has been appended in the show script file, and all changes to the video production commands would be recorded in the appended story file.

At step 3135, the video show segments are produced for live or live-to-tape broadcasting. The video segments can also be stored on RPD 128 as discussed in reference to FIG. 30. After the entire transition macro has been executed and thus the video production is completed, the show script file is stored at step 3140 to server 2905.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. A method for producing a live or live-to-tape show, comprising the steps of:
   (a) enabling creation of an instruction sequence for the show, wherein said instruction sequence defines at least one set of production commands for controlling at least one production device, said at least one set comprising at least one segment file which comprises a group of production commands that, when executed, operates to produce a segment of the show, said at least one-segment file comprising at least one scripted portion that includes at least one command activated during a predetermined interval in a script that undergoes scrolling for display under control of an operator, and at least one non-scripted portion that include at least one command activated independent of the script, said at least one segment having a duration which is defined by execution of said instruction sequence under the control of a human operator; and
   (b) executing said at least one set-of production commands to control the least one production device to thereby produce the show.

2. A method of claim 1, further comprising the step of:
   (c) executing said at least one command to add a segment file to a show file prior to executing a first production command within the group of production commands corresponding to said at least one segment file.

3. A method of claim 2, wherein a subsequent segment file is irreversibly appended to said show file prior to executing a first production command within the group of production commands corresponding to a preceding segment me.

4. A method of claim 3, wherein the group of production commands corresponding to the subsequent segment file includes instructions for transitioning from the preceding show segment to the subsequent show segment.

5. A method of claim 2, further comprising the step of:
   (d) executing at least one command to store said show file in a memory means.

6. A method of claim 1, further comprising the steps of:
   (c) executing at least one command to record a show segment for subsequent playback; and
   (d) executing at least one command to integrate a segment delimiter for a recorded segment with a segment file, said segment delimiter identifying said recorded segment.

7. A method of claim 6, wherein said segment delimiter identifies a starting point of said recorded segment.

8. A method for producing a live or live-to-tape show, comprising the steps of:
   (a) enabling creation of an instruction sequence for the show, wherein said instruction sequence defines at least one set of production commands, said at least one-set of production commands comprising at least one or more segment file, which comprises a group of production commands for controlling at least one production device, the commands when executed, operates to produce a segment of the show, said at least one segment file comprising at least one scripted portion that included at least one command activated during a predetermined interval within a script that undergoes scrolling for display under control of an operator, and at least one non-scripted portion that includes at least one commands activated independent of the script, each segment having a duration which is defined by execution of said instruction sequence under the control of a human operator;
   (b) executing said at least one set of production commands to control the at least one production device to thereby produce the show;
   (c) executing said at least one commands to add a segment file to a show file prior to executing a first production command within the group of production commands corresponding to said segment file.

9. A method of claim 8, wherein a subsequent segment file is irreversibly appended to said show file prior to executing a first production command within the group of production commands corresponding to a preceding segment file.

10. A system for producing a live or live-to-tape show, comprising:
    a processing unit in communication with at least one production device;
    generating means for enabling creation of an instruction sequence for the show,
    wherein said instruction sequence defines at least one set of production commands, comprising at least one segment file, which comprises a group of production commands for controlling at least one production device, the commands, when executed, operate to produce a segment of the show, wherein said at least one segment file comprises at least one scripted portion that includes at least one command activated during a predetermined interval in a script that undergoes scrolling for display under control of an operator, and at least one non-scripted portions that includes at least one command activated independent of the script, wherein the duration of each segment is defined by execution of said instruction sequence under the control of a human operator, and
    executing means for executing said at least one set of production commands to control the at least one production device, to thereby produce the show.

11. A system of claim 10, further comprising means for executing commands to add a segment file to a show file prior to executing a first production command within the group of production commands corresponding said segment file.

12. A system of claim 11, further comprising means for executing commands to irreversibly append a subsequent segment file to said show file prior to executing a first production command within the group of production commands corresponding to a preceding segment file.

13. A system of claim 11, further comprising memory means for enabling storage of said show file.

14. A system of claim 10, further comprising:
   means for executing at least one command to record a show segment for subsequent playback; and
   means for executing at least one commands to integrate a segment delimiter for a recorded segment with a segment file, wherein said segment delimiter identifies said recorded segment.

15. A system of claim 14 wherein said segment delimiter identifies a starting point of said recorded segment.

16. A method for producing a live or live-to-tape show, comprising the steps of:
   (a) receiving verbal instructions and converting said verbal instructions into signals to enable creation of an instruction sequence for the show, wherein said instruction sequence defines at least one set of production commands, said at least one set of production commands comprising at least one segment file, comprising a group of production commands for controlling at least one production device, the commands when executed, operates to produce a segment of the show, each segment file comprising at least one scripted portion that includes at least one command activated during a script that undergoes scrolling for display under control of an operator and at least one non-scripted portion that includes at least one command activated independent of the script, each segment having a duration which is defined by execution of said instruction sequence under the control of a human operator; and
   (b) executing said at least set of production commands to control the at least one production device and thereby produce the show.

17. A system for producing a live or live-to-tape show, comprising:
   a processing unit in communication with at least one or more production devices;
   means for receiving verbal instructions and converting said verbal instructions into signals to instruct said processing unit to create an instruction sequence for the show, wherein said instruction sequence defines at least one set of production commands for controlling at least one production device, the commands, comprising at least one segment file, comprising a group of production commands that, when executed, operates to produce a segment of the show, wherein said at least one segment file comprises at least one scripted portions that includes at least one command activated during a script that undergoes scrolling for display under control of an operator, and at least one non-scripted portions that includes at least one command activated independent of the script, wherein the duration of each segment is defined by execution of said instruction sequence under the control of a human operator; and
   executing means for executing said at least one set of production commands to control the at least one production device, and thereby produce the show.

18. A method for producing a live or live-to-tape show, comprising the steps of:
   (a) creating an instruction sequence for the show to define at least one set of production commands, said at least one sets of production commands comprising at least one segment file, which comprises a group of production commands for controlling at least one production device, the commands, when executed, operates to produce a segment of the show, said at least one segment file comprising at least one scripted portions that includes at least one command activated during a predetermined interval in a script that undergoes scrolling for display under control of an operator, and at least one non-scripted portion that includes at least one command activated independent of the script, each segment having a duration which is defined by execution of said instruction sequence under the control of a human operator;
   (b) executing said at least one-set of production commands to control the at least one production device, and thereby produce the show; and
   (c) distributing at least one show segment over a computer network to a destination.

19. The method of claim 18, further comprising the step of
   (d) receiving, from said destination, a request to distribute said at least one show segment prior to executing step (c).

20. The method of claim 19, further comprising the step of:
   (e) defining a set of commands corresponding to said at least one segment that, when executed, enables selection of said at least one show segment for distribution.

21. The method of claim 20, further comprising the step of:
   (f) accessing a segment delimiter to enable selection of a show segment for distribution, said segment delimiter identifying and/or describing the content of said at least one selected show segment.

22. The method of claim 20, further comprising the step of:
   (f) defining commands that, when executed, enable distribution of said selected one or more show segments over the Internet to said destination.

23. The method of claim 20, further comprising the step of
   (l) defining commands that, when executed, enable distribution of said selected at least one show segment to comply with the Internet Protocol defined in Internet Standard 5, RFC 791, for transport over said computer network.

24. The method of claim 18, further comprising the step of:
   (d) defining commands that, when executed, distributes media related to said at least one show segment to said destination.

25. The method of claim 18, further comprising the step of:
   (d) distributing said at least one show segment over a wireless network to said destination.

26. A method for producing a live or live-to-tape show, comprising the steps of:
   (a) creating an instruction sequence for the show to define at least one-set of production commands, said at least one set of production commands comprising at least one segment files, comprising a group of production commands for controlling at least one production device, the commands when executed, operates to produce a segment of the show, said at least one segment file comprising at least one scripted portion that includes at least one command-activated during a predetermined interval in a script that undergoes scrolling for display under control of an operator, and at least one non-scripted portion that includes at least one command activated independent of; the script, each segment having a duration which is defined by execution of said instruction sequence under the control of a human operator;
   (b) executing commands to associate at least one segment delimiter with at least one segment file, said segment delimiter identifying a segment produced from a corresponding segment file; and
   (c) executing said one or more sets of production commands to control at least one production device, and thereby produce the show.

27. The method of claim 26, further comprising the step of:
(d) executing commands to distribute a show segment, upon production, to a destination.

28. The method of claim 27, wherein step (d) comprises the step of:
(l) executing commands to distribute media related to said show segment to said destination.

29. The method of claim 27, wherein step (d) comprises the step of:
(l) deploying a wireless interface to distribute said show segment to said destination.

30. The method of claim 26, further comprising the step of:
(d) receiving, from a destination, a request to distribute one or more show segments prior to said destination.

31. The method of claim 26, further comprising the step of
(d) accessing a segment delimiter to enable selection of a show segment for distribution to a destination.

32. A method for producing a live or live-to-tape show, comprising the steps of:
(a) enabling creation of an instruction sequence for the show to define at least one set of production commands- comprising at least one segment file which comprises a group of production commands for controlling at least one production device, the commands, when executed, operates to produce a segment of the show, each segment file comprising at least one scripted portion that includes at least one command activated during a predetermined interval in a script that undergoes scrolling for display under control of an operator, and at least one non-scripted portion that includes at least one command activated independent of, the script, each segment having a duration which is defined by execution of said instruction sequence under the control of a human operator;
(b) executing said one or more sets of production commands to control the at least one production device to thereby produce the show;
(c) executing commands to distribute a show segment and media related to said show segment to a destination.

33. The method of claim 32, further comprising the step of:
(d) executing commands to distribute an advertisement to said destination.

34. The method of claim 32, further comprising the step of:
(d) executing commands to send media in response to a request for information related to said show segment.

35. The method of claim 32, wherein step (c) comprises the step of:
(l) executing commands to distribute said show segment at substantially the same time as producing said show segment.

* * * * *